(12) United States Patent
Nishi

(10) Patent No.: US 7,068,444 B2
(45) Date of Patent: Jun. 27, 2006

(54) IMAGE DISPLAY UNIT AND PROJECTION OPTICAL SYSTEM

(76) Inventor: Kenji Nishi, Gandstage-Isogo 407, 3-1, Shiomidai 1-chome, Isogo-ku, Yokohama-shi, Kanagawa 235-0022 (JP)

(*) Notice: Subject to any disclaimer, the term of this patent is extended or adjusted under 35 U.S.C. 154(b) by 0 days.

(21) Appl. No.: 10/528,849

(22) PCT Filed: Sep. 18, 2003

(86) PCT No.: PCT/JP03/11878

§ 371 (c)(1),
(2), (4) Date: Mar. 23, 2005

(87) PCT Pub. No.: WO2004/029693

PCT Pub. Date: Apr. 8, 2004

(65) Prior Publication Data

US 2006/0072215 A1    Apr. 6, 2006

(30) Foreign Application Priority Data

Sep. 24, 2002 (JP) ............................ 2002-313466
Apr. 15, 2003 (JP) ............................ 2003-109720

(51) Int. Cl.
*G02B 27/14* (2006.01)

(52) U.S. Cl. .................. 359/708; 359/630; 359/631; 359/633; 345/7

(58) Field of Classification Search ........... 359/708, 359/630, 629, 631, 633, 632, 636, 637, 638, 359/639, 640; 345/7, 9

See application file for complete search history.

(56) References Cited

FOREIGN PATENT DOCUMENTS

| JP | 3-87709 A | 4/1991 |
|---|---|---|
| JP | 6-194598 A | 7/1994 |
| JP | 8-122642 A | 5/1996 |
| JP | 9-054258 A | 2/1997 |
| JP | 9-179062 A | 7/1997 |
| JP | 10-153749 A | 6/1998 |
| JP | 10-186245 A | 7/1998 |
| JP | 11-133315 A | 5/1999 |
| JP | 11-174345 A | 7/1999 |
| WO | WO 00/79325 A1 | 12/2000 |

*Primary Examiner*—Timothy Thompson
(74) *Attorney, Agent, or Firm*—Frishauf, Holtz, Goodman & Chick, P.C.

(57) ABSTRACT

An intermediate image of an image from the LCD module 142 is deflected by reflection mirrors M1 and M2 via zoom automatic focus control system (g) and then is formed on diffusion glass 131 via relay lens (b) and reflection mirrors M3 and M4. The LCD image is projected on the retina of eyeballs via eyepiece lens 132 by the light flux diffused at an order of ±20 degrees by diffusion glass 131. One side of the eyepiece lens 132 close to the crystal balls 2 has an aspherical shape of a Conic surface and a Conic coefficient of the Conic surface is −1 and less. Thereby the optical system that has a viewing angle of 60 degrees and over and has a small aberration can be obtained.

6 Claims, 50 Drawing Sheets

(a)　(b)　(c)

Fig.26
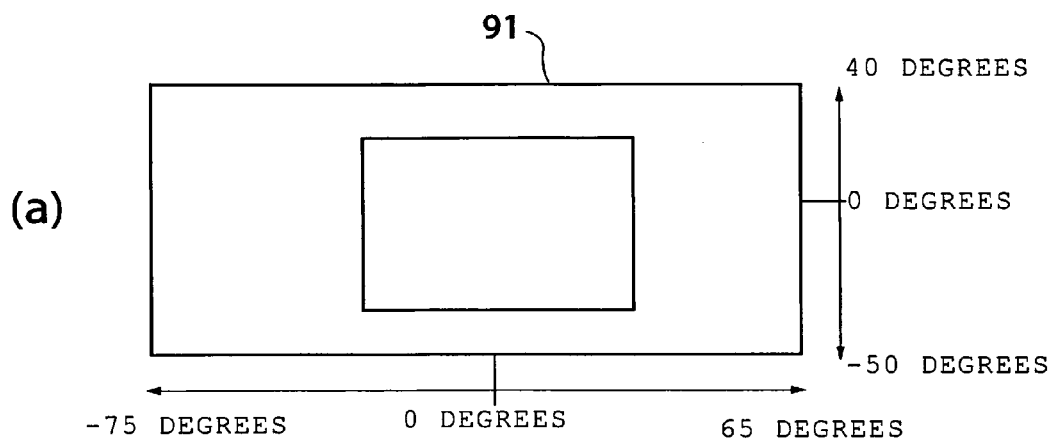
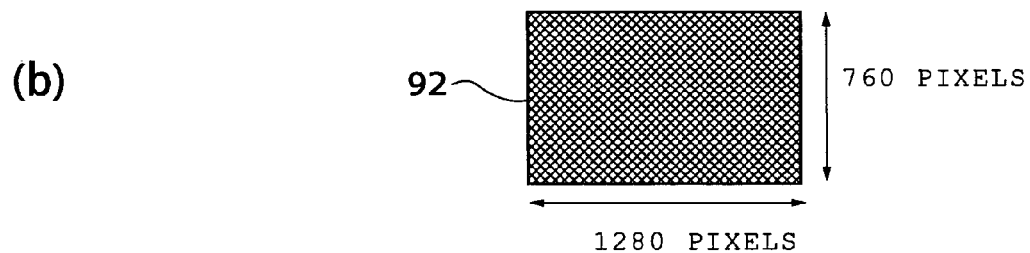
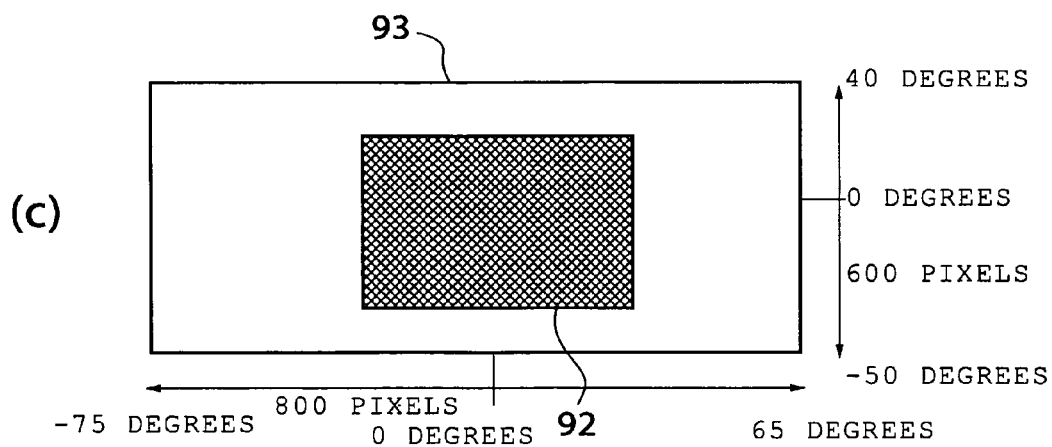

EXTERNAL IMAGE

Fig.45
(a)
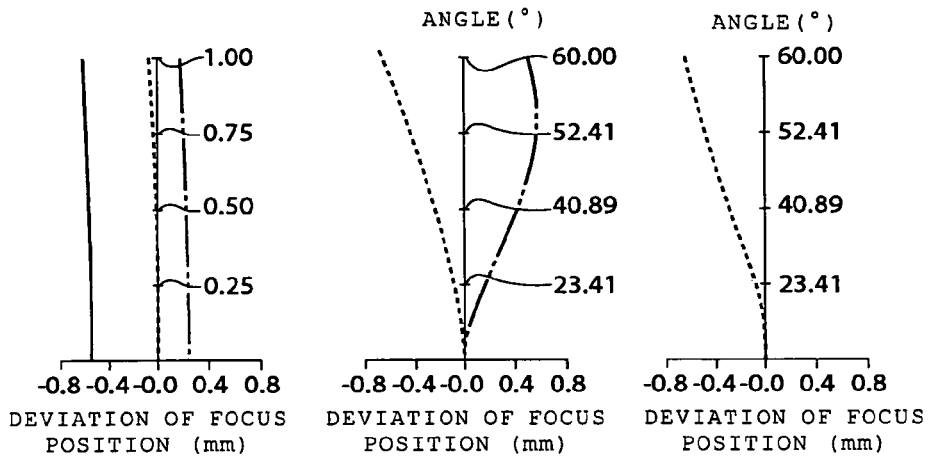
(b)
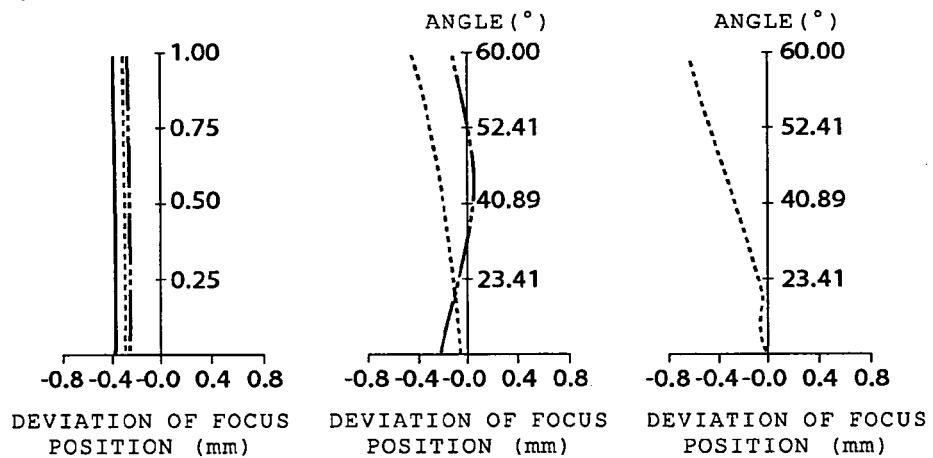
(c)
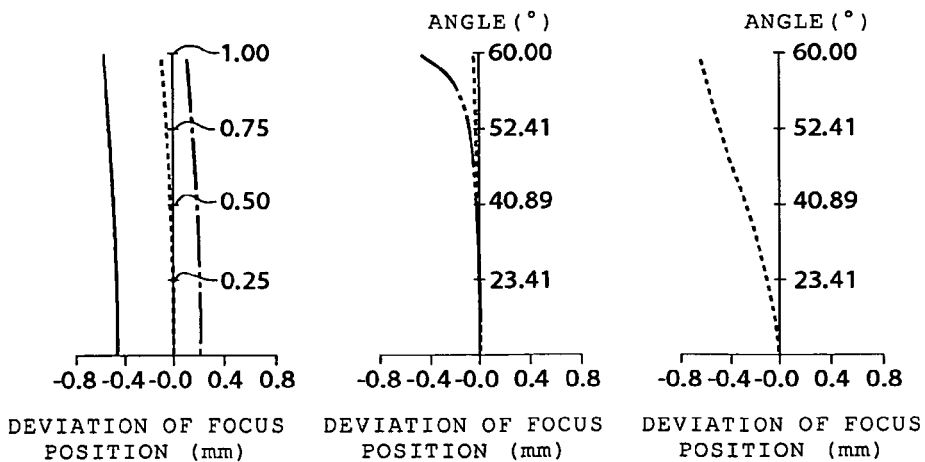

Fig.46
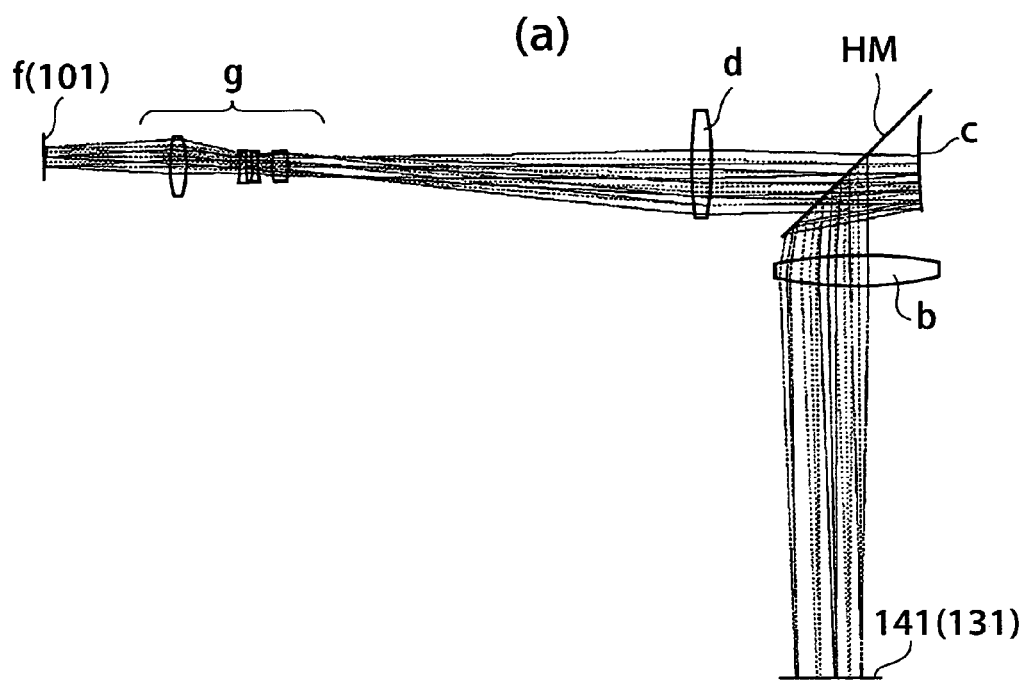
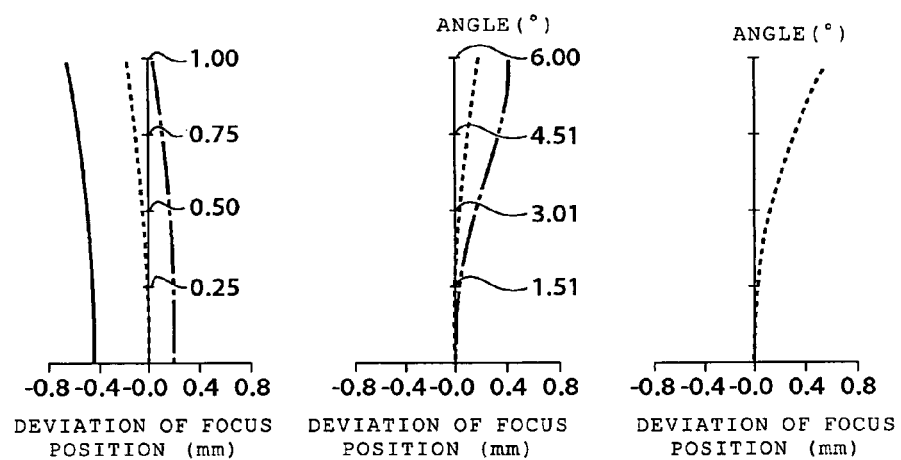

Fig.47
(a)
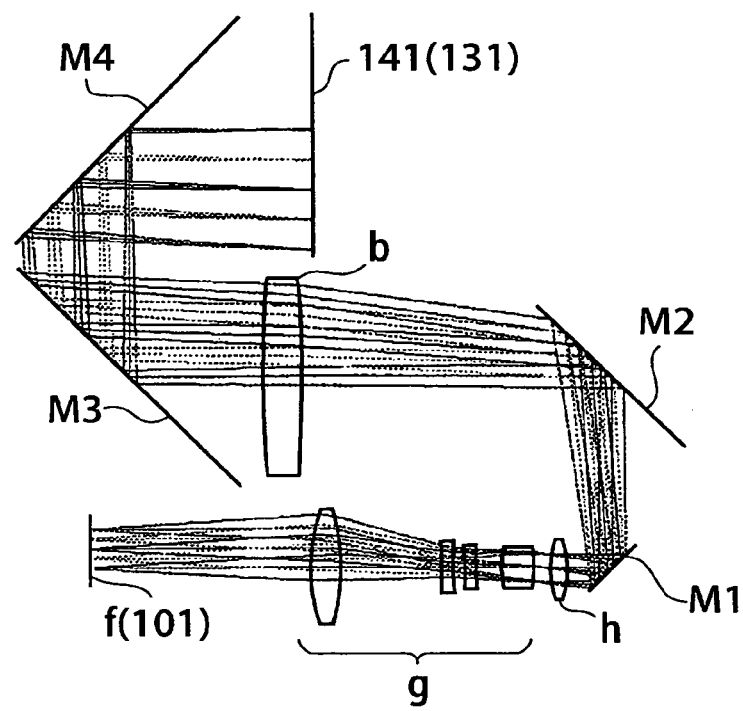
(b)
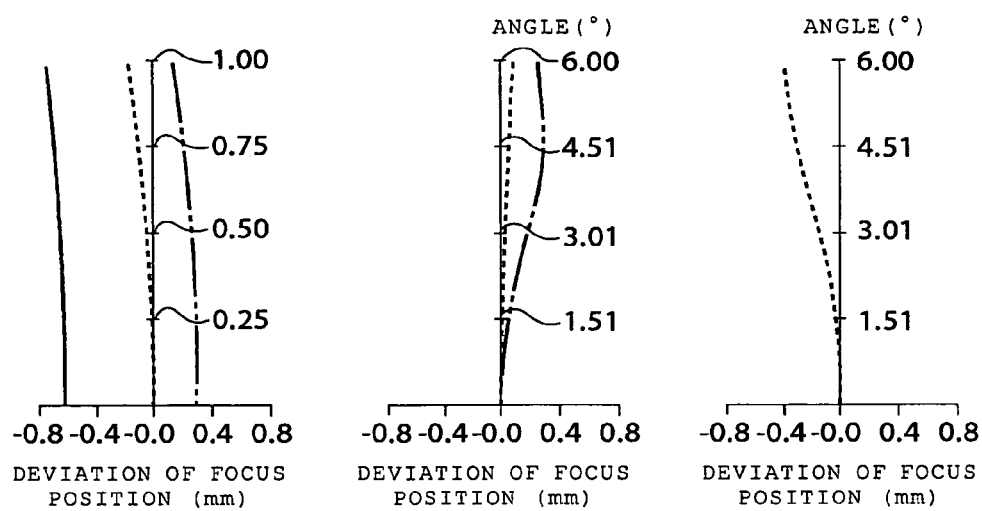

Fig. 49

| ITEM | Eye-Trek (FMD-700) | PCs | LCD TV | PROJECTOR | HD DISPLAY (HDPS100) | MOVIE HOUSE | INVENTION | INVENTION & APPLICABLE VIDEO |
|---|---|---|---|---|---|---|---|---|
| ANGLE OF VIEWING | 30° | - | - | - | - | - | Lateral 150° Vertical 90° | Lateral 150° Vertical 90° |
| SCREEN SIZE (Unit: Inch) | 52 | 1018 | 28-37 | 30-300 | 100 | 300-800 | Any | Any |
| FOCUS DISTANCE | 2m fixed | 0.4 m | Depends on viewer's position 1-5m | Depends on viewer's position 1-10m | Depends on viewer's position 5m- | Depends on viewer's position 20-50m | Any setting 0.5m - infinite distance | Any setting 0.5m - infinite distance |
| RESOLUTION (Unit: pixel) | 720K pixels | 100K-360K pixels | 360K-780K | 1M-3.6M | 4M | | 7.2M | 7.2M |
| EYE FATIGUE | Much | Much | Not so much | Little | Little | Almost no | Almost no | Almost no |
| PORTABILITY | Easy | No | No | Possible | Impossible | Impossible | Possible | Possible |
| PLACE | Anywhere | Anywhere | Indoors | Indoors | Specific place | Movie theater | Any | Any |
| AVAILABLE SPACE | 1 sq. m | 1 sq. m | Depends on viewer's place 2-6 sq.m | Depends on viewer's place 1-100 sq.m | Specific place | Movie theater | 1 sq. m | 1 sq. m |
| IMAGE POSITION | Any position | Fixed | Fixed | Screen required | Fixed | Fixed | Any | Any |
| 3D IMAGE | Depend on games | No | No | No | No | PL glasses for special images | Computer required | Depends on applicable Video |
| SHARING | Max two persons | Usually one | No limit | No limit | No limit | No limit | Max. 4 persons at Home Theater | Max. 4 persons at Home Theater |
| OUTPUT ETC | P/S2, VIDEO output | PC output | PC/Video output | PC/Video output | PC/Video output | Cine film | PC/Video output | PC/Video output |

IMAGE DISPLAY UNIT AND PROJECTION OPTICAL SYSTEM

This application is a U.S. National Phase Application under 35 USC 371 of International Application PCT/JP2003/011878 filed Sep. 18, 2003.

TECHNICAL FIELD

This invention relates to an image display device that is used in proximity to at least one of eyes and a projection optical system that is arranged in front of at least one of the eyes of a user and projects an image on the eyeball of the user.

BACKGROUND ART

As an image display device, there are many image devices available on the market like a TV, PC, Projector, video camera, cellular phone etc, but there is a limit to a size in these conventional image display devices, so an image of a wide area that human eyes are actually able to see cannot be obtained from these image display devices. Further, as a portable image display device, an eyeglass-type image display and head-mounted image display devices that are called a wearable display device have been known.

As for the wearable image display, as shown in FIG. 40, a method in which small half mirror 40 is arranged at a portion of field of view and an image output from image output element 39 such as a plasma display device, LCD etc is deflected by half mirror 40 via projection optical system 38, and the image is projected on a retina has been known. This is a method that uses the half mirror, so that the image output from image output element 39 looks like floating on a portion of field of view (a first type). However, as for a viewing angle, only an order of a few degrees is obtainable, so that this method is a candidate for use in displaying information of a screen of the cellular phone etc.

Also, as for a method for getting a little bit larger image information than that of the cellular phone, there is a method as shown in FIG. 6 (b) in which an image output from image output element 39 is projected on the retina of the eyeball via a plurality of reflection surfaces and projection optical system 42 by arranging large optical element 41 in front of at least one of eyeballs.

In such the method, a relatively large viewing angle (order of 15–30 degrees) is obtained, but only an image display device of which field of view is completely shielded has been proposed. Thus, a second-type image display device that is arranged detachably in front of one eye of two eyes and used as an image display device of a wearable PC and a third-type image display device in which a same image display device is separately arranged with respect to both eyes and used instead of a TV and projector have been proposed.

The foregoing three types of the image display device have been expected as a wearable image display device in place of the cellular phone, note-size PC, TV and projector of the prior art. In fact, these image display devices have an advantage in "wearable", but a size of field of view of them is actually not very different from one of the conventional display devices and, when considering difficulty in wearing, eyestrain due to a blocked field of view, a weight mounted over ears and head etc, they have a shortcoming that these disadvantages are conspicuous.

This invention is made in view of these circumstances and an object of this invention is to provide an image display device that is wearable or usable in proximity to at least one of eyes having a large viewing angle close to field of view with which a user sees, and a projection optical system that is arranged in front of user's eyes and projects an image on the eyeball.

DISCLOSURE OF INVENTION

A first invention for achieving the above object is an image display device that includes an optoelectric element of emitting light in a two-dimensional way having a display surface orthogonal to a direction of emitted light flux and a fisheye-type optical system that projects light flux emitted from the optoelectric element inside at least one of eyeballs of a user and has an angle of field of view of 60 degrees and over, wherein the image display device is worn in front of the eyeball and the fisheye-type optical system forms an intermediate image and a closest optical element of optical element arranged toward the eyeball from a position of forming the intermediate image to the eyeball is an aspherical optical element of a single lens element and a far surface shape of the optical element from the eyeball has an aspherical shape of a Conic surface such that the light flux entering a pupil of the eyeball enters a far surface of the optical element from the eyeball approximately at right angles and a Conic coefficient of the Conic surface is −1 and less.

A second invention for achieving the above object is the fisheye-type optical system set forth in the first invention, wherein a second optical element of optical elements constituting the image display device from the eyeball is made up of a single lens element and a surface shape of a far surface of the optical element from the eyeball has a shape such that the light flux entering the pupil of the eyeball enters a far surface of the optical element from the eyeball approximately at right angles.

A third invention for achieving the above object is the image display device set forth in any of the first or second invention, wherein the fisheye-type optical system has a first lens group that includes a relay optical system, and an eyepiece lens system that projects the intermediate image formed by the first lens group inside the eyeball.

A fourth invention for achieving the above object is the image display device set forth in the third invention, wherein the first lens group includes at least one or more aspheric optical element and over.

A fifth invention for achieving the above object is the image display device set forth in any of the third or fourth invention, wherein the first lens group includes at least one curved mirror that corrects telecentricity.

A sixth invention for achieving the above object is the image display device set forth in any of the first through fifth inventions, wherein the image display device includes an image composite device that composites first image information and second image information different from the first image information and outputs information of the composite image to the optoelectric element.

A seventh invention for achieving the above object is the image display device set forth in the sixth invention, wherein the image composite device includes a function that, when light flux emitted from the optoelectric element is influenced by distortion produced by the fisheye-type optical system, implements image process of giving distortion to at least one of the first image information and the second image information beforehand to correct the distortion such that a faithful image can be projected. An eighth invention for achieving the above object is the image display device set forth in any of the sixth through eighth inventions, wherein the image composite device includes an image composite device controller that controls information of the composite image to be output to the optoelectric element such that an area of compositing at least one of the first image information and the second image information, and another image information does not overlap beyond a predetermined area.

A ninth invention for achieving the above object is the image display device set forth in any of the sixth through eighth inventions, wherein at least one of the first image information and the second image information includes at least one of information output from a video image, a DVD image and a high vision image.

A tenth invention for achieving the above object is the image display device set forth in the sixth through ninth inventions, wherein at least one of the first image information and the second image information includes image information output from a processing computing device.

A eleventh invention for achieving the above object is the image display device set forth in the tenth invention, wherein the processing computing device is connected with a keyboard to enter desired information into the processing computing device and the image output information includes information input to the keyboard.

A twelfth invention for achieving the above object is the image display device set forth in the eleventh invention, wherein the keyboard is a portable keyboard attached to a hand.

A thirteenth invention for achieving the above object is the image display device set forth in the twelfth invention, wherein the portable keyboard includes an electromagnetic element attached to a thumb and an electromagnetic detecting sensor attached to other fingers, and further includes a control device that recognizes information of a distance and direction between the thumb and the other fingers from a state of an electromagnetic field detected by the electromagnetic detecting sensor and gives a specific sign corresponding to the information of the distance and direction.

A fourteenth invention for achieving the above object is the image display device set forth in the twelfth invention, wherein the portable keyboard includes a pressure detecting sensor that is attached to each finger and a control device that gives a specific sign on a basis of information of each finger's pressure detected by the pressure detecting sensor.

A fifteenth invention for achieving the above object is the image display device set forth in the tenth invention, wherein the processing computing device converts a voice sound or a non-voice sound input to a microphone or a headphone into a specific sign corresponding to the sound and outputs an image in correspondence to the specific sign as the image output information.

A sixteenth invention for achieving the above object is the image display device set forth in any of the first through fifteenth inventions, wherein the fisheye-type optical system includes an optical image composite device that optically composites a plurality of images output from a plurality of optoelectric elements and projects, and forms a plurality of images on the retina inside the eyeball.

A seventeenth invention for achieving the above object is the image display device set forth in the sixth invention, wherein the optical image composite device includes an optical zoom device that has a variable magnification of at least 2× and over with respect to a single image, and an optical image composite device controller that controls the optical zoom device such that an area of compositing the single image and other image does not overlap beyond a predetermined area.

A eighteenth invention for achieving the above object is an image display device for both eyes, wherein the image display device set forth in any of the first through seventeenth inventions is separately arranged to a right eyeball and a left eyeball respectively and further includes an adjustment device that is capable of adjusting a space between each fisheye-type optical system of right and left eyeballs corresponding to a space between eyeballs of the user.

A nineteenth invention for achieving the above object is an image display device for both eyes, wherein the image display device set forth in any of the first through seventeenth inventions includes a splitting optical system that splits light flux emitted from one of the optoelectric elements into a plurality of light flux and the fisheye-type optical system that is separately arranged every each split light flux, and further includes an adjustment device that is capable of adjusting a space between each fisheye-type optical system corresponding to a space between eyeballs of the user.

A twentieth invention for achieving the above object is the image display device set forth in any of the first through seventeenth inventions, wherein the image display device is arranged to at least one of a right eyeball and a left eyeball A twenty-first invention for achieving the above object is an image display device for both eyes, wherein the image display device set forth in any of the first through seventeenth inventions includes both of the optoelectric element and the fisheye-type optical system respectively and an image splitting/image composite optical device that splits each light flux emitted from the two optoelectric elements for a right eyeball and a left eyeball and composites the split light flux emitted from a different optoelectric element for the right eyeball and the left eyeball respectively, and a switching member that switches the image splitting/image composite optical system between a state of an in-operation and a state of an out-of-service.

A twenty-second invention for achieving the above object is the image display device set forth in any of the first through twenty-first inventions and further includes at least one of an earthquake detecting sensor, a level measurement/level adjustment device and a fixed device.

A twenty-third invention for achieving the above object is the image display device set forth in any of the first through twenty-second inventions that further includes a timer device, and a movement device that moves the image display device in accordance with a timer device or an output of the timer device.

A twenty-fourth invention for achieving the above object is the image display device set forth in any of the first through twenty-third inventions, wherein an angle of divergence of light flux traveled from the intermediate image to the eyeball from the intermediate image has a larger angle than a scope of varying angles of incidence of all principle rays passing through a centre of a pupil of the eyeball upon the surface of forming the intermediate image when a position of a pupil of the eyeball varies due to a lateral shift of the eyeball.

A twenty-fifth invention for achieving the above object is the image display device set forth in any of the first through twenty-fourth inventions that further includes a light diffusion element of diffusing light at a position of forming the intermediate image or in proximity to its position.

A twenty-sixth invention for achieving the above object is the image display device set forth in the twenty-fifth invention, wherein the light diffusion element is a transparent diffusion substrate coated on a transparent substrate with a particle of a metal oxide or a metallic carbide with a particle diameter controlled by an order of a micron.

A twenty-seventh invention for achieving the above object is the image display device set forth in the twenty-sixth invention, wherein the particle is at least one of silicon carbide, chromic oxide, tin oxide, titanium oxide, magnesium oxide and aluminum oxide and the transparent diffusion substrate is a polyester film.

A twenty-eighth invention for achieving the above object is the image display device set forth in any of the first through twenty-seventh inventions, wherein a part of the image display device is capable of being placed at a contact with a face of a user and further at least the optoelectric element and the fisheye-type optical system are supported by a supporting member rather than a user and its supporting member supports an unit including the optoelectric element and the fisheye-type optical system movably in response to a movement of a user's face.

A twenty-ninth invention for achieving the above object is the image display device set forth in the twenty-eighth invention, wherein the supporting member is capable of moving around toward directions of six axes at will.

A thirtieth invention for achieving the above object is the image display device set forth in any of the twenty-eighth through twenty-ninth inventions, wherein a position of centre of gravity of the image display device or its proximity to the position is supported by the supporting member.

A thirty-first invention for achieving the above object is the image display device set forth in any of the twenty-eighth through thirtieth inventions, wherein the supporting member includes a plurality of articular structures members and weight members, and a flexible linking member that links the unit including the fisheye-type optical system and the optoelectric element to the weight member, and a holding member that is arranged at the articular structure and holds the linking member, wherein the linking member has low friction against a movement of the linking member.

A thirty-second invention for achieving the above object is the image display device set forth in any of the first through thirty-first inventions that further includes a reducing device of a sickness in Virtual Environment that detects an image of a moving landscape like a flowing landscape and processes the image such that the image looks still during a predetermined period of time.

A thirty-third invention for achieving the above object is the image display device set forth in the thirty-second invention that further includes a selection device that selects use or non-use of the reducing device of the sickness in Virtual Environment.

A thirty-fourth invention for achieving the above object is the image display device set forth in any of the thirty-second or thirty-third invention, wherein the reducing device of the sickness in Virtual Environment divides the image into an edge image block and a centre image block and computes an amount of a lateral shift in an image within each block during a predetermined period of time and judges that there is a hand shake or a lateral movement of an screen when an image of the edge image block and an image of the centre image block shift toward the same direction, and processes an image in such a way that makes a whole screen thereof look still by shifting the entire image by the same amount as a movement amount toward a direction opposite a direction of a moving image such that an image does not move laterally during a predetermined period of time.

A thirty-fifth invention for achieving the above object is a projection optical system that is arranged in front of a user and projects an image on an eyeball of a user, and has an angle of view of 60 degrees and over, wherein a closest optical element of optical elements constituting the projection optical system to the eyeball is an aspherical optical element of a single lens element and a far surface shape of the optical element from the eyeball has an aspherical shape of a Conic surface such that the light flux incident upon a pupil of the eyeball enters a far surface of the optical element from the eyeball approximately at right angles and a Conic coefficient of the Conic surface is less than −1.

A thirty-sixth invention for achieving the above object is the projection optical system set forth in the thirty-fifth invention, wherein a second optical element of optical elements constituting the projection optical system from the eyeball is made up of a single lens element and a far surface shape of the optical element from the eyeball has a shape such that the light flux incident upon a pupil of the eyeball enters a far surface of the optical element from the eyeball approximately at right angles.

A thirty-seventh invention for achieving the above object is the projection optical system set forth in the thirty-fifth invention, wherein the aspherical optical element is arranged at a position closest to the eyeball.

A thirty-eighth invention for achieving the above object is the projection optical system set forth in any of the thirty-fifth-through thirty-seventh inventions, wherein an angle of divergence of light flux traveled from the image to the eyeball from the image is larger than a scope of varying angles of incidence of all principle rays passing through a centre of a pupil of the eyeball upon the surface of forming the image when a position of a pupil of the eyeball varies due to a lateral shift of the eyeball.

A thirty-ninth invention for achieving the above object is an image display device that includes an optoelectric element of emitting light in a two-dimensional way having a display surface orthogonal to a direction of emitted light flux and a fisheye-type optical system that projects the light flux emitted from the optoelectric element inside at least one of eyeballs of a user and has an viewing angle of 60 degrees and over, wherein the image display device is worn in front of the eyeball and the fisheye-type optical system forms an intermediate image and a light diffusion element is arranged at a position of forming the intermediate image or in proximity to the position and at least one of optical elements arranged toward the eyeball from the position of forming the intermediate image is an aspherical optical element of which at least one surface has an aspherical shape of a Conic surface and the image display device further includes a supporting member that supports at least the fisheye-type optical system and the optoelectric element movably so as to follow a user's movement.

A fortieth invention for achieving the above object is an image display device that includes an optoelectric element to output image data and projects an image output from the optoelectric element on a retina inside at least one of eyes of a user via at least two reflection surfaces with a curved surface, wherein a first reflection surface with a curved surface shape that deflects light flux before entering an eyeball is a first elliptic mirror and a first focus point of the first elliptic mirror lies in proximity to a crystal ball of an eyeball and a second focus point of the first elliptic mirror lies between the first elliptic mirror and a second reflection surface with a curved surface, and a flat surface passing through a center of a line linking the first and second focus points orthogonal to the line and the reflection surface of the first elliptic mirror are configured to intersect.

A forty-first invention for achieving the above object is the image display device set forth in the fortieth invention, wherein the second reflection surface with the curved surface is a second elliptic mirror and an image on the optoelectric element is configured to be projected on the retina inside the eyeball by a correction optical system including the second elliptic mirror.

A forty-second invention for achieving the above object is the image display device set forth in any of the thirty-ninth or fortieth invention, wherein the second reflection surface with the curved surface is a second elliptic mirror and the position of the second focus point of the first elliptic mirror and the position of the first focus point of the second elliptic mirror are arranged so as to be substantially in alignment, and a flat surface that passes through a center of a line linking the first and second focus points of the second elliptic mirror and is orthogonal to the line and the reflection surface of the second elliptic mirror are configured to intersect.

A forty-third invention for achieving the above object is the image display device set forth in the forty-second invention, wherein the first and second focus points of the first elliptic mirror and the first and second focus points of the second elliptic mirror are arranged so as to line substantially in a straight line.

A forty-fourth invention for achieving the above object is the image display device set forth in the forty-second invention, wherein a fisheye-type optical system is arranged on an optical path between the second elliptic mirror and the optoelectric element.

A forty-fifth invention for achieving the above object is the image display device set forth in the forty-fourth invention, wherein the fisheye-type optical system includes a function that supplies light flux including image data to an image detection area of the retina due to a movement of the crystal ball responsive to a turn of the eyeball.

A forty-sixth invention for achieving the above object is the image display device set forth in any of the forty-second through forty-fifth inventions, wherein a correction optical system to correct a position of forming an image in a direction of an optical axis is arranged at a portion where the second focus point of the first elliptic mirror and the first focus point of the second elliptic mirror are configured to be substantially in alignment.

A forty-seventh invention for achieving the above object is the image display device set forth in any of the fortieth through forty-sixth inventions, wherein curvature of the first and second elliptic mirrors are substantially equal.

A forty-eighth invention for achieving the above object is the image display device set forth in any of the fortieth through forty-seventh inventions, wherein the image display device is configured to be arranged to at least one of the right eyeball and the left eyeball.

A forty-ninth invention for achieving the above object is an image display device made up of two image display devices set forth in any of the fortieth through forty-seventh inventions, wherein the two image display devices are separately arranged to a right eyeball and a left eyeball respectively and their positions thereof are made adjustable corresponding to a space between eyeballs.

A fiftieth invention for achieving the above object is the image display device set forth in any of the fortieth through forty-ninth inventions, wherein the optoelectric element is a liquid crystal display device of emitting light in a two-dimensional way perpendicular to a direction of emitted light flux.

A fifty-first invention for achieving the above object is an image display device that includes a first fisheye-type optical system that projects a predetermined wide image on a first optoelectric element of receiving light in a two-dimensional way perpendicular to a direction of receiving light flux, and an optical system that outputs image data received by the first optoelectric element from a second optoelectric element of emitting light in a two-dimensional way perpendicular to a direction of emitted light flux and projects an image output from the second optoelectric element on a retina inside at least one of eyeballs via a second fisheye-type optical system and a reflection surface with a curved surface.

A fifty-second invention for achieving the above object is the image display device set forth in the fifty-first invention, wherein the second fisheye-type optical system includes a function that supplies light flux including image data to an image detection area of the retina due to a movement of the crystal ball corresponding to a turn of the eyeball.

A fifty-third invention for achieving the above object is the image display device set forth in any of the fifty-first or fifty-second invention, wherein the reflection surface with the curved surface is arranged at a position substantially conjugate with the retina of the eyeball and is a curved surface that corrects deterioration of telecentricity produced by the second fisheye-type optical system.

A fifty-fourth invention for achieving the above object is the image display device set forth in any of the fifty-first or fifty-second invention, wherein the reflection surface with the curved surface is arranged at the position substantially conjugate with the retina of the eyeball and is a curved surface that corrects deterioration of telecentricity produced by the second fisheye-type optical system.

A fifty-fifth invention for achieving the above object is the image display device set forth in any of the fifty-first through fifty-fourth inventions, wherein the reflection surface with the curved surface is formed by a fθ-type mirror with at least two surfaces and optical axes of both fθ-type mirrors are made parallel with each other and a focus point of one of the fθ-type mirrors is arranged in proximity to the crystal ball of the eyeballs, and the other focus point thereof is arranged in proximity to the second fisheye-type optical system.

A fifty-sixth invention for achieving the above object is the image display device set forth in any of the fifty-first through fifty-fourth inventions, wherein the reflection surface with the curved surface is formed by a fθ-type mirror with at least two surfaces and optical axes of both fθ-type mirrors are made parallel with each other, and the image display device further includes functions that relay the focus point of one of fθ-type mirrors in proximity to the crystal ball of the eyeballs by way of a third fisheye-type optical system, and relay the other focus point thereof in proximity to the second optoelectric element by way of the second fisheye-type optical system.

A fifty-seventh invention for achieving the above object is the image display device set forth in any of the fifty-first through fifty-third inventions, wherein the reflection surface with the curved surface is formed by an elliptic mirror with at least two surfaces and one of the two focus points of the elliptic mirror with two surfaces is arranged substantially at the same position as that of the other thereof and all focus points are arranged substantially in a straight line.

A fifty-eighth invention for achieving the above object is an image display device made up of two image display devices set forth in any of the fifty-first through fifty-seventh inventions, wherein the two image display devices are separately arranged to right and left eyeballs respectively and a space between the two image display devices is made adjustable corresponding to a space between right and left eyes such that a space between the first fisheye-type optical systems of the two image display devices and a space between eyeballs become equal.

A fifty-ninth invention for achieving the above object is the image display device set forth in any of the fifty-first through fifty-seventh inventions, wherein the image display device is configured to be arranged to at least one of right and left eyeballs.

A sixtieth invention for achieving the above object is an image display device made up of two image display devices set forth in any of the fortieth through fifty-seventh inventions, wherein the two image display devices are separately arranged to right and left eyeballs respectively and their positions thereof are made adjustable corresponding to a spacing between eyeballs.

A sixty-first invention for achieving the above object is the image display device set forth in any of the fifty-first through sixtieth inventions, wherein the second optoelectric element is a liquid crystal display device of emitting light in a two-dimensional way.

A sixty-second invention for achieving the above object is the image display device set forth in any of the fifty-first through sixty-first inventions, wherein the first optoelectric element is an image sensor of receiving light in a two-dimensional way.

A sixty-third invention for achieving the above object is an image display device that includes functions that project a predetermined wide image on a first optoelectric element with a spherical surface of receiving light in a two-dimensional way perpendicular to a direction of receiving light flux and image data received by the first optoelectric element output from a second optoelectric element with a spherical surface of emitting light in a two-dimensional way perpendicular to a direction of emitted light flux, and project the image data on a retina inside at least one of eyeballs via a reflection surface with a curved surface.

A sixty-fourth invention for achieving the above object is the image display device set forth in the sixty-third invention, wherein the first optoelectric element includes a positive lens arranged on a spherical surface and an image sensor arranged on the spherical surface, and the second optoelectric element includes a positive lens arranged on a spherical surface and a display unit arranged on the spherical surface.

A sixty-fifth invention for achieving the above object is an image display device that includes a first fisheye-type optical system that projects a predetermined wide image on a first optoelectric element of receiving light in a two-dimensional way perpendicular to a direction of received light flux, and a control device that outputs image data received by the first optoelectric element from a second optoelectric element of emitting light in a two-dimensional way perpendicular to a direction of emitted light flux and implements a desired control when projecting the image data from the second optoelectric element on a retinal inside at least one of eyeballs via a second fisheye-type optical system.

A sixty-sixth invention for achieving the above object is the image display device set forth in the sixty-fifth invention, wherein the second fisheye-type optical system includes a function that supplies light flux including image data to an image detection area of the retina due to the crystal ball corresponding to a turn of the eyeball.

A sixty-seventh invention for achieving the above object is the image display device set forth in any of the sixty-fifth or sixty-sixth invention that further includes a reflection surface with a curved surface in the second fisheye-type optical system, wherein the reflection surface with the curved surface is arranged at a position substantially conjugate with the retina inside the eyeball and is a surface that corrects curvature of field produced by the second fisheye-type optical system.

A sixty-eighth invention for achieving the above object is the image display device set forth in any of the sixty-fifth or sixty-sixth invention that further includes a reflection surface with a curved surface that is arranged at a position substantially conjugate with the retina inside the eyeball in the second fisheye-type optical system, and that corrects deterioration of telecentricity produced by the second fisheye-type optical system.

A sixty-ninth invention for achieving the above object is the image display device set forth in any of the sixty-fifth through sixty-eighth inventions that further includes a fθ-type mirror with at least two surfaces, wherein optical axes of both fθ-type mirrors are made parallel with each other and a focus point of one of the fθ-type mirrors is arranged in proximity to the crystal ball inside at least one of eyeballs and the focus point of the other thereof is arranged in proximity to the second fisheye-type optical system.

A seventieth invention for achieving the above object is the image display device set forth in any of the sixty-fifth through sixty-eighth inventions that further includes a deflecting mirror between the second optical system and the retina inside at least one of eyeballs, wherein the deflecting mirror is formed by the fθ-type mirror with at least two surfaces and optical axes of both fθ-type mirrors are made parallel with each other, and functions that relay a focus point of one of fθ-type mirrors in proximity to the crystal ball of the eyeball by way of a third fisheye-type optical system and relay the focus point of the other thereof in proximity to the second optoelectric element by way of the second fisheye-type optical system.

A seventy-first invention for achieving the above object is the image display device set forth in any of the sixty-fifth through sixty-eighth inventions, wherein the deflecting mirror is formed by an elliptic mirror with at least two surfaces and one of two focus points of the two elliptic mirrors is arranged substantially at the same position as that of the other thereof and all focus points thereof are arranged substantially in a straight line.

A seventy-second invention for achieving the above object is the image display device set forth in any of the sixty-fifth through seventy-first inventions, wherein the control device includes at least any of a focus adjustment device to focus on the predetermined wide image or a device that controls a scope of outputting a wide image at will.

A seventy-third invention for achieving the above object is the image display device set forth in any of the sixty-fifth through seventy-second inventions, wherein the control device includes an image composite device that composites first image information input from an external other than the image display device and second image information input from the first optoelectric element and outputs information of the composite image from the second optoelectric element.

A seventy-fourth invention for achieving the above object is the image display device set forth in the seventy-third invention, wherein the image composite device includes functions that correct the first image information based upon information of distortion produced by the first fisheye-type optical system, and composite the corrected first image information and the second image information.

A seventy-fifth invention for achieving the above object is the image display device set forth in any of the seventy-third or seventy-fourth invention, wherein the first image information includes information of an image output from a video.

A seventy-sixth invention for achieving the above object is the image display device set forth in the seventy-fifth invention, wherein a video image input device that supplies the information of the output video image is fixed onto the image display device detachably.

A seventy-seventh invention for achieving the above object is the image display device set forth in any of the seventy-third through seventy-sixth inventions, wherein the first image information includes image information output from a computer.

A seventy-eighth invention for achieving the above object is the image display device set forth in any of the seventy-third through seventy-seventh inventions, wherein the first image information includes keyboard information input to a computer.

A seventy-ninth invention for achieving the above object is the image display device set forth in any of the seventy-third through seventy-eighth inventions, wherein the first image information includes information input to a portable keyboard attached to a hand.

An eightieth invention for achieving the above object is the image display device set forth in the seventy-ninth invention, wherein the information input to the portable keyboard includes image information obtained by detecting information of an electromagnetic element attached to a thumb with an electromagnetic detection sensor attached to other fingers and converting the information of the electromagnetic element into information of a distance and direction between the thumb and the other fingers.

An eighty-first invention for achieving the above object is the image display device set forth in any of the seventy-ninth or eightieth invention, wherein the information input to the portable keyboard includes image information obtained by detecting information of each finger's pressure against an object with a pressure detection sensor attached to each finger and converting the information of each finger's pressure into recognizable information as an image.

An eighty-second invention for achieving the above object is the image display device set forth in any of the seventy-third through eighty-first inventions, wherein the first image information includes image information made up of a character into which a voiced or non-voice sound input to a microphone or headphone is converted.

An eighty-third invention for achieving the above object is an image display device made up of two image display devices set forth in any of the sixty-third through eighty-second inventions, wherein the two image display devices are separately arranged to right and left eyeballs respectively and a space between both image display devices is made adjustable corresponding to a space between right and left eyeballs such that a space between the first fisheye-type optical systems of the two image display devices and a space between eyeballs are made equal.

An eighty-fourth invention for achieving the above object is the image display device set forth in any of the sixty-third through eighty-second inventions, wherein the image display device is arranged to at least one of right and left eyeballs.

An eighty-fifth invention for achieving the above object is an image display device made up of two image display devices set forth in any of the sixty-third through eighty-second inventions, wherein the two image display devices are separately arranged to right and left eyeballs respectively and their positions thereof are made adjustable corresponding to a space between eyeballs.

An eighty-sixth invention for achieving the above object is the image display device set forth in any of the sixty-third through eighty-fifth inventions, wherein at least the second optoelectric element is separately arranged to right and left eyeballs, and the first optoelectric element and the first fisheye-type optical system are shared for right and left eyeballs.

An eighty-seventh invention for achieving the above object is the image display device set forth in the eighty-sixth invention, wherein information input to the first optoelectric element is converted into information of a position corresponding to width of both eyes and the position information is output to the second optoelectric element for both eyes as different information corresponding to each eye.

An eighty-eighth invention for achieving the above object is an image display device that includes a control device that controls an image from a first optoelectric element which is to be formed by projecting and forming light emitted from a first optoelectric element of emitting light in a two-dimensional way perpendicular to a direction of emitted light flux on a retinal inside at least one of eyeballs via a first fisheye-type optical system and a reflection surface with a curved.

An eighty-ninth invention for achieving the above object is the image display device set forth in the eighty-eighth invention, wherein the first fisheye-type optical system includes a function that supplies light flux including image data to an image detection area of a retina due to a movement of a crystal ball corresponding to a turn of the eyeball.

A ninetieth invention for achieving the above object is the image display device set forth in any of the eighty-eighth or eighty-ninth invention, wherein the reflection surface with the curved surface is arranged at a position substantially conjugate with the retina inside at least one of eyeballs and is a curved surface that corrects curvature of field produced by the first fisheye-type optical system.

A ninety-first invention for achieving the above object is the image display device set forth in any of the eighty-eighth or eight-ninth invention, wherein the reflection surface with the curved surface is arranged at a position almost conjugate with a retina of an eyeball and is a curved surface that corrects deterioration of telecentricity produced by the first fisheye-type optical system.

A ninety-second invention for achieving the above object is the image display device set forth in any of the ninetieth or ninety-first invention that further includes a f$\theta$-type mirror with at least two surfaces, wherein optical axes of both f$\theta$-type mirrors are made parallel and a focus point of one of the f$\theta$-type mirrors is arranged in proximity to the crystal ball of the eyeball and the focus point of the other thereof is arranged in proximity to the first fisheye-type optical system.

A ninety-third invention for achieving the above object is the image display device set forth in any of the eighty-eighth through ninety-first inventions that further includes a deflecting mirror between the first fisheye-type optical system and the retina inside the eyeball, wherein the deflecting mirror is formed by a f$\theta$-type mirror with at least two surfaces and optical axes of both f$\theta$-type mirrors are made parallel with each other, and includes functions that relay a focus point of one of f$\theta$-type mirrors in proximity to the crystal ball of the eyeball by way of a third fisheye-type optical system and relay the focus point of the other thereof in proximity to the first optoelectric element by way of the second fisheye-type optical system.

A ninety-fourth invention for achieving the above object is the image display device set forth in any of the eighty-eighth through ninety-first inventions that further includes a deflecting mirror between the first fisheye-type optical system and the retina of the eyeball, wherein the deflecting mirror is formed by an elliptic mirror with at least two surfaces and one of two focus points of the two elliptic mirrors is arranged substantially at the same position as that of the other thereof and all focus points are arranged substantially in a straight line.

A ninety-fifth invention for achieving the above object is the image display device set forth in any of the eighty-eighth through ninety-fourth inventions, wherein the control device includes at least any of a focus adjustment device to focus on the predetermined wide image or a device that controls an output scope of a wide image at will.

A ninety-sixth invention for achieving the above object is the image display device set forth in any of the eighty-eighth through ninety-fifth inventions, wherein the control device includes an image composite device that composites first image information and second image information different from the first image information and outputs information of a composite image from the first optoelectric element.

A ninety-seventh invention for achieving the above object is the image display device set forth in any of the eighty-eighth through ninety-fifth inventions, wherein the control device includes functions that optically composites first image information output from the first optoelectric element and second image information output from the second optoelectric element and projects, and forms the composite image on the retina inside the eyeball.

A ninety-eighth invention for achieving the above object is the image display device set forth in any of the ninety-sixth or ninety-seventh invention, wherein the control device corrects at least one of the first image information and the second image information based upon information of distortion produced by the first fisheye-type optical system and then composites the corrected image information.

A ninety-ninth invention for achieving the above object is the image display device set forth in any of the ninety-fifth through ninety-eighth inventions, wherein at least one of the first image information and the second image information includes information of at least one of images output from a video, a DVD and a high vision.

A hundredth invention for achieving the above object is the image display device set forth in any of the ninety-fifth through ninety-ninth inventions, wherein at least one of the first image information and the second image information includes image information output from a computer.

A hundred-first invention for achieving the above object is the image display device set forth in any of the ninety-fifth through hundredth inventions, wherein at least one of the first image information and the second image information includes keyboard information input to a computer.

A hundred-second invention for achieving the above object is the image display device set forth in any of the ninety-fifth through hundred-first inventions, wherein at least one of the first image information and the second image information includes information input to a portable keyboard attached to a hand.

A hundred-third invention for achieving the above object is the image display device set forth in the hundred-second invention, wherein the portable keyboard input information includes image information obtained by detecting information of an electromagnetic element attached to a thumb with an electromagnetic detection sensor attached to other fingers and converting the information of the electromagnetic element into information of the distance/direction between the thumb and the other fingers.

A hundred-fourth invention for achieving the above object is the image display device set forth in any of the hundred-second or hundred-third invention, wherein the portable keyboard input information includes image information obtained by detecting information of each finger's pressure against an object with a pressure detection sensor attached to each finger and converting the information of each finger's pressure into recognizable information as an image.

A hundred-fifth invention for achieving the above object is the image display device set forth in any of the hundred-second or hundred-fourth invention, wherein at least one of the first image information and the second image information includes image information made up of text into which a voiced or non-voice sound input to a microphone or headphone is converted.

A hundred-sixth invention for achieving the above object is an image display device made up of two image display devices set forth in any of the eighty-eighth through hundred-fifth inventions, wherein the two image display devices are separately arranged to right and left eyeballs respectively and a space between both image display devices is made adjustable corresponding to a space between right and left eyeballs such that a space between the first fisheye-type optical systems of the two image display devices and a space between eyeballs are made equal.

A hundred-seventh invention for achieving the above object is the image display device set forth in any of the eighty-eighth through hundred-fifth inventions, wherein the image display device is arranged to at least one of right and left eyeballs.

A hundred-eighth invention for achieving the above object is an image display device that includes a control device that controls an image output from the first optoelectric element which is to be formed by projecting and forms light emitted from a first optoelectric element of emitting light in a two-dimensional way perpendicular to a direction of emitted flux on a retinal of an eyeball via the first fisheye-type optical system inclusive of a relay optical system, wherein the control device includes at least any of a focus adjustment device to focus on the predetermined wide image or a device that controls an output scope of the wide image at will and the wide image has an viewing angle with 60 degrees and over.

A hundred-ninth invention for achieving the above object is the image display device set forth in the hundred-eighth invention, wherein the first fisheye-type optical system includes a function that supplies light flux including image data to an image detection area of the retina due to a movement of the crystal ball corresponding to a turn of an eyeball.

A hundred-tenth invention for achieving the above object is the image display device set forth in any of the hundred-eighth or hundred-ninth invention, wherein the first fisheye-type optical system includes at least one of a hyperboloid lens or a rotationally symmetric lens with a two-dimensional curved surface.

A hundred-eleventh invention for achieving the above object is the image display device set forth in the hundred-eighth through hundred-tenth inventions, wherein the relay optical system includes at least one of the hyperboloid lens or the rotationally symmetric lens with the two-dimensional curved surface.

A hundred-twelfth invention for achieving the above object is the image display device set forth in the hundred-eleventh invention, wherein the hyperboloid lens or the rotationally symmetric lens with the two-dimensional curved surface of the relay optical system is arranged in proximity to a pupil position.

A hundred-thirteenth invention for achieving the above object is the image display device set forth in any of the hundred-eighth through hundred-twelfth inventions, wherein the relay optical system includes at least one curved surface mirror that corrects telecentricity.

A hundred-fourteenth invention for achieving the above object is the image display device set forth in any of the hundred-eighth through hundred-thirteenth inventions, wherein the image display device is arranged to at least one of right and left eyeballs.

A hundred-fifteenth invention for achieving the above object is the image display device set forth in any of the hundred-eighth through hundred-fourteenth inventions, wherein the control device includes an image composite device that composites first image information and second image information different from the first image information and outputs information of a composite image from the first optoelectric element.

A hundred-sixteenth invention for achieving the above object is the image display device set forth in any of the hundred-seventh through hundred-fifth inventions, wherein the control device includes functions that optically composites first image information output from the first optoelectric element and the second image information output from the second optoelectric element and projects and forms a composite image on the retina inside the eyeball.

A hundred-seventeenth invention for achieving the above object is the image display device set forth in any of the hundred-fifteenth through hundred-sixteenth inventions, wherein the control device corrects at least one of the first image information and the second image information based upon information of distortion produced by the first fisheye-type optical system and then composites the corrected image information.

A hundred-eighteenth invention for achieving the above object is the image display device set forth in any of the hundred-fifteenth through hundred-seventeenth inventions, wherein at least one of the first image information and the second image information includes information of at least one of images output from a video, a DVD and a high vision.

A hundred-nineteenth invention for achieving the above object is the image display device set forth in any of the hundred-fifteenth through hundred-eighteenth inventions, wherein at least one of the first image information and the second image information includes image information output from a computer.

A hundred-twentieth invention for achieving the above object is the image display device set forth in any of the hundred-fifteenth through hundred-nineteenth inventions, wherein at least one of the first image information and the second image information includes keyboard information input to a computer.

A hundred-twenty-first invention for achieving the above object is the image display device set forth in any of the hundred-fifteenth through hundred-twentieth inventions, wherein at least one of the first image information and the second image information includes information input to a portable keyboard attached to a hand.

A hundred-twenty-second invention for achieving the above object is the image display device set forth in the hundred-twenty-first invention, wherein the portable keyboard input information includes image information obtained by detecting information of an electromagnetic element information attached to a thumb with an electromagnetic detection sensor attached to other fingers and converting the information of the electromagnetic element into information of a distance/direction between the thumb and the other fingers.

A hundred-twenty-third invention for achieving the above object is the image display device set forth in any of the hundred-twentieth or hundred-twenty-first invention, wherein the portable keyboard input information includes image information obtained by detecting information of each finger's pressure against an object with a pressure detection sensor attached to each finger and converting the information of each finger pressure into recognizable information as an image.

A hundred-twenty-fourth invention for achieving the above object is the image display device set forth in any of the hundred-fifteenth through hundred-twenty-third inventions, wherein at least one of the first image information and the second image information includes image information made up of text into which a voice sound or a non-voice sound input to a microphone or headphone is converted.

A hundred-twenty-fifth invention for achieving the above object is an image display device made up of two image display devices set forth in any of the hundred-fifteenth through hundred-twenty-fourth inventions, wherein the two image display devices are separately arranged to right and left eyeballs respectively and a space between both image display device is made adjustable corresponding to a space between right and left eyeballs such that a space between the first fisheye-type optical systems of the two image display devices and a spacing between eyeballs are made equal.

A hundred-twenty-sixth invention for achieving the above object is the image display device made up of one image display device set forth in any of the hundred-fifteenth through hundred-twenty-fourth inventions, wherein the single image display device is divided to right and left eyeballs respectively by an optical member and a space between projected images of each of the first optical fisheye-type optical system is made adjustable corresponding to a space between a right eye and a left eye such that a space between the first fisheye-type optical systems separately arranged to split light flux and a space between eyes are made equal.

A hundred-twenty-seventh invention for achieving the above object is the image display device set forth in any of the hundred-eighth through hundred-twenty-sixth inventions that further includes a light diffusion member that is arranged on an image-formed surface arranged on an optical path of an optoelectric member of outputting the image data and a crystal ball and that diffuses light, wherein at least a part of the first fisheye-type optical system lets diffused transmitting light converge in proximity to a crystal ball and an image of a subject be formed on a retina.

A hundred-twenty-eighth invention for achieving the above object is the image display device set forth in the hundred-twenty-seventh invention, wherein the light diffusion member of diffusing the light is a transparent diffusion substrate that is coated on a transparent substrate with a particle of a metal oxide or a metallic carbide of a particle diameter controlled by an order of a micron.

A hundred-twenty-ninth invention for achieving the above object is the image display device set forth in the hundred-twenty-eighth invention, wherein the particle is at least one of silicon carbide, chromic oxide, tin oxide, titanium oxide, magnesium oxide and aluminum oxide and the transparent diffusion substrate is a polyester film.

A hundred-thirtieth invention for achieving the above object is the image display device set forth in any of the fortieth through hundred-twenty-ninth inventions, wherein at least a part of the image display device is supported by a member rather than the user and is placed at a contact with the user's face, and is made movable in response to a movement of the user's face.

A hundred-thirty-first invention for achieving the above object is the image display device set forth in the hundred-thirtieth invention, wherein at least a part of the image display device is made capable of moving toward any of directions of six axes.

A hundred-thirty-second invention for achieving the above object is the image display device set forth in the hundred-thirty-first invention, wherein the image display device is supported at a position of centre of gravity of the image display device or in proximity to its position capable of moving toward directions of six axes at will.

A hundred-thirty-third invention for achieving the above object is the image display device set forth in the hundred-thirty-first or hundred-thirty-second invention that further includes a weight member that balances the body of the image display device, a flexible string member that links the body of the image display device and the weight member, and a pulley in order to enable the image display device to move toward directions of six axes at will.

A hundred-thirty-fourth invention for achieving the above object is the image display device set forth in any of the hundred-eighth through hundred-thirty-third inventions, wherein a unit controlling an output area of the wide image at will is an optical zoom device of a variable magnification of 2× and over and controls such that a composite image composited by the first image information and the second image information does not overlap over a predetermined width corresponding to a state of a zoom.

A hundred-thirty-fifth invention for achieving the above object is the image display device set forth in the hundred-eighth through hundred-thirty-fourth inventions, wherein the unit controlling the output area of the wide image at will includes a detection member that detects an moving image of a landscape flowing on an observer's line of vision and a storage member that processes the image such that the image does not move during a predetermined period of time and stores the processed image.

A hundred-thirty-sixth invention for achieving the above object is the image display device set forth in the hundred-eighth through hundred-thirty-fifth inventions, wherein the unit controlling an output area of the wide image at will includes a selection member that freely selects use or non-use of the detection member and processing/storage member at will.

A hundred-thirty-seventh invention for achieving the above object is the image display device set forth in the hundred-thirty-fifth or hundred-thirty-sixth invention, wherein the detection member and the storage member take image data into an internal buffer and divide an image output from the internal buffer into a marginal image block and a center image block and computes an amount in a lateral shift within a block for a predetermined period of time and judges whether the shift is attributed to a hand shake or a lateral movement of a screen when the marginal image and center image are shifted in the same direction, and process the image in such a way that makes an overall screen look still by shifting an overall image bit by the same amount as a movement amount in a direction opposite a direction of an image movement such that the image does not move laterally for the predetermined period of time.

A hundred-thirty-eighth invention for achieving the above object is an image display device made up of two image display devices set forth in any of the hundred-fifteenth through hundred-twenty-fourth inventions, wherein these two image display devices include an image splitting/composite device that supplies an image to right and left eyeballs respectively by splitting and compositing the image, and a switching device that switches over the image splitting/composite device of supplying the image separately to right and left eyeballs respectively.

A hundred-thirty-ninth invention for achieving the above object is the image display device set forth in any of the hundred-thirtieth through hundred-thirty-fifth inventions, wherein a part of the image display device includes at least one of an earthquake detecting sensor, a level measuring/adjustment device and a fixed device.

A hundred-fortieth invention for achieving the above object is the image display device set forth in any of the hundred-thirtieth through hundred-thirty-third inventions or the hundred-thirty-ninth invention, wherein a part of the image display device includes at least one of a timer device and a movement device that moves an image display section in accordance with an output of the timer device.

BRIEF DESCRIPTION OF DRAWINGS

FIG. 26 is a view showing an example in more detail about a case where an image is optically composited with a half mirror. Ninety-first (91) is an output image of VGA liquid crystal element for field of view of a left eye, ninety-second (92) an output image of VGA liquid crystal element for field of view of a left eye and ninety-third (93) a composite image that can be viewed by a retina of field of view of the left eye.

FIG. 45 is a view showing aberrations corresponding to characteristics shown in FIG. 44. (a), (b) and (c) represent spherical aberration, astigmatism and distortion from a left side.

FIG. 46 is a view showing an example of an optical system that relays light flux from an output surface of LCD to a diffusion glass. (b) shows aberrations in which spherical aberration, a stigmatism and distortion are shown from a left side.

FIG. 47 is a view showing an example of an optical system that relays light flux from an output surface of LCD to a diffusion glass. (b) shows aberrations in which spherical aberration, a stigmatism and distortion are shown from a left side.

FIG. 49 is a view showing a comparison table of a conventional product vs. a product of this invention.

BEST MODE FOR CARRYING OUT THE INVENTION

Figure 1:
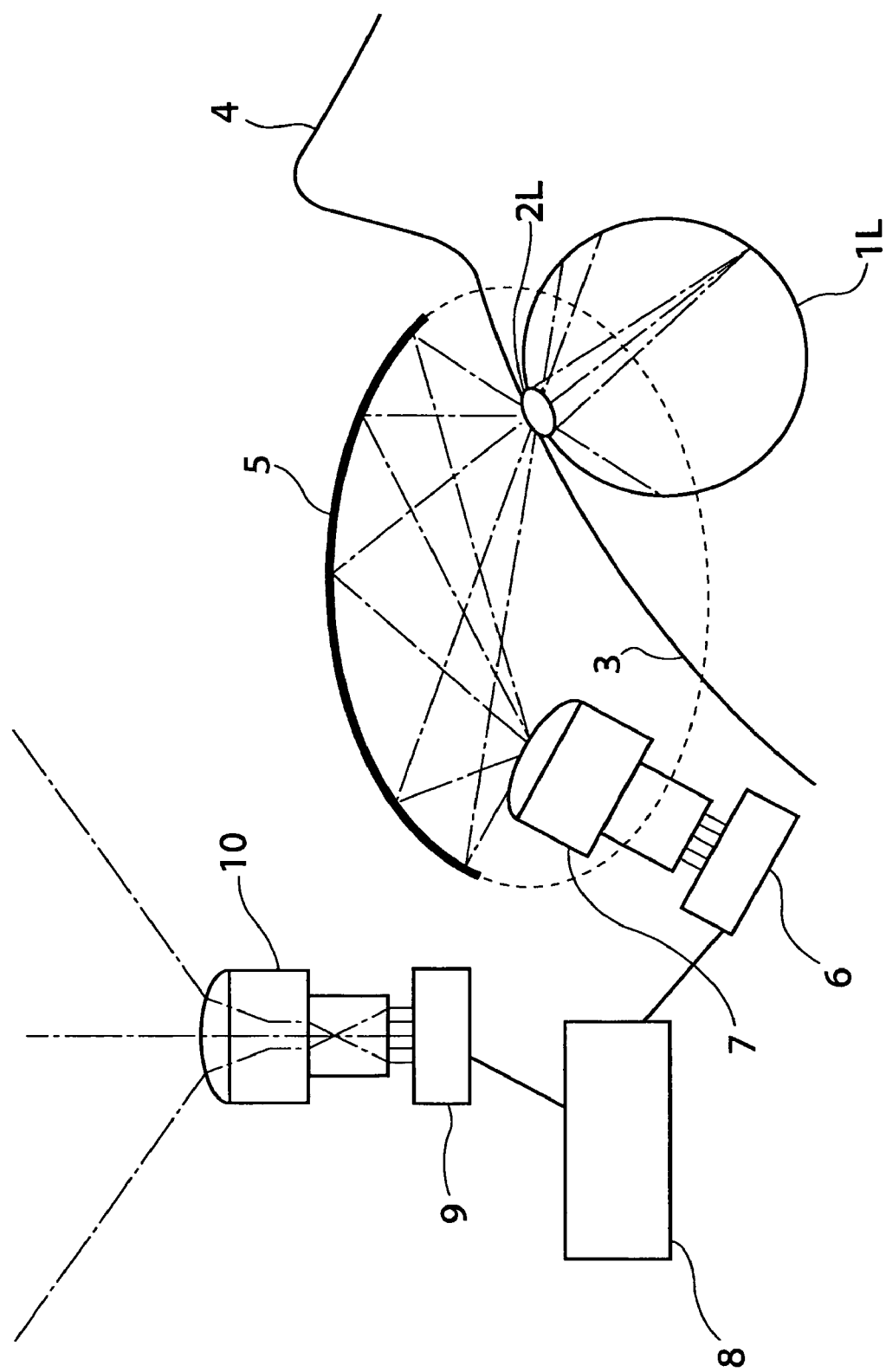
FIG. 1 is a schematic view showing a first embodiment of this invention.

An example of a preferred embodiment of this invention will be described hereunder referring to accompanying diagrams. FIG. 1 is a schematic diagram showing a first embodiment of this invention, wherein FIG. 1 is a cross-sectioned view taking a top view of a head of a user and shows a left side of a head, wherein contour 3 of a face, left eyeball 1L and nose 4 beside left eye crystalline lens 2L are depicted at a lower right thereof. An upper area of the figure has a broad field of view and a wide image from a broad field of view is formed on CCD two-dimensional array sensor 9 with first fisheye-type optical system 10. In this case, first fisheye-type optical system 10 has a wide angle of view and converts light flux from an object in the field of view into thin light flux, and then forms an image of the object on CCD two-dimensional array sensor 9.

A fisheye-type optical system referred to in the specifications and claims means an optical system in general that can produce a wider angle of view than a range of field of view with which a user can clearly grasp a color and its detail of an object and includes not only a so-called fisheye lens (has an angle of view of 180 degrees against a diagonal line of a screen) but also a wide-angle lens (covers diagonally 60 to 90 degrees) and an ultra wide-angle lens (covers diagonally 90 degrees and over), and a standard lens with an angle of view of 30 degrees and over. As a preferred embodiment of this invention, a lens with an angle of view of 90 degrees and over against a diagonal line is desirable.

In other words, the fisheye-type optical system set forth in the specifications and claims means an optical system capable of getting wide field-of-view information in a broad sense against a general projection optical system and includes a special optical system etc with astigmatism including an aspherical lens, a cylindrical lens etc, not to mention a typical wide-angle lens and a fisheye lens. Furthermore, elliptical mirror includes a special elliptical mirror that has astigmatism of a different curvature in a lateral line and vertical lines and a mirror elliptical toward only a direction of one axis etc and thus, an explanation in the specifications and claims will be given on the assumption of the foregoing.

An image formed on CCD two-dimensional array sensor 9 is output to liquid crystal display-type two-dimensional output device 6 as output image information by image processing device 8. Liquid crystal type two-dimensional output device 6 is illuminated by a backlight, wherein light is emitted from a pixel equivalent to an image corresponding to the output image information. This light, as light flux to diverge again at a large angle by second fisheye-type optical system 7, diverges from a virtual focal point. This diverging light flux is deflected with three-dimensional elliptical mirror 5, but an optical system is arranged such that the virtual focal point is positioned in proximity to a first focal point of three-dimensional elliptical mirror 5, so the diverging light flux converges in proximity to a second focal point of three-dimensional elliptical mirror 5.

There is left-eye crystalline lens 2L of left eyeball 1L in proximity to the second focal point and as a result, a wide image is formed on a retina of left eyeball 1L as a projection image. The reason why left-eye crystalline lens 2L is positioned in proximity to the second focal point is that a pupil position of an optical system is made approximately in alignment with a pupil position of an eyeball and vignetting is reduced.

Namely, an image pattern formed on a surface of liquid crystal display-type two-dimensional output device 6 is formed on a retina as an image extending over an effective whole field area of a retina or an area nearly equal to the effective whole field area of the retina. Accordingly, an image of a viewing angle covering the effective whole field area of the retina or the area nearly equal to the effective whole field area of the retina can be formed.

Also, as seen from FIG. 1, a surface passing through a middle point of a line linking both focal points of three-dimensional elliptical mirror 5 and being orthogonal to the line is configured to intersect a reflection surface of three-dimensional elliptical mirror 5. The above-described arrangement makes it possible to get a broad reflection surface of three-dimensional elliptical mirror 5 and to reflect all light dispersed and emitted from CCD two-dimensional array sensor 9 or most thereof, and thereby to cause the light to converge in proximity to the second focal point.

By the way, a word "proximity" set forth in the description of "the virtual focal point is positioned in proximity to a first focal point of three-dimensional elliptical mirror 5" and "There is left eye crystalline lens 2L of left eyeball 1L in proximity to the second focal point" means as follows. When the image display device has an viewing angle of 60 degrees and over, if an extent of a loss by the vignetting is not any problem substantially, it is not necessary that the virtual focal point and left eye crystalline lens 2L be exactly positioned at a focal point and although a position relationship between the second focal point and the crystalline lens deviates with attachment of the image display device, this order of a deviation is tolerable.

In the specifications and claims of this invention, it should be noted that the word "in proximity to the focal point" is used with such the meaning unless otherwise described.

In FIG. 1, to make two focal points of three-dimensional elliptical mirror 5 clearly understood, a part of an ellipse that in fact does not exist is depicted with a broken line. In diagrams below, such the depiction will be adopted when referring to a reflection mirror.

In the preferred embodiment as shown in FIG. 1, as seen from light flux, an angle of the light flux inside left eyeball 1L is different from the one of corresponding light flux of second fisheye type optical system 7. That is, large distortion occurs. Taking this distortion into account, image processing device 8 performs a digitized correction on an image output from liquid crystal two-dimensional output device 6 in response to input information of CCD two-dimensional array sensor 9 and thereby a faithful image can be projected onto a retina inside left eyeball 1L.

But, a typical CCD two-dimensional array sensor and a liquid crystal two-dimensional output device are aggregation of a limited light receiving element and liquid crystal element and if the digitized correction is made, a part of the compressed distortion has information forcibly expanded, so resolving power falls off and a faithful image cannot be obtained.

Figure 2:
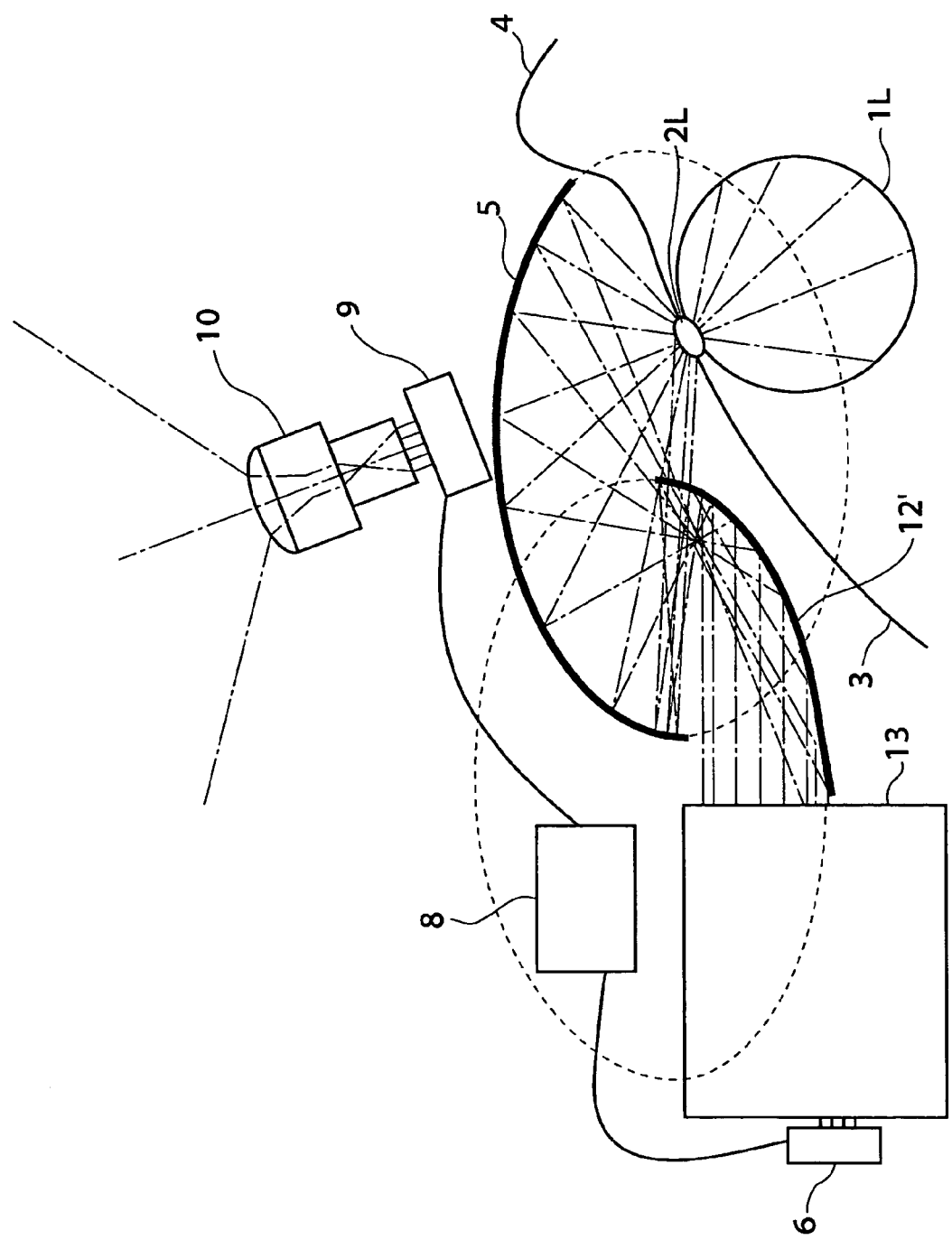
FIG. 2 is a schematic view showing a second embodiment of this invention.

A schematic view of a second preferred embodiment of this invention to avoid such the shortcoming is shown in FIG. 2. In diagrams below, the same components as in FIG. 1 denote the same references, but their explanations are omitted in some case. As a matter of explanatory convenience, there are some that the same component uses a different reference. Also, to show "for a left eye", "L" is affixed at the end of numeral and other text and for a right eye, "R" is affixed in the same way, and in the event that a thing is the same and it is common in both eyes, there is a case where the thing is described without L and R.

This embodiment does not put second fisheye-type optical system 7 into the first focal point of three-dimensional elliptical mirror 5 directly, but a virtual dispersing light source is provided at this focal part. With first fisheye-type optical system 10, a wide image from a wide field of view is compressed and a projection image is formed on CCD two-dimensional array sensor 9. In this case, first fisheye-type optical system 10 has a wide-angle field of view and converts light flux from an object in the field of view into thin light flux and thereby has an image of the object formed on CCD two-dimensional array sensor 9.

The image formed on CCD two-dimensional array sensor 9 is output to liquid crystal two-dimensional output device 6 by image processing device 8. Liquid crystal two-dimensional output device 6 is illuminated by a backlight and light is emitted from a pixel equivalent to an image in correspondence to output image information. This light is made parallel light flux via distortion correcting optical system 13 including fθ lens and is reflected by fθ mirror 12, and thereby becomes light flux passing through its focal point. A position of the focal point of the fθ mirror is so placed as to be in alignment with a position of the second focal point of three-dimensional elliptical mirror 5.

Consequently, light emitted from liquid crystal two-dimensional output device 6 becomes dispersing light from a focal point of fθ mirror 12, that is, the second focal point of three-dimensional elliptical mirror 5, and the dispersing light is reflected at a wide angle of dispersion by three-dimensional elliptical mirror 5, and converges in proximity to a position of left-eye crystalline lens 2L of left eyeball 1L arranged in proximity to the first focal point and thereby an image is formed on left eyeball 1L at a wide angle. Thus, an eyeball receives the light flux from liquid crystal two-dimensional output device 6, so the eyeball receives information output from CCD two-dimensional array sensor 9. Distortion correcting optical system 13 is an optical system that has a function to correct such the distortion produced by three-dimensional elliptical mirror 5.

In this case, although the distortion produced by three-dimensional elliptical mirror 5 is corrected by distortion correcting optical system 13, it is quite difficult for only distortion correcting optical system 13 to correct distortion produced by first fisheye-type optical system 10 and thus, with image processing device 8, a faithful image gets obtained by a digitized distortion correction.

A "fθ mirror" referred to in the specifications and claims is a mirror in a broad sense in that light flux emitted from a light source is made parallel light flux and is used herein as a generic name of a mirror with such the effect.

Figure 3:
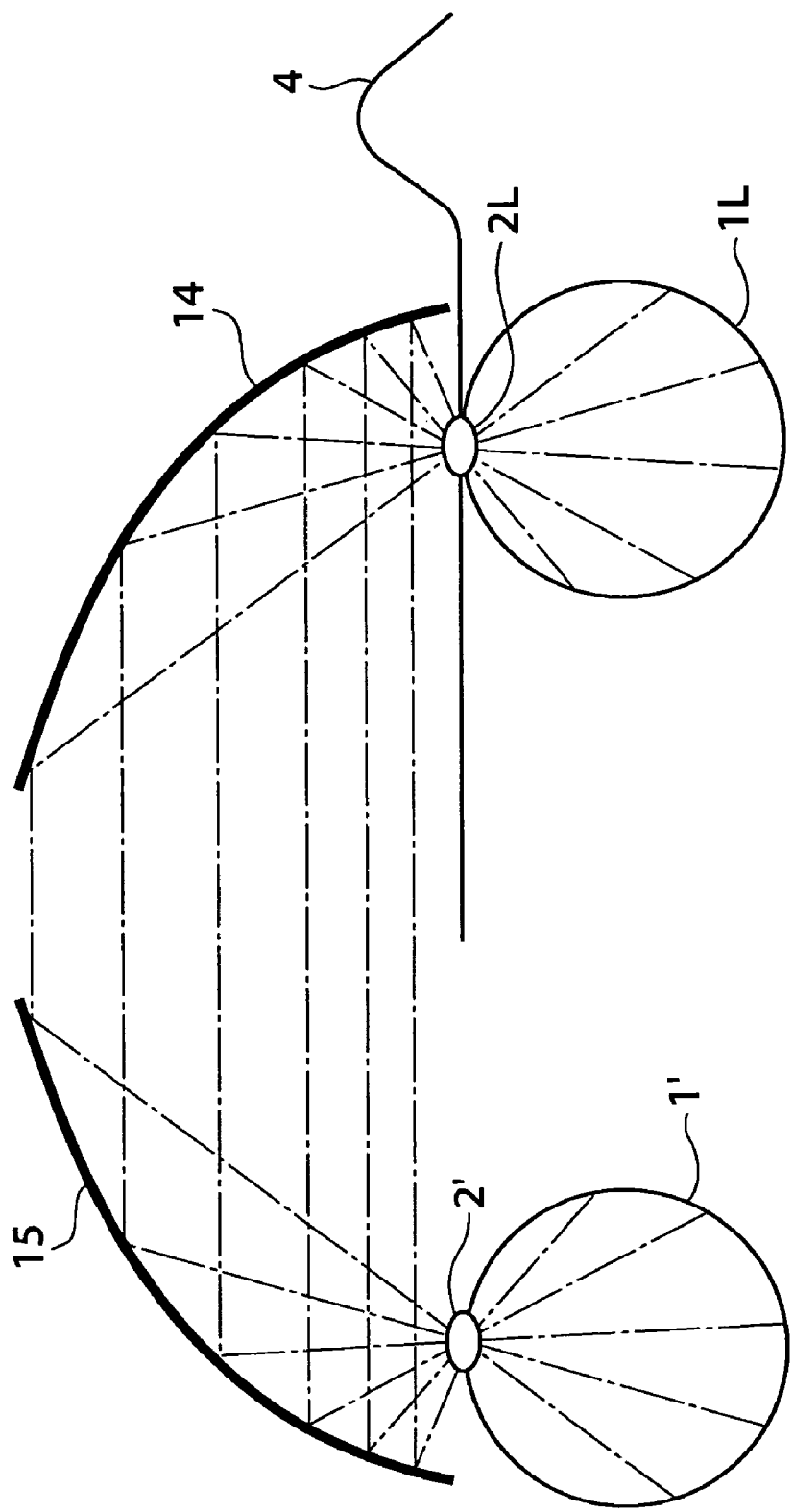
FIG. 3 is a view showing a principle of a third embodiment of this invention.

FIG. 3 shows a principle of a third preferred embodiment of this invention. In FIG. 3, the fθ mirrors are configured to face one another in place of first three-dimensional elliptical mirror 5 shown in FIG. 2 and two focal points are created using first fθ mirror 15 and second fθ mirror 14. When a first focal point (a focal point of first fθ mirror 15) is arranged in proximity to crystalline lens 2' of virtual eyeball 1' and a second focal point (a focal point of second fθ mirror 14) is arranged in proximity to left-eye crystalline lens 2L of left eyeball 1L, it can be seen that internal light flux of virtual eyeball 1' and left eyeball 1L becomes the same light flux reversed in axis symmetry with respect to Y-axis (an axis that lies at right angles to a line linking focal points of two fθ mirrors and passes through a midpoint of these two focal points). In FIG. 3, optical axes of first fθ mirror 15 and second fθ mirror 14 are made in alignment with each other, but it is sufficient to make these axes parallel and thus alignment is not necessarily required.

Figure 4:
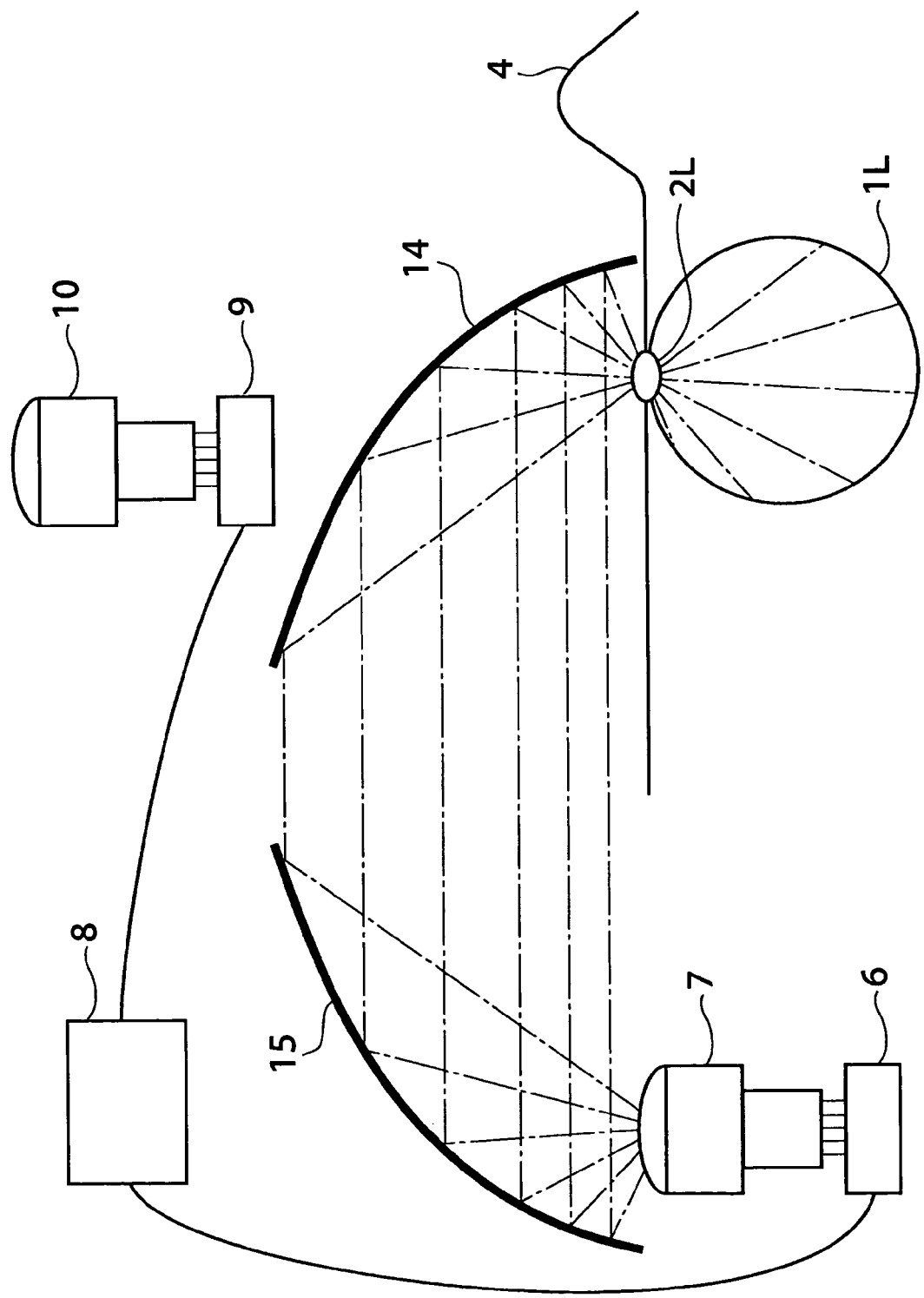
FIG. 4 is a schematic view showing a third embodiment of this invention.

A schematic overview of a third embodiment of this invention applying this principle is shown in FIG. 4, wherein there is a wide view area in an upper part of FIG. 4 and with first fisheye-type optical system 10, a wide image from a wide view is compressed and a projection image is formed on CCD two-dimensional array sensor 9. In this case, first fisheye-type optical system 10 has a wide-angle field of view and converts light flux from an object in the field of view into thin light flux, and thereby an image of the object is formed on CCD two-dimensional array sensor 9.

The image formed on CCD two-dimensional array sensor 9 is output to liquid crystal two-dimensional output device 6 as output image information by image processing device 8. Liquid crystal two-dimensional output device 6 is illuminated by a backlight and light is emitted from a pixel equivalent to the image in correspondence to the output image information. This light is dispersed as light flux to be dispersed again at a large angle with second fisheye-type optical system 7. Thus, second fisheye-type optical system 7 is arranged such that a virtual focal point of this second fisheye-type optical system 7, that is, a point of emitting light, matches a position of a focal point of first fθ mirror 15.

Consequently, light emitted from second fisheye-type optical system 7 is reflected in a broad range of first fθ mirror 15 and thereby becomes parallel light flux, and then the parallel light flux enters second fθ mirror 14. As optical axes of first fθ mirror 15 and second fθ mirror 14 are in alignment with one another, this incident light converges at a focal point of second fθ mirror 14. Left-eye crystalline lens 2L of left eyeball 1L lies in proximity to this focal point, so the converged light passes through a crystalline lens and then a reversed image with the same broadening as the virtual focal point is formed on a retina of left eyeball 1L. Therefore, a faithful image can be obtained at the same angle as an effective viewing angle or a wide angle close to this effective angle. This arrangement produces only distortion due to a manufacturing and attachment errors and an image hardly gets deteriorated thanks to a digitized correction. It is ideal that optical axes of first fθ mirror 15 and second fθ mirror 14 are made in alignment with one another, but the same effect can be obtained as far as they are parallel.

However, in this third embodiment, as shown in FIG. 4, second fθ mirror 14 is not allowed to extend over so much to a left side of FIG. 4, so there is a limit to field of view capable of receiving light in a direction opposite to nose 4, and also when a movement of eyeball 1 is put into consideration, it is turned out that a part of a wide image seen by a user gets vignetted.

Figure 5:
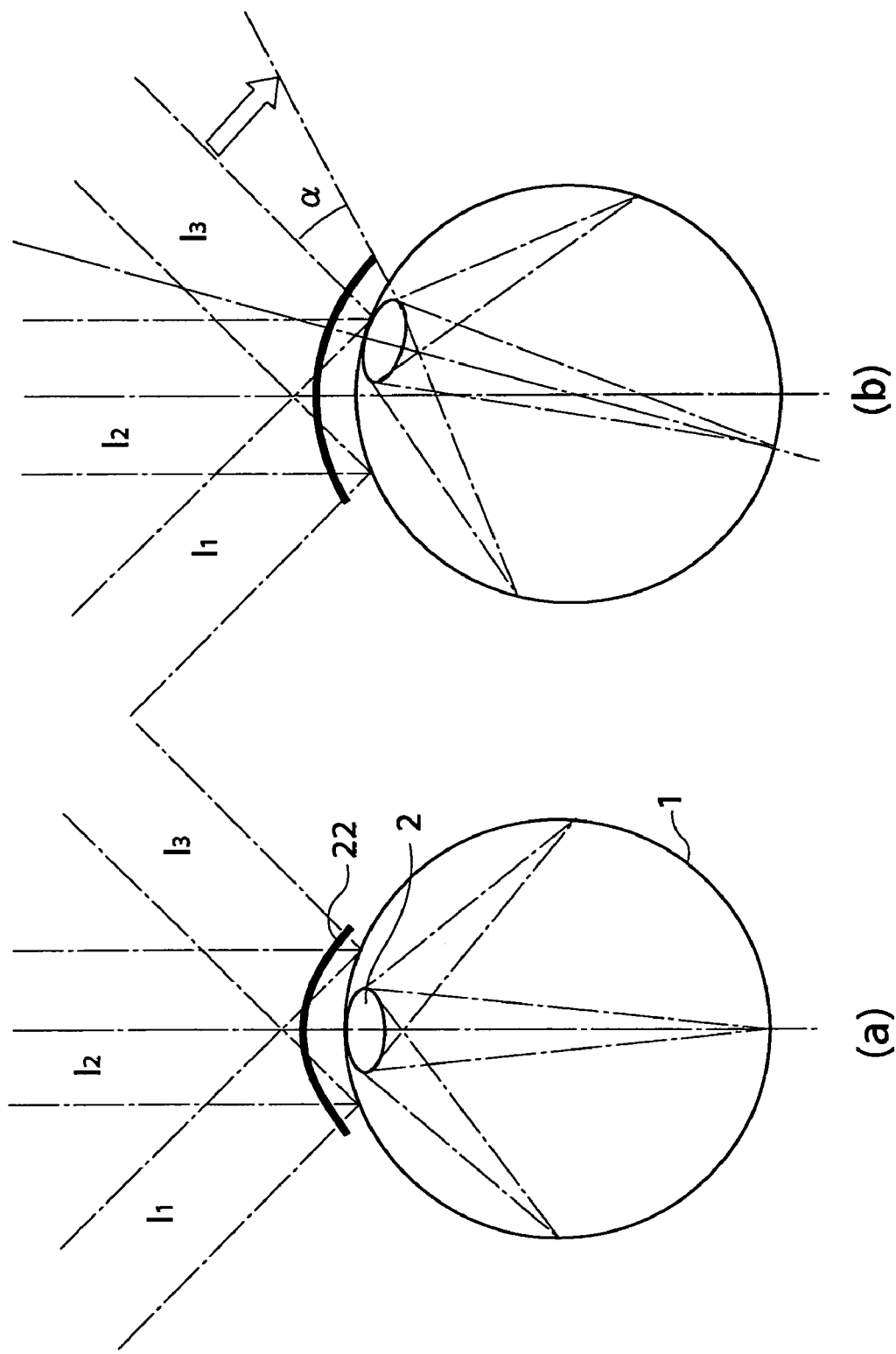
FIG. 5 is a view showing a range of image information that can be seen when an eyeball turns.

This is illustrated in FIG. 5. FIG. 5 (*a*) illustrates a case where the movement of eyeball 1 is not taken into consideration and it is enough to consider only field of view of a range indicated by reference numeral 22. Not only light flux 12 entering from a front side but also light flux 11 and 13 entering from an oblique direction fully cover a range of crystalline lens 2. But, when the movement of eyeball 1 is taken into consideration, the range of field of view broadens out to a range indicated by reference numeral 22 of FIG. 5 (*b*). FIG. 5 (*b*) is a view showing that an eyeball turns clockwise and in this case, there is no light flux entering from a direction indicated by α therein in the field of view, so it is turned out that this part becomes blind and thereby, a part of field of view is lacked.

Figure 6:
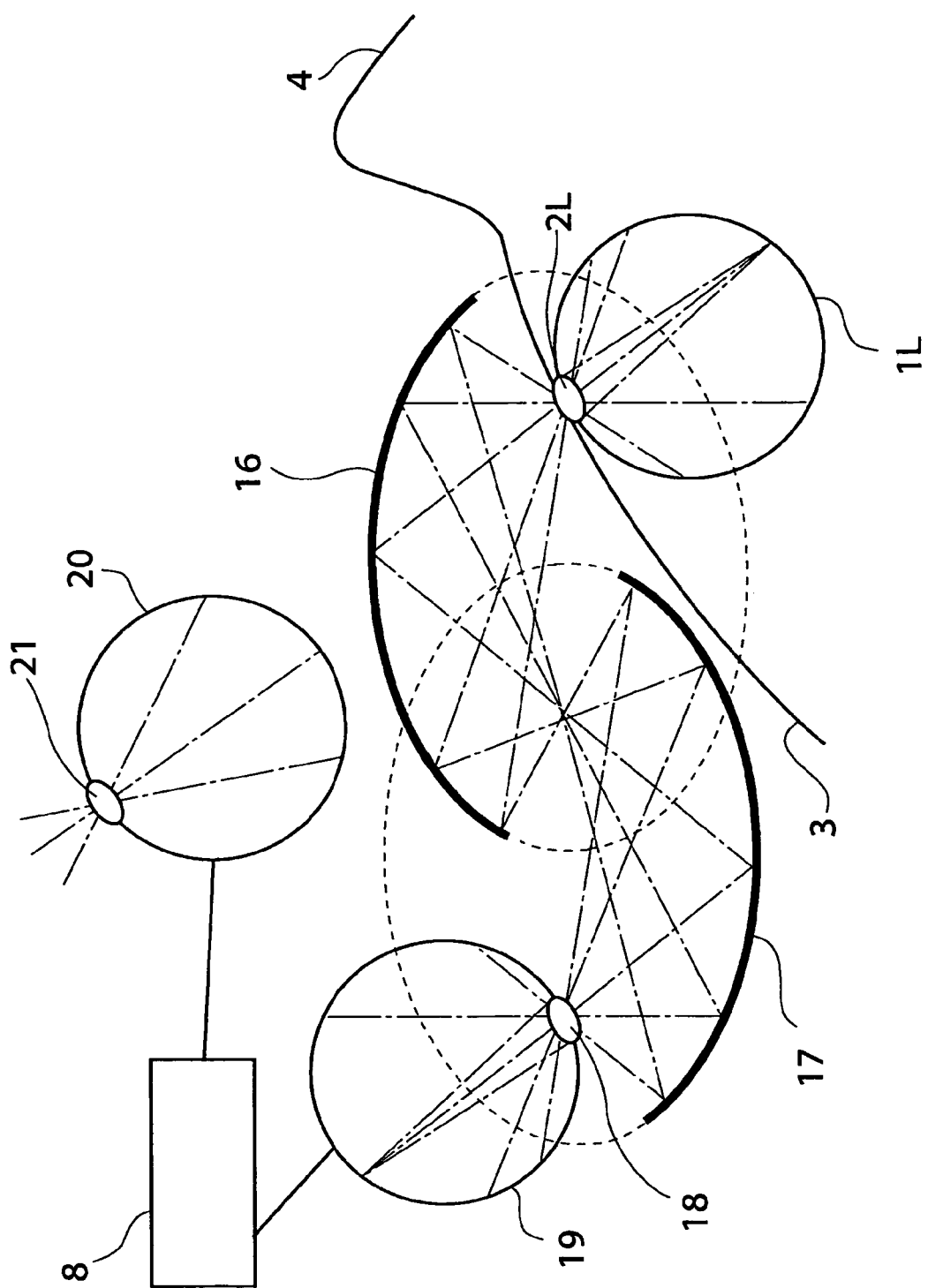
FIG. 6 is a schematic view showing a principle of a fourth embodiment of this invention.

A principle of a fourth embodiment to solve such the problem is shown in FIG. 6. In FIG. 6, to show the most ideal example, with lens 21 and spherical surface-type CCD light receiving sensor 20 that artificially duplicate an eyeball structure of a human being, a wide image is received by a CCD element inside the spherical surface as it is. As an output from image processing device 8, information output from spherical surface-type CCD light receiving sensor 20 emits a liquid crystal image intact as diffusing light flux from spherical surface-type liquid crystal device 19 that artificially duplicates the eyeball structure of the human being via lens 18 of the same performance as lens 21.

Light flux entering lens 21 is duplicated as the light flux that has the completely same optical path as one of light flux emitted from lens 18. When this diffusing light flux can be precisely duplicated on left-eye crystalline lens 2L of left eyeball 1L, information of a wide area field of view entering lens 21 turns out to become exactly equivalent to image information entering within left-eye crystalline lens 2L, and thereby it is turned out that almost no distortion is produced. To realize this, the fourth embodiment uses two elliptical mirrors 17 and 16.

Namely, a first focal point of first elliptical mirror 17 is arranged in proximity to lens 18 and a second focal point of first elliptical mirror 17 is configured to be in alignment with a first focal point of second elliptical mirror 16 and further a second focal point of second elliptical mirror 16 is arranged in proximity to left-eye crystalline lens 2L. Then, the focal points of these elliptical mirrors are arranged in a straight line and a flat surface passing through a centre of a line linking the first and second focal points of first elliptical mirror 17 and being orthogonal to this line and a reflection surface that deflects light flux of first elliptical mirror 17 are configured to intersect.

As a result, light flux within left eyeball section 1L and light flux within spherical surface-type liquid crystal device 19 becomes equivalent to each other, so the diffusing light flux emitted from lens 18 can be precisely duplicated on left-eye crystalline lens 2L of left eyeball 1L. It is not necessary that such conditions be filled completely, but distortion and other aberrations get deteriorated by an amount of non-filled conditions. So, when optimum conditions are not filled owing to a designing restriction etc, it is desirable that a digitized distortion correction be performed. Herein, an elliptical mirror is used and more particularly, an elliptical mirror that has a broad reflection surface such that a flat surface passing through the centre of the line linking the first and second focal points of first elliptical mirror 17 and being orthogonal to this line and a reflection surface to deflect light flux of first elliptical mirror 17 intersect is used.

This arrangement makes it possible to input information from a wide area field of view into left-eye crystalline lens 2L. Thus, the information from the wide area field of view entering lens 21 can be duplicated in the end as it is on a retina of left eyeball 1L via left-eye crystalline lens 2L and a faithful image can be obtained across a broad viewing angle. And as seen from a comparison of FIGS. 4 and 6, in a case of FIG. 6, a necessary viewing angle can be obtained even if left eyeball 1L turns and moves since a sufficient broad field of view can be secured on a left side of left eyeball 1L.

Figure 7:
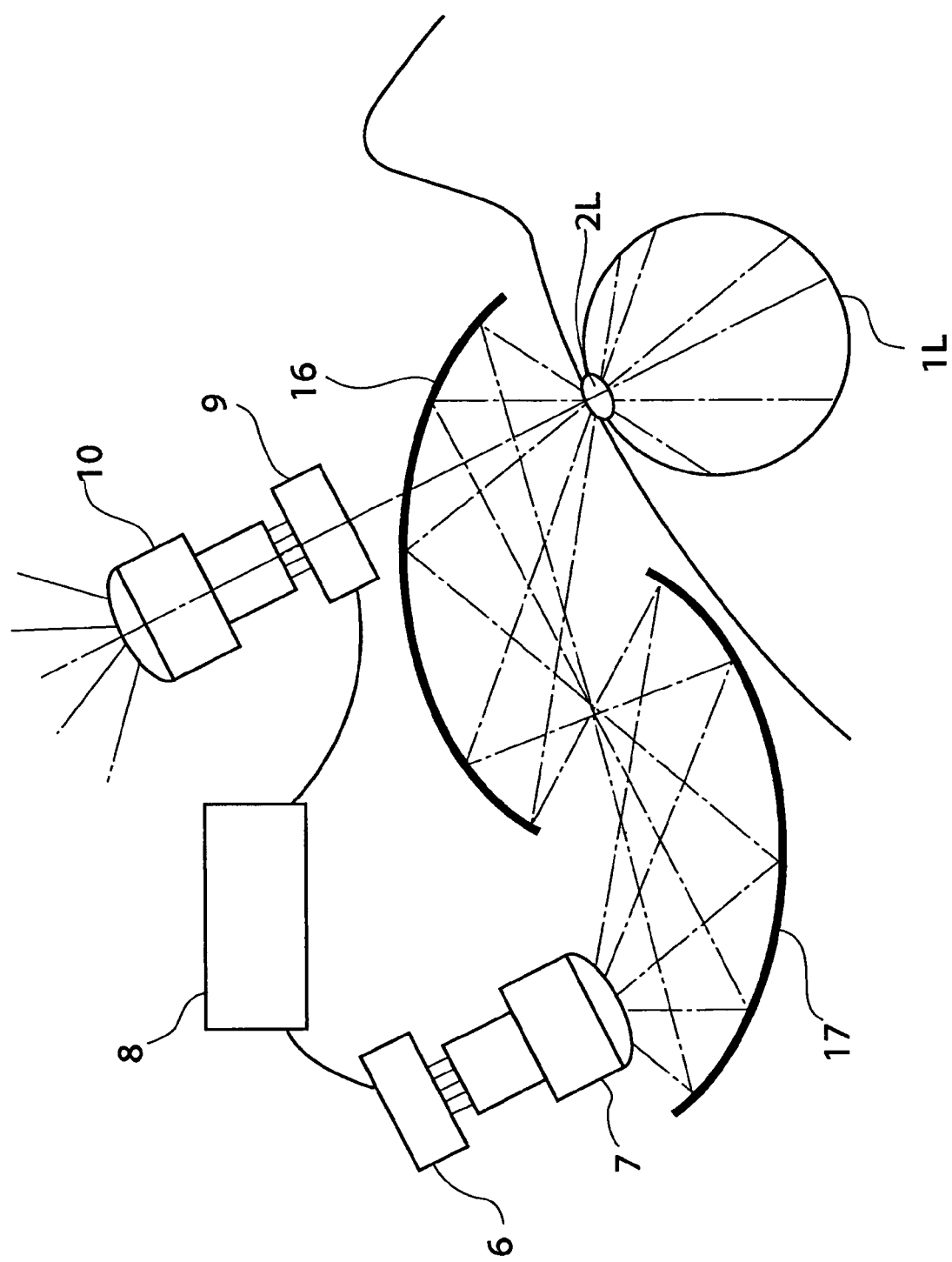
FIG. 7 is a schematic view showing a fifth embodiment of this invention.

However, it is difficult to design spherical surface-type CCD light sensor 20 and spherical surface-type liquid crystal device 19 and it is expected that a manufacturing cost will be greatly increased. Therefore, as a modification example of the first through third embodiments of this invention, a fifth embodiment of this invention is proposed and its overview is shown in FIG. 7. This embodiment adopts fisheye-type optical systems 10 and 7 of almost the same characteristics, and also CCD two-dimensional array sensor 9 and liquid crystal two-dimensional output device 6 of almost the same characteristics such as an effective field of view etc. Even when there is a difference in the effective field of view, it is possible to adjust by differentiating projection magnifications of fisheye-type optical systems 10 and 7, but it is desirable that distortion characteristics be met as much as possible. Namely, a retina of a human's eyeball has high sensitivity and resolving power at its centre thereof, but the sensitivity and resolving power are low at an edge thereof. Thus, if only a shape and movement of a thing can be observed at the edge thereof, this observed information works well as information sufficient to perceive. Therefore, by way of first fisheye-type optical system 10, a wide area field of view information due to characteristics that exaggerate information at its centre and compress information at its edge is projected on CCD two-dimensional array sensor 9 with a flat surface and is stored and this information is emitted from liquid crystal-type two-dimensional output device 6 with a flat surface and is restored again by second fisheye-type optical system 7 of the same characteristics as first fisheye-type optical system 10, and then image information is sent to crystalline lens 2L via first and second elliptical mirrors 17 and 16. This arrangement makes it possible to faithfully form wide area field-of-view information without lack of data at the central portion and with small distortion on a retina inside left eyeball 1L.

As a fisheye lens herein, it is most effective to employ a nonlinear fisheye lens of which a deformation of distortion is small within 60 degrees of an viewing angle, which is the highest frequency of usage in a human being's eye, and that compresses an image lying at an order of an angle of right/left 30 degrees around the 60-degree area. An eye's effective viewing angle in upwards/downwards directions is smaller than that of a lateral direction. And thus, when a short side of a rectangle is set in a longitudinal direction and a long side thereof is set in a lateral direction as a way of arranging CCD two-dimensional array sensor 9 and liquid crystal two-dimensional output device 6, it is good to be able to obtain a high resolving power.

Figure 8:
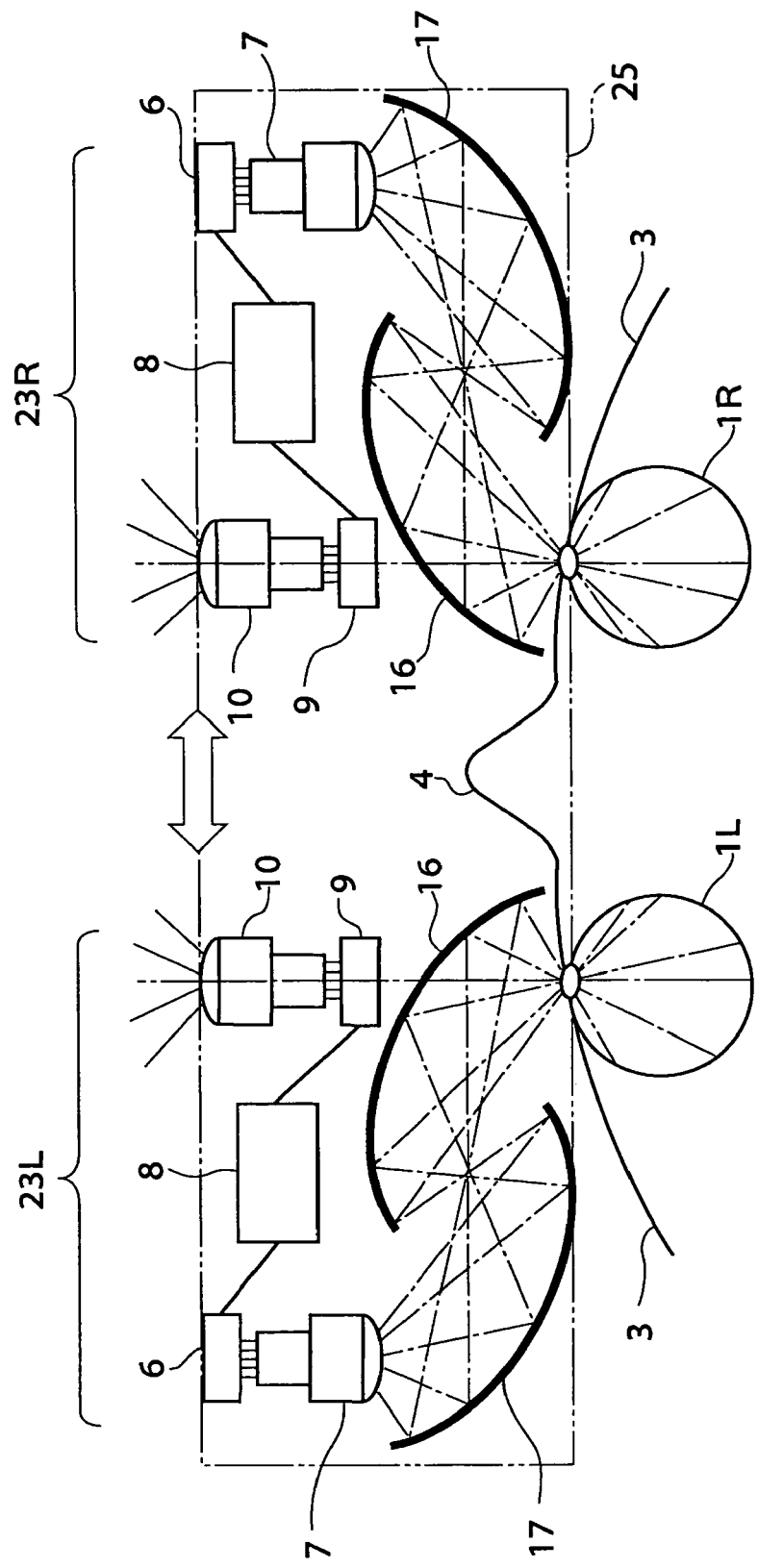
FIG. 8 is a schematic view showing a sixth embodiment of this invention.

An image display device for both eyes will be described hereunder with an example of an application that modifies the fifth embodiment as shown in FIG. 8, but it is obviously needless to explain that this modification can also apply to the preferred first through fourth embodiments.

FIG. 8 is a schematic view showing a sixth embodiment of this invention of a binoculars-type image display device wherein the image display device of the fifth embodiment is provided for not only left eyeball 1L but also right eyeball 2L. An image display device for left eyeball 1L is denoted by reference numeral 23L and the same for right eyeball 1R is done by reference numeral 23R. It is a matter of course that there is a difference in spacing between both eyeballs in a human being and when this spacing difference cannot be corrected, viewing gets deteriorated and we feel uncomfortable. In this embodiment, an internal component is completely independent, so image display device cover 25 is configured such that spacing between image display devices 23L and 23R is made precisely adjustable as shown by an arrow corresponding to spacing between both eyeballs set at a boundary of a centre.

Also, in this configuration, a light receiving section of wide area field-of-view is arranged such that spacing between first fisheye-type optical systems 10 is made equal to spacing between centers of both eyeballs. Namely, when image information is independently provided from image display device 23L to left eyeball 1L and also is provided from image display device 23R to right eyeball 1R independently, this information that is obtained by a human being is perceived as three-dimensional information. Then, if first fisheye-type optical systems 10 and CCD two-dimensional array sensors 9 of both image display devices 23L and 23R are adjusted in a separating direction, a 3-D effect of an image is increased and its effect becomes high when the increased effect is used in a video game etc. Like this, the spacing is configured to be adjustable depending upon usage. When first fisheye-type optical system 10 or CCD two-dimensional array sensor 9 interferes with second elliptical mirror 16, a position of arranging first fisheye-type optical system 10 or CCD two-dimensional array sensor 9 may be above or below second elliptical mirror 16 or be removed as needed. Image display device cover 25 is so designed as to be removable.

Figure 9:
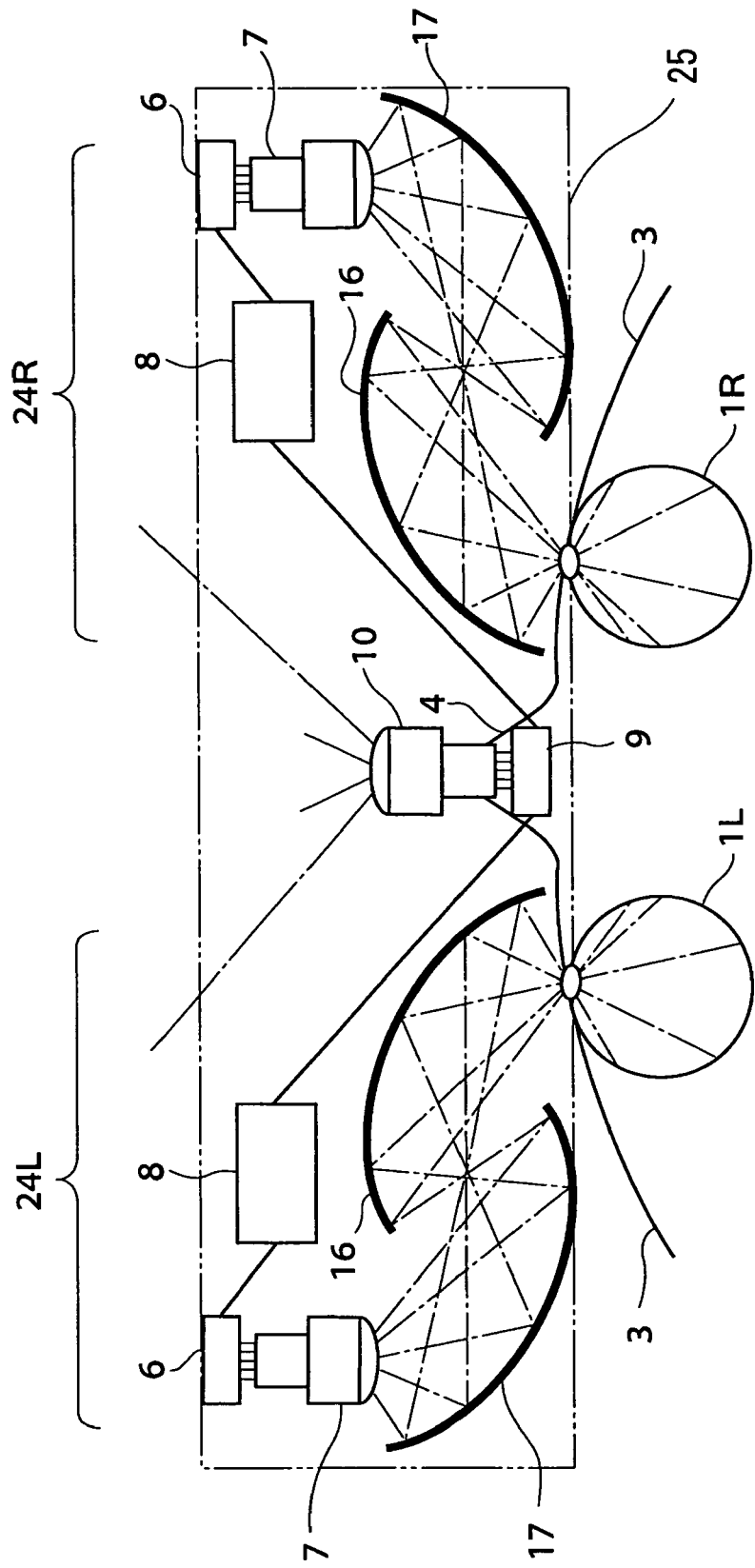
FIG. 9 is a schematic view showing a seventh embodiment of this invention.
Figure 10:
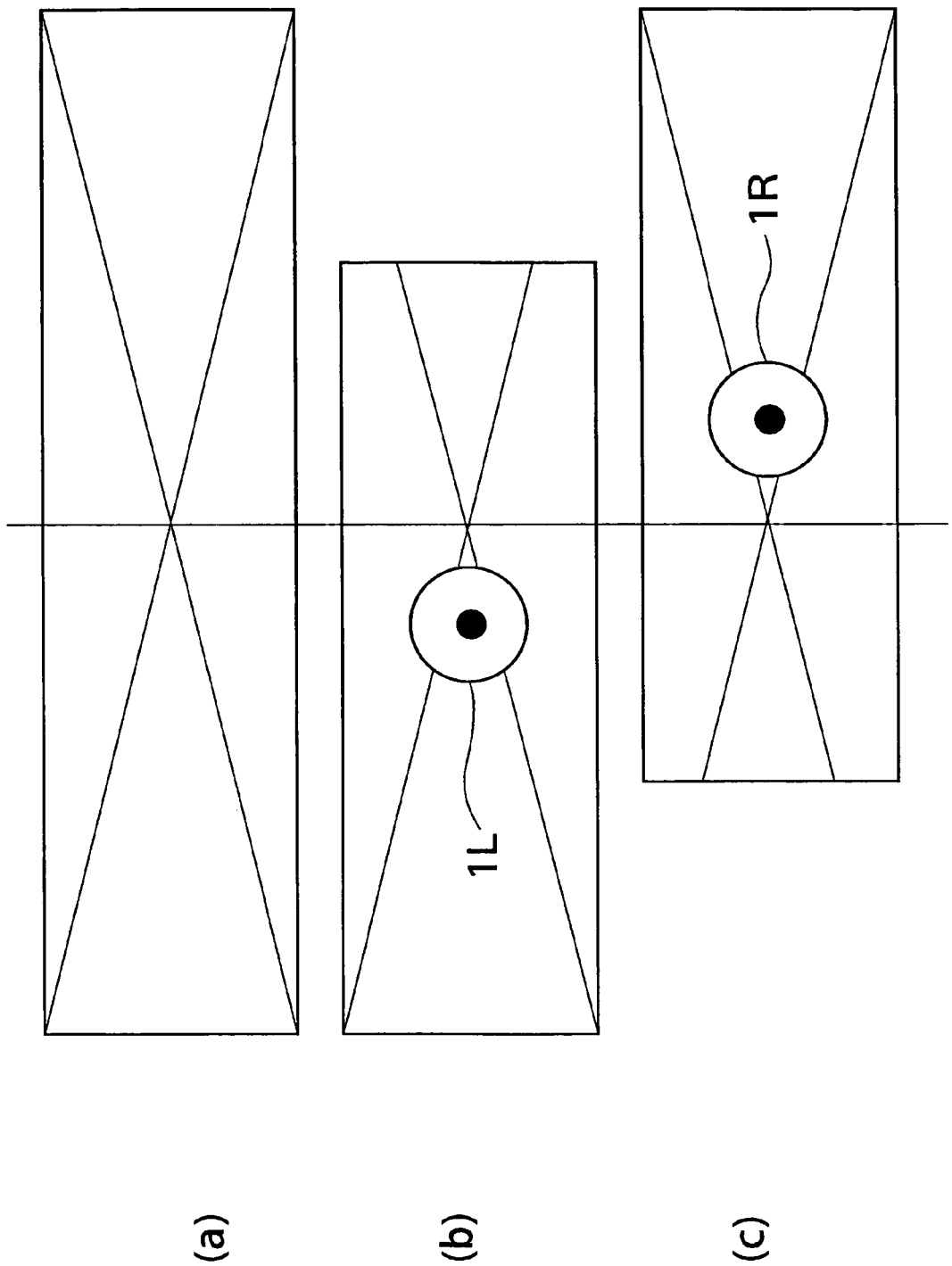
FIG. 10 is an explanatory view when converting image input information of the seventh embodiment into image output information, wherein (a) shows an image of receiving light, (b) output image of liquid crystal type two-dimensional output device 6 of 24L and (c) output image of liquid crystal type two-dimensional output device 6 of 24R.

The sixth preferred embodiment as shown in FIG. 8 is a device that can provide a three-dimensional image, but when the device is used for viewing still information like news papers, magazines etc as image information, there is no need for a three-dimensional image. In this case, as FIG. 9 shows as a seventh preferred embodiment of this invention, first fisheye-type optical system 10 and CCD two-dimensional array sensor 9 may be doubled as image display devices 24L and 24R. This arrangement makes the device compact and affordable. But, in this case, as shown in FIG. 10, it is necessary that different information be provided to image display devices 24L and 24R as image information that puts offset corresponding to spacing between both eyeballs and a distance to an object into image information received by CCD two-dimensional array sensor 9.

Namely, even if an image captured by CCD two-dimensional array sensor 9 looks like (a), an image of image display device 24L for a left eye is shifted toward a left side and a point of meeting at a position of left eyeball 1L becomes a centre and thereby, a field of view at a right side gets lacked. Contrary to this, an image of image display device 24R for a right eye is shifted toward a right side and a point of meeting at a position of right eyeball 1R becomes a centre and thereby, a field of view at a left side gets lacked. With this arrangement, an image can be clearly reproduced if a focus control corresponding to a distance to the object is performed at the same time even when the object observed with CCD two-dimensional array sensor 9 is at a near side and an illusion that the object is far away can be given to an observer, and this arrangement is useful for preventing eye fatigue.

Figure 11:
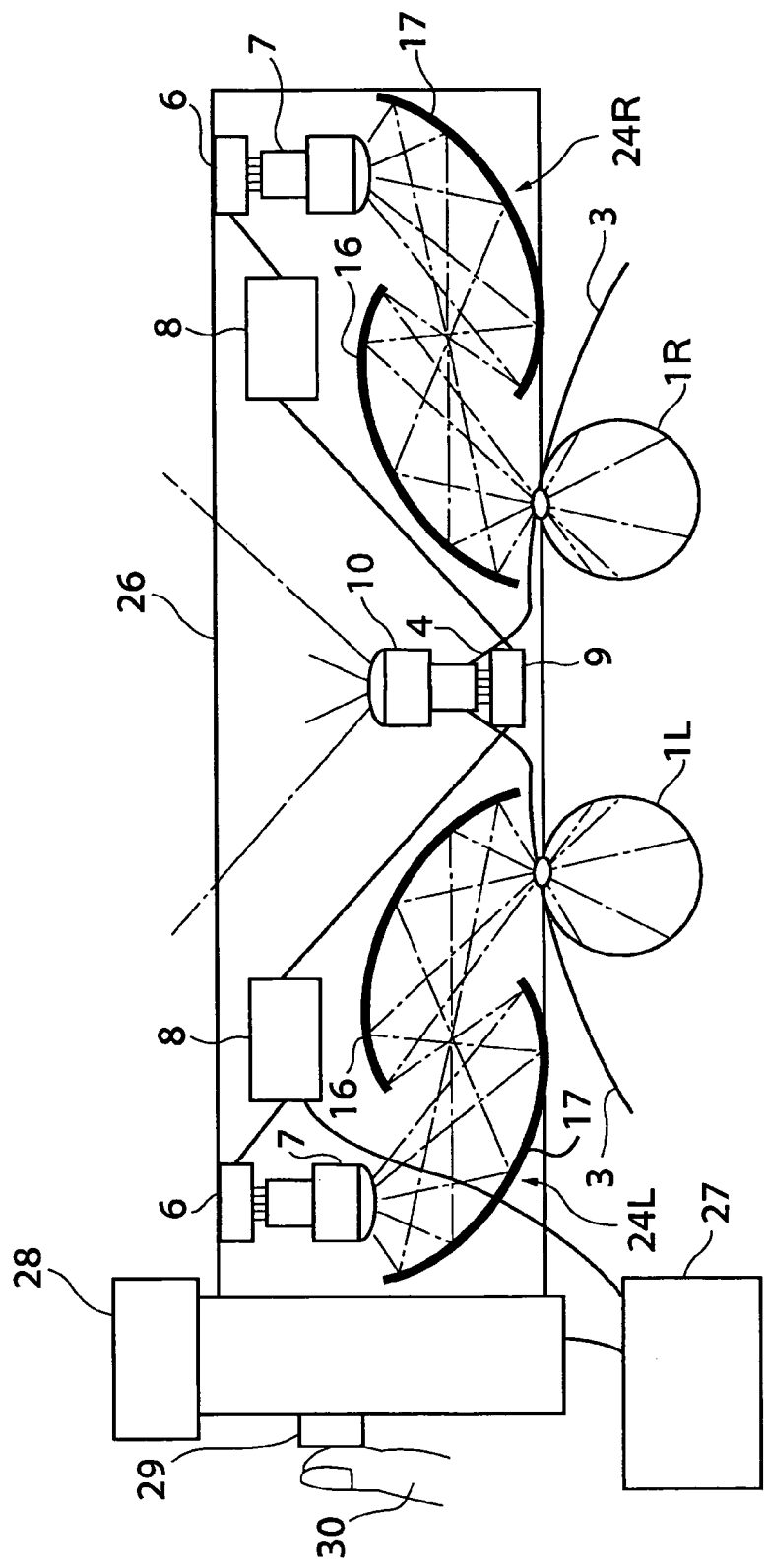
FIG. 11 is a schematic view showing an eighth embodiment of this invention.

A schematic overview of an eighth preferred embodiment of this invention is shown in FIG. 11. This embodiment is an application of the seventh embodiment, wherein digital video unit 28 of only an image sensor element is capable of being fixed into image display device cover 26. This device is configured such that a shooting target is followed with only a movement of a head and body while operating zoom switch 29 by left hand 30 and image information control device 27 composites wide area information obtained from first fisheye-type optical system 10 and CCD two-dimensional array sensor 9 and external information from digital video unit 28 and then the composite information is provided to image display devices 24L and 24R.

Both of this composite information are stored in image information control device 27 as image information, so the information can be reviewed as video data by changing an image size and a compositing way afterwards. Furthermore, this digital video unit 28 can be detached from image display device cover 26 as needed, too.

Figure 12:
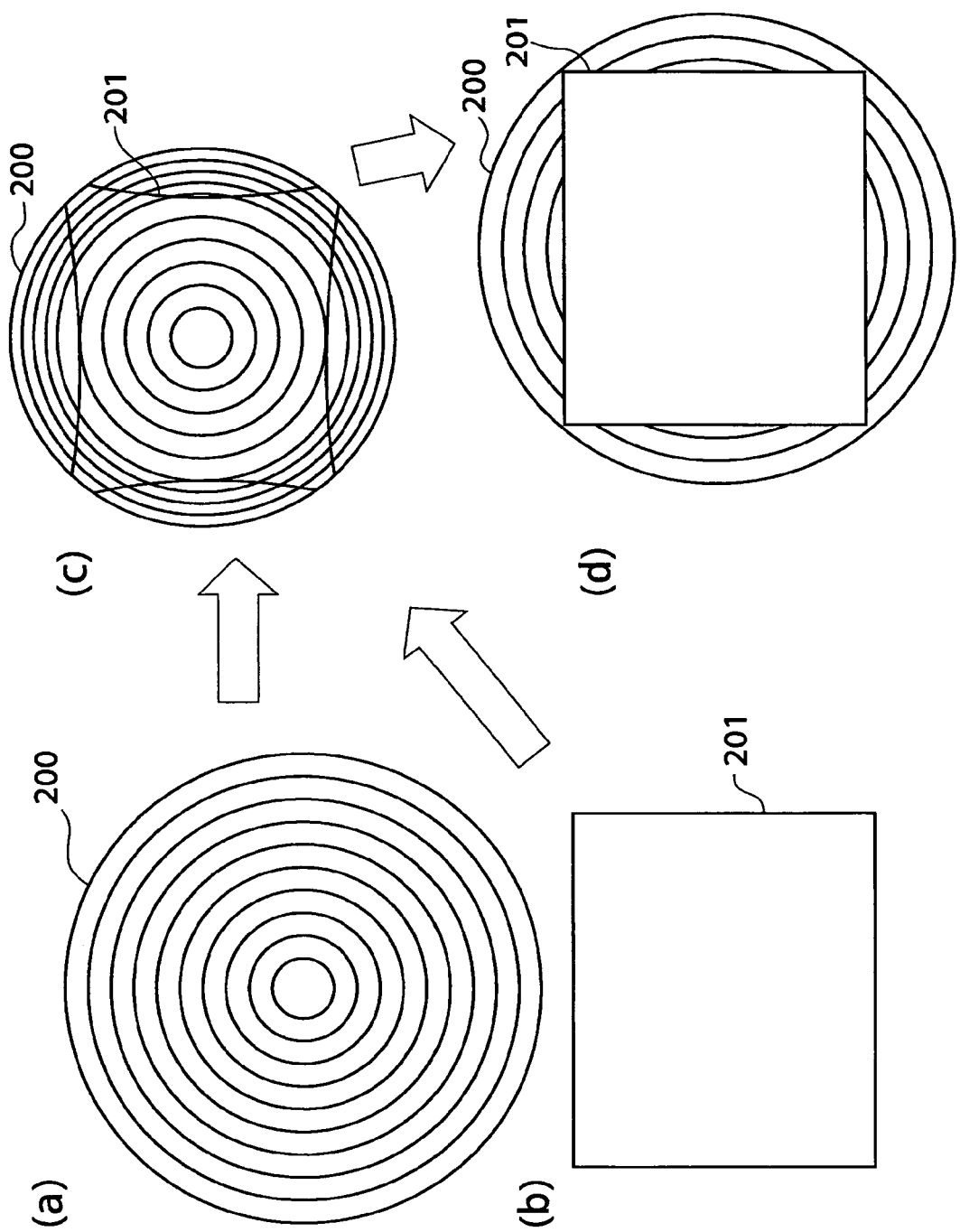
FIG. 12 is an explanatory view when correcting distortion of external input image information for compositing an image.

FIG. 12 shows a way of compositing an image in image information control device 27. As described before, a projection image of pattern 200, as shown in (a) of FIG. 12, projected by first fisheye-type optical system 10 and received on CCD two-dimensional array sensor 9 becomes pattern 200, as shown in (c) thereof, of which an edge area is compressed. On the other hand, as shown in (b) thereof, as external information 201 input from digital video unit 28 does not have such distortion, and thus, in the event that external information 201 is overly output by image display device 24, it is necessary that an image be composited after information is corrected beforehand to information including deformation at the edge areas of first fisheye-type optical system 10 (in this case, original image of external information 201 is corrected to a pincushion-type image as shown in (c)) and the composite image be output from liquid crystal two-dimensional output device 6.

With this arrangement, a distortion-free faithful image just like (d) of FIG. 12 can be obtained in the end due to distortion of second fisheye-type optical system 7. Herein, to make distortion shown understandably, distortion is shown with four sides bowed outwards in FIG. 12, but with a real fisheye lens, a square object becomes a shape like a barrel. Various shapes can be available depending upon characteristics of fisheye lenses.

Figure 13:
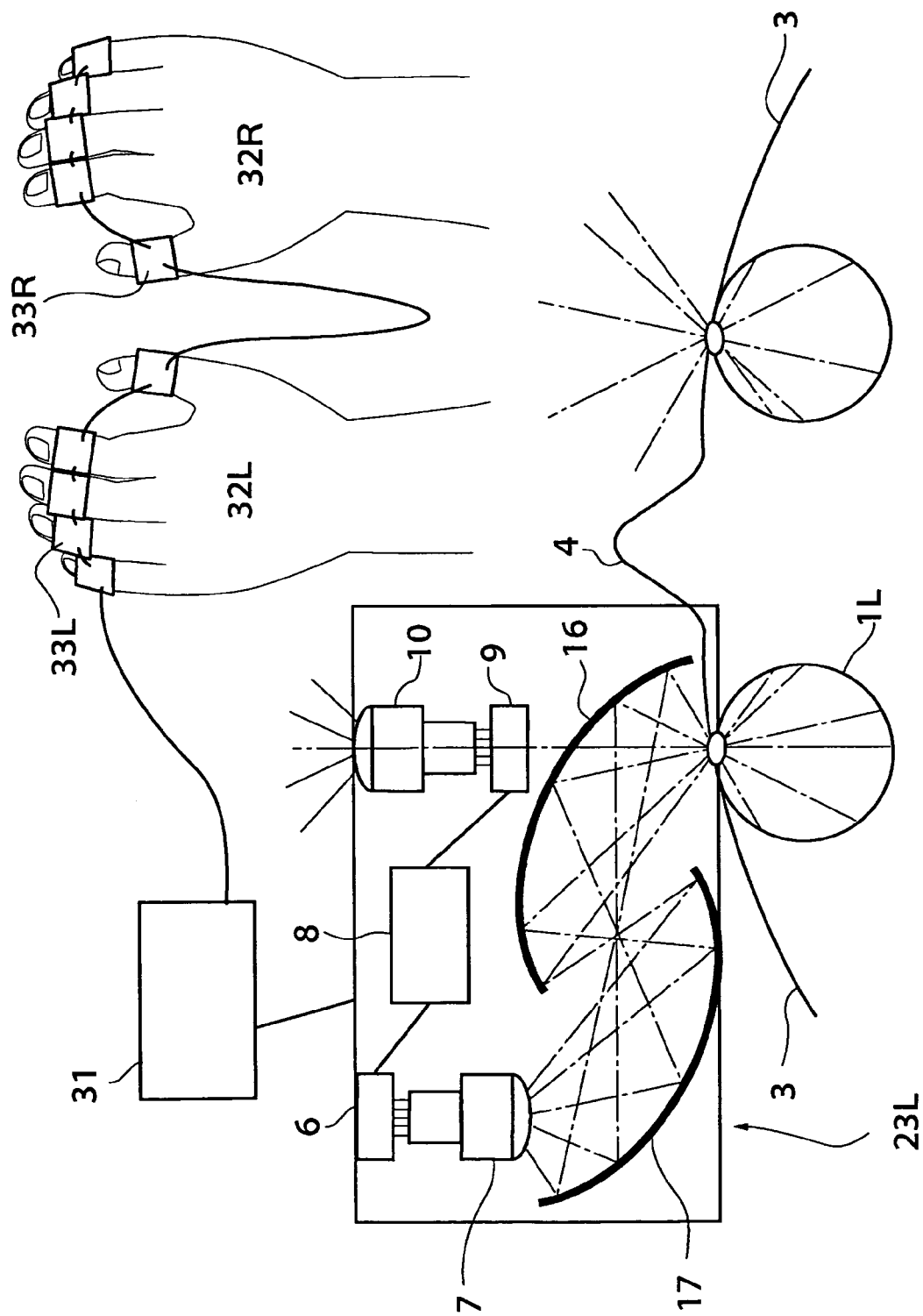
FIG. 13 is a schematic view showing a ninth embodiment of this invention.
Figure 14:
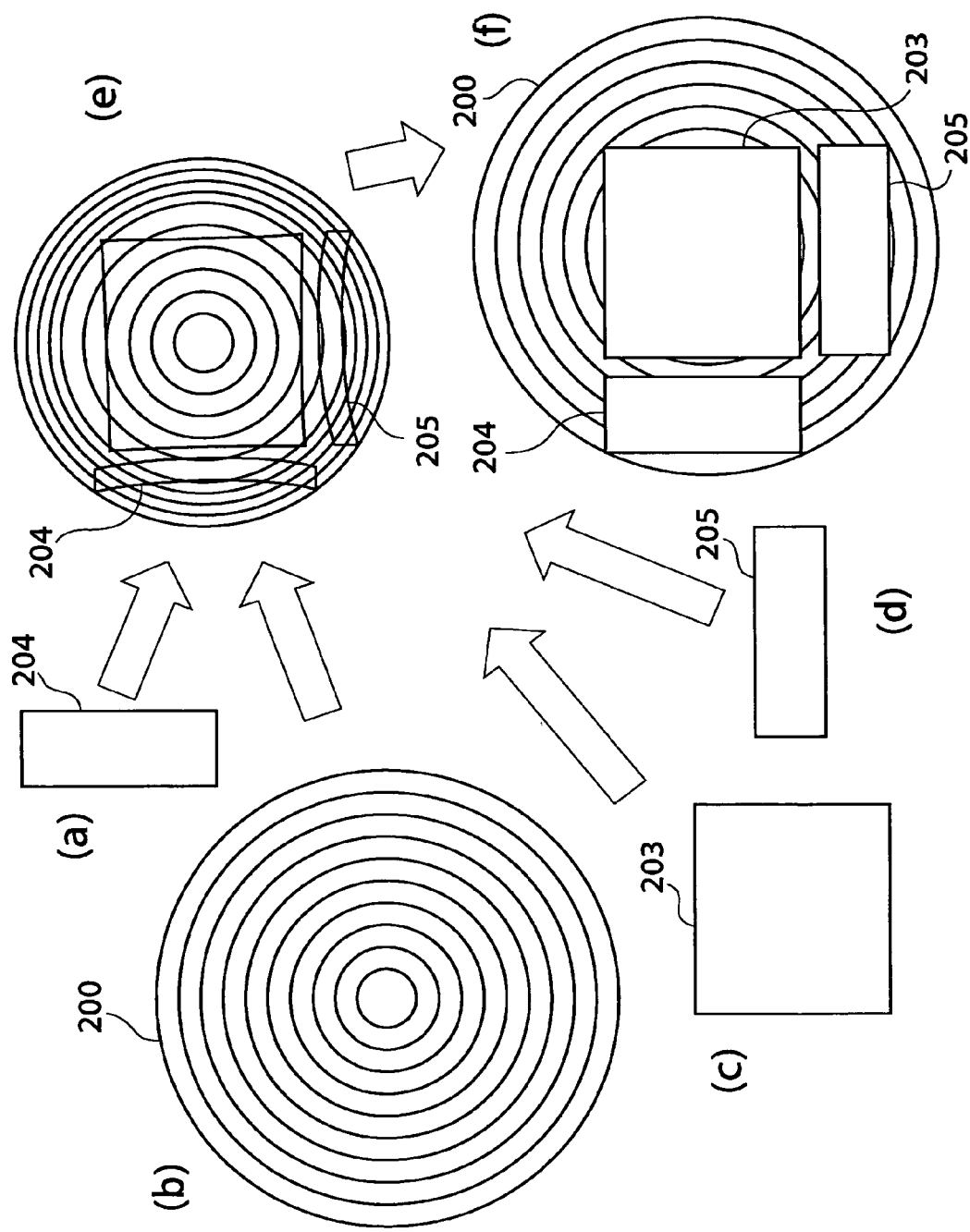
FIG. 14 is an explanatory view when correcting distortion of a plurality of external input image information for compositing an image.

FIG. 13 shows a schematic overview of a ninth preferred embodiment of this invention, wherein image display device 23L of the fifth embodiment is used for a single eye and control device 31 with capabilities of a personal computer is connected to image display device 23L and furthermore, portable keyboards 33L and 33R are attached to each fingertip of left palm 32L and right palm 32R and FIG. 14 shows a way of compositing an image in this case. At each fingertip of portable keyboards 33L and 33R of FIG. 13, there are provided a sensor and a finger pressure sensor that detect a direction and position from a thumb and each movement of each fingertip is configured so as to be output as image information of a relative position relative to the thumb.

In FIG. 14, it is necessary that pattern 205 displaying input information of a keyboard (shown in (d)) be composited and a composite image be displayed within the same field of view along with pattern 200 (shown in (b)) projected by first fisheye-type optical system 10 and received by CCD two-dimensional array sensor 9 like display pattern 203 (as shown in (c)) requiring high resolving power output from a computer and tool bar 204 (shown in (a)) displayed on an edge area of a computer screen.

As described before, the image output from liquid crystal two-dimensional output device 6 includes information of distortion produced by the first fisheye-type optical system and image information is compressed on an edge area shown in FIG. 14 (e). Then, tool bar 204 and keyboard input display pattern 205 that are image information from an external are converted into image information such that distortion of second fisheye-type optical system 7 is reversely corrected and then converted image information is composited. As result of this, the composite image information is restored as a distortion-free projection image like an image of (f) on a retina of an eyeball due to distortion of second fisheye-type optical system 7, so faithful image information is provided. And, a distortion correction is not performed on display pattern 203 that requires high resolving power of a computer. The reason is that display pattern 203 is positioned at a centre of field of view in FIG. 14 and thus there is no need for considering an effect of distortion.

Figure 15:
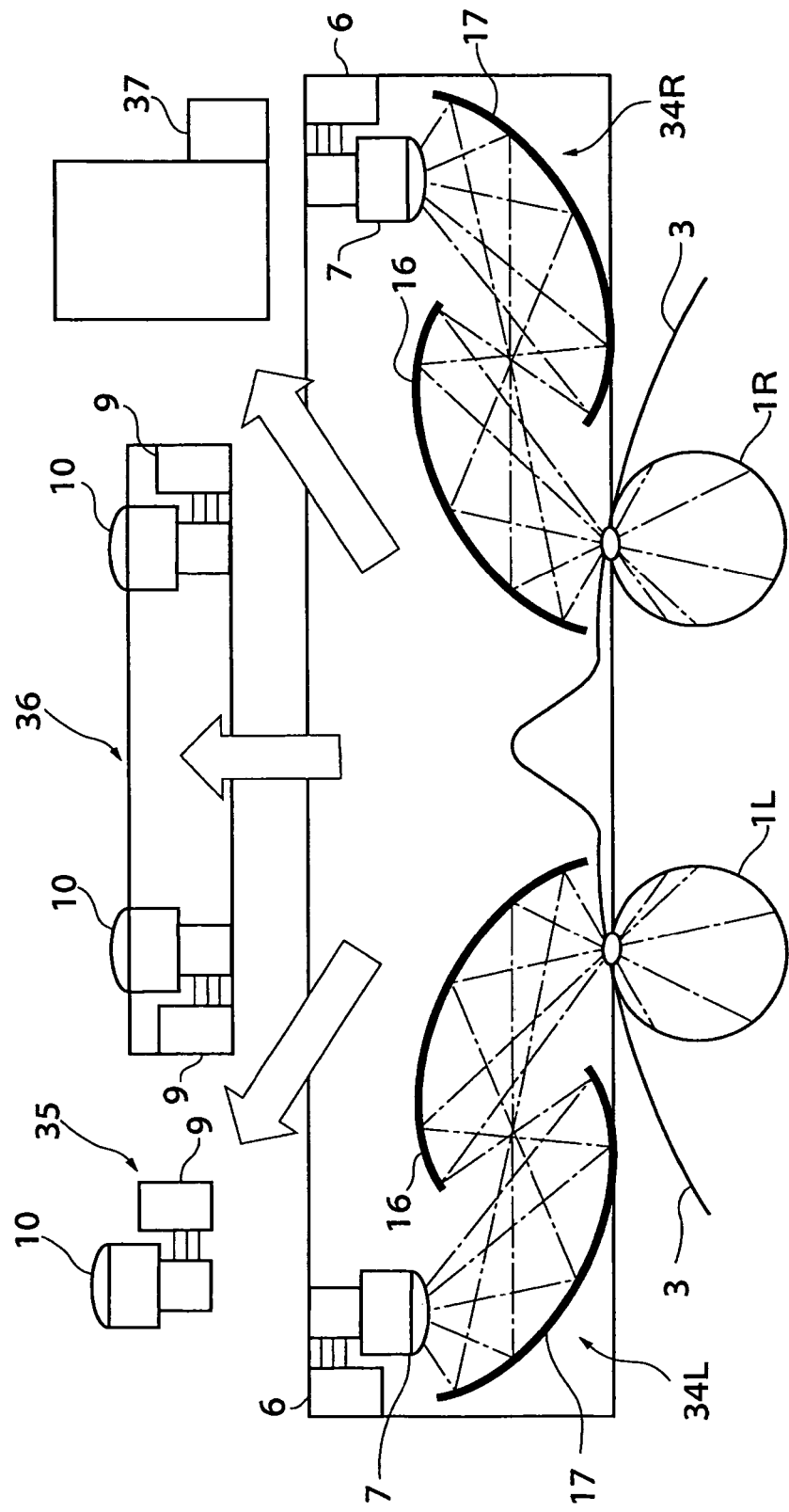
FIG. 15 is a view showing a tenth embodiment of this invention, wherein a device to input image information is detachable from a device to output image information and interchangeable.
Figure 16:
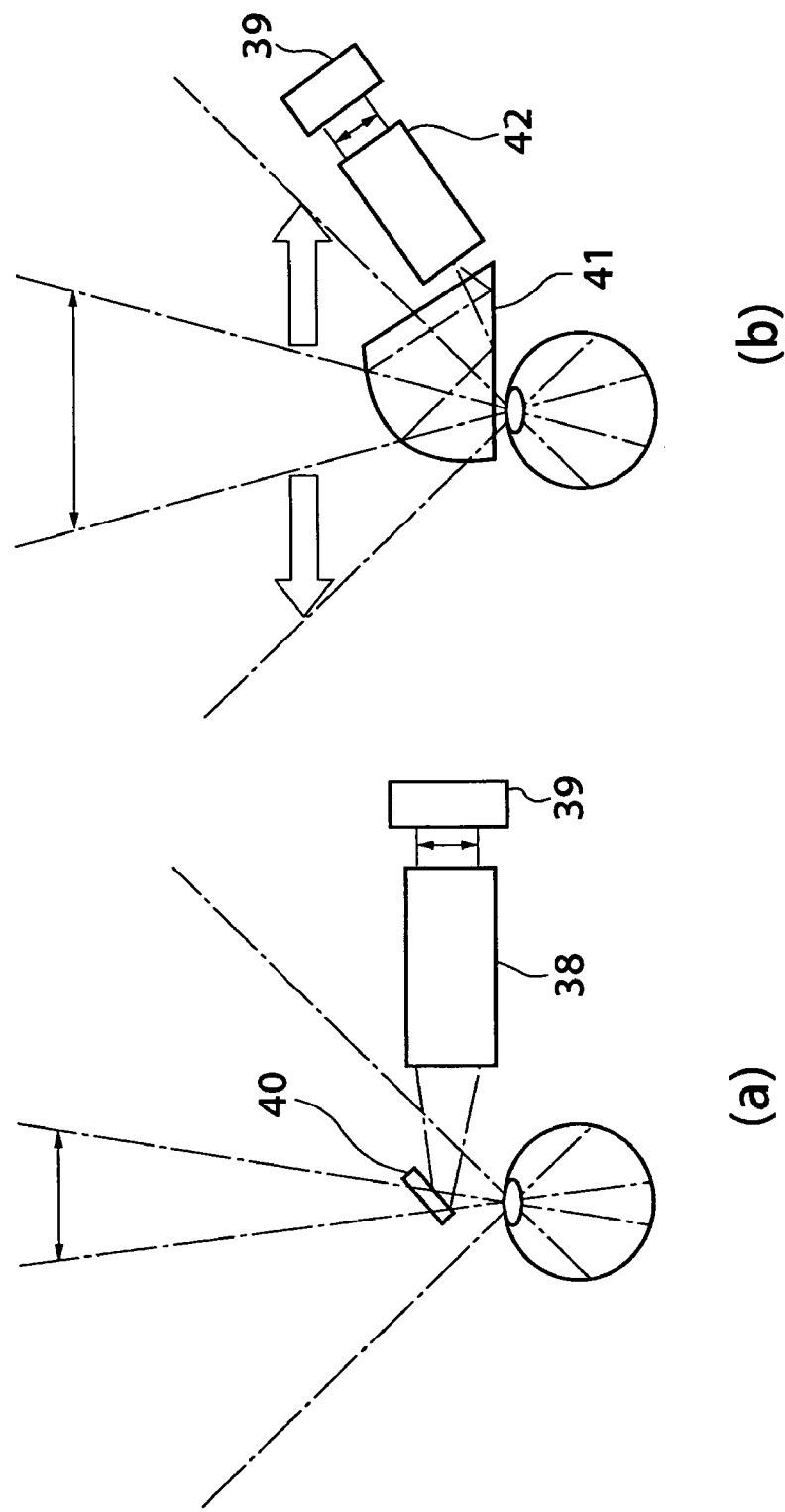
FIG. 16 is a conceptual view of two examples in a conventional art.

FIG. 15 is an explanatory view explaining a tenth preferred interchangeable embodiment, wherein an image information input device including first fisheye-type optical system 10 and CCD two-dimensional array sensor 9 is detachable from an image information output device such as liquid crystal two-dimensional output device 6 and second fisheye-type optical system 7 etc. Generally, image information input device 35 may be attached in a case of an image of a wide area image, and three-dimensional image input device 36 including independent first fisheye-type optical system 10 and CCD two-dimensional array sensor 9 with respect to a left and right eyes may be attached in the event of a image of a three-dimensional wide area image, and high magnification image input device 37 including an optical system with a long focal length and an image pick-up element may be attached in case of an enlargement image.

In this diagram, to shorten a depth of an image display device, a folding mirror is used in second fisheye-type optical system 7 of image output devices 34L and 34R that are an image information output device and liquid crystal two-dimensional output device 6 is arranged in a lateral direction. As a resolution of an image of this device largely relies on a size of a liquid crystal element, it is desirable to become a large image as much as possible by the second fisheye-type optical system 7 and to decrease the size of the liquid crystal element relative to the image.

Regarding the large image, use of a non-telecentric optical system enables to design an overall fisheye-type optical system to be compact and thereby permits to get a large screen of a liquid crystal section. But, in this case, an illuminating light beam of the liquid crystal section is required to have a direction in correspondence to the fisheye-type optical system. Furthermore, splitting of light flux and use of the liquid crystal section of three pieces of G, B and R used in a projector make it possible to enjoy a high resolution image equivalent to a projector at a wide field of view although a physical size becomes bulky.

Furthermore, use of the liquid crystal section of three pieces of R, B and R brings about an advantage that an adjustment of each magnification of G, B and R against lateral chromatic aberration produced by a relay lens optical system enables to reduce a number of achromatic lens elements. But, as described before, as the image output device in itself becomes bulky, there is a disadvantage that a device mounted on a head such as a head-mounted display or glasses-type display is too heavy. In order to improve this, there is a way in which the image output device is fixed somewhere other than the user, but this has a problem that a fixed position does not permit to deal with any posture of the user and causes the user a sense of restraint. To solve this problem, as described later, it is desirable that at least a part of the image display device be constructed so as to be supported somewhere rather than the user to contact with a face of the user, and to be movable corresponding to a movement of the user's face.

On the contrary, liquid crystal two-dimensional output device 6 may be replaced with something like a photographic film taken with the first fisheye-type optical system. By moving the film with a revolver or a slider, an image such as a projected positive film when illuminated by light can be enjoyed. Such the arrangement can be used as a toy or away of storing a picture and in any case, the embodiment permits an observer/user to feel a sense of realism that has never been experienced before.

Figure 17:
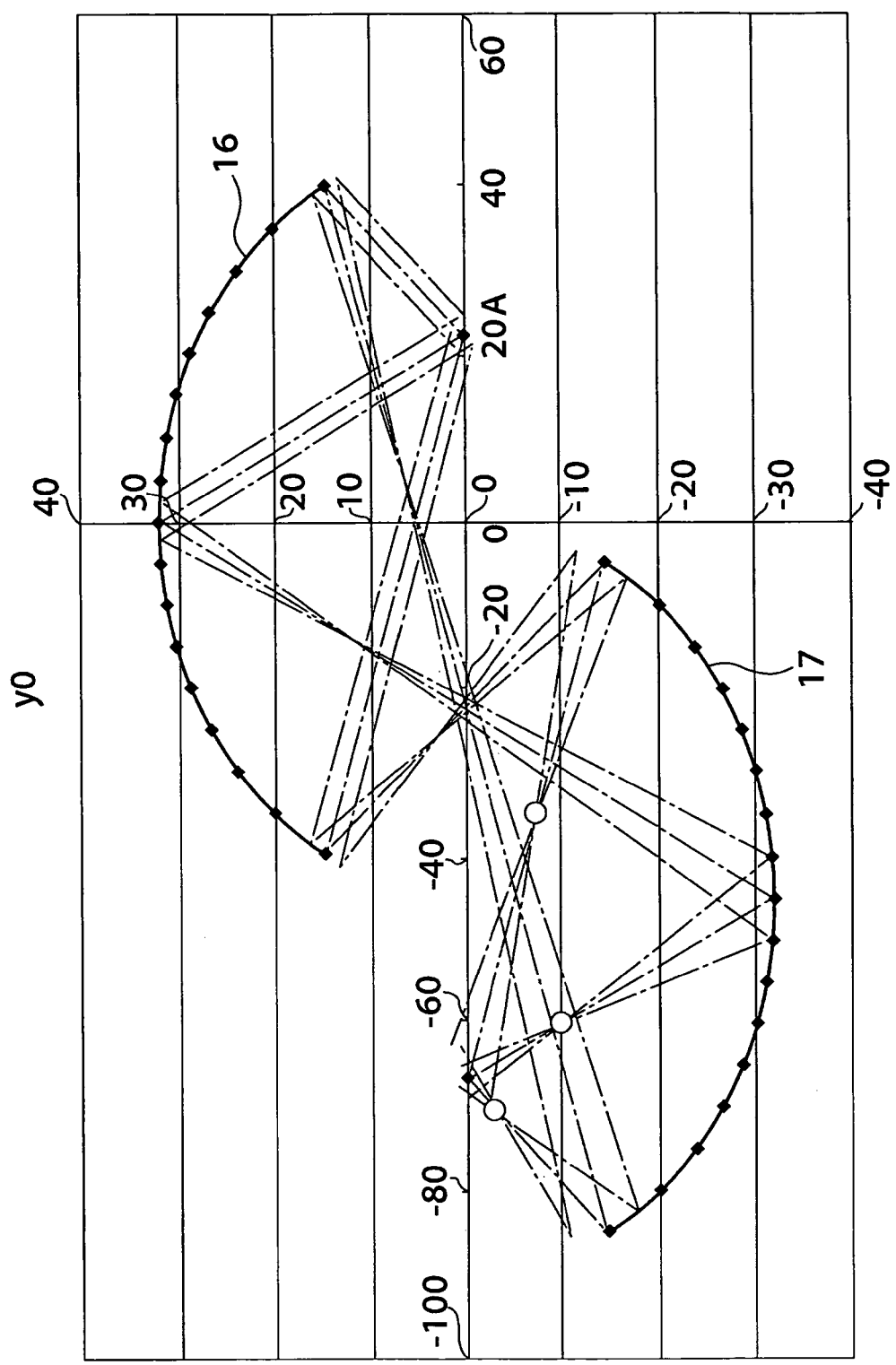
FIG. 17 is a view showing a position where parallel light flux entering from three different directions converges at crystal ball A within an fisheye optical system.

In the foregoing explanation, it has been given on a basis of the embodiments using primarily the elliptical mirror, but in the case of the foregoing configuration, a focus position of a Z direction, that is, an image plane does not become completely symmetric even by way of two elliptical mirrors. FIG. 17 is a view showing a position with "o" where parallel flux incident upon crystal ball A from three different directions are converged within a fisheye optical system using two elliptical mirrors. Like this, it can be seen that asymmetry of a large image plane occurs due to a direction of flux and thus it becomes necessary to deepen a deep depth of focus by considerably stopping down an image output from liquid crystal two-dimensional output device 6 around a pupil or a correction optical system that corrects asymmetry of this image plane is needed.

Figure 18:
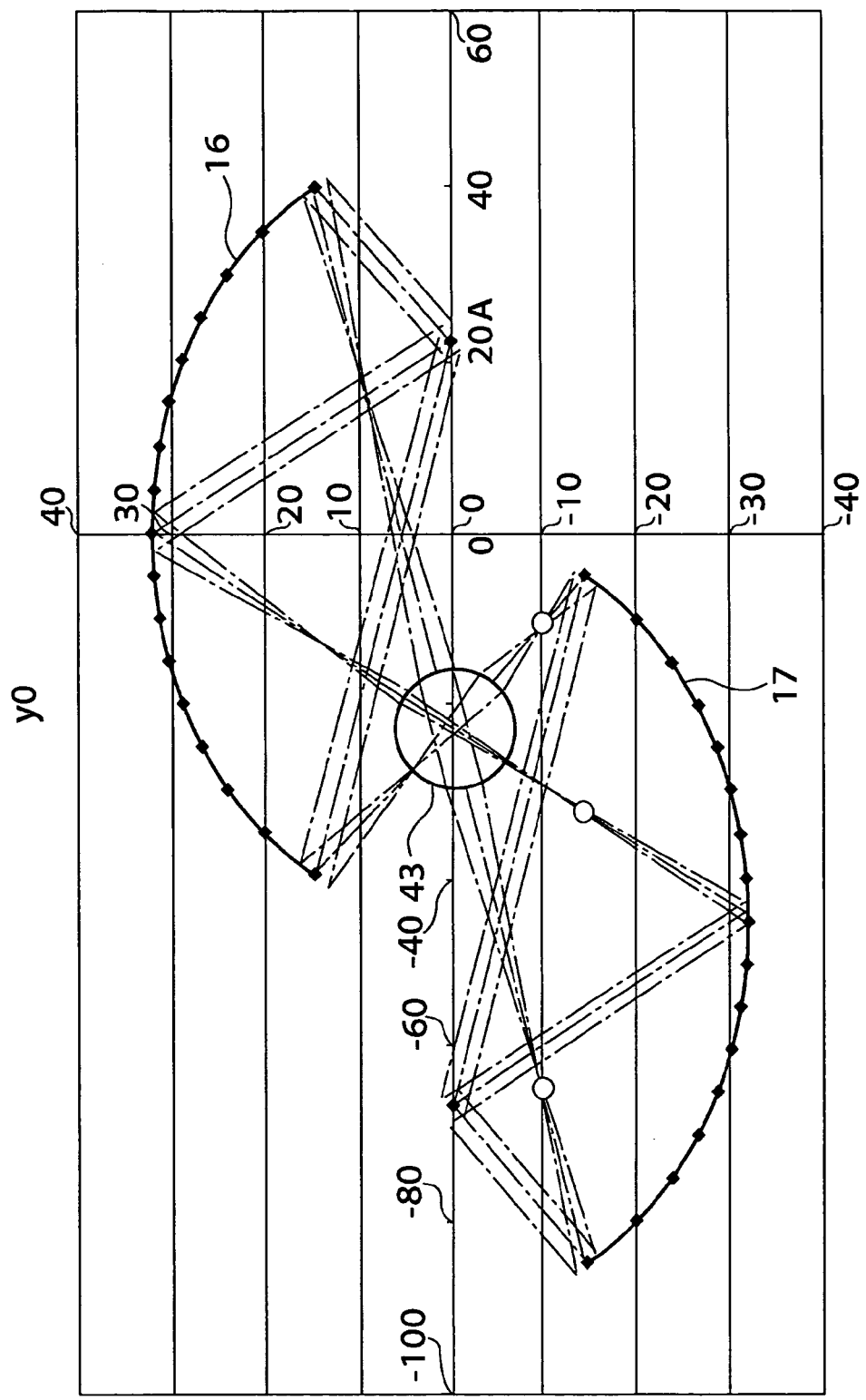
FIG. 18 is a view showing a configuration that alleviates asymmetry of an image plane by inserting a correction optical system in proximity to a position of a common focus point of two elliptic mirrors.

However, a field of view covering a continually moving eyeball cannot be gained with the foregoing arrangement, so it becomes necessary to alleviate asymmetry of the image plane. In FIG. 18, in order to solve this problem, correction optical system 43 is inserted in proximity to a common focus position of both of elliptical mirrors 16 and 17 so that the asymmetry of the image plane is alleviated. Correction optical system 43 employs an aspherical lens that has an action of a lens of a strong power letting a focus in front of correction optical system 43 be formed again and an action of a lens of a weak power in its orthogonal direction. This arrangement enables to change each focus position freely and obtain a wide field of view in a state of the asymmetry of the image plane being alleviated.

An application example using fθ mirror will be described below. A shortcoming of a technology using the fθ mirror is that the fθ mirror cannot get a wider field of view than an elliptical mirror. To improve this, a method of making a wide field of view of a human being small first and then using the fθ mirror is effective. This method will be explained using FIGS. 19, 20 and 21.

Figure 19:
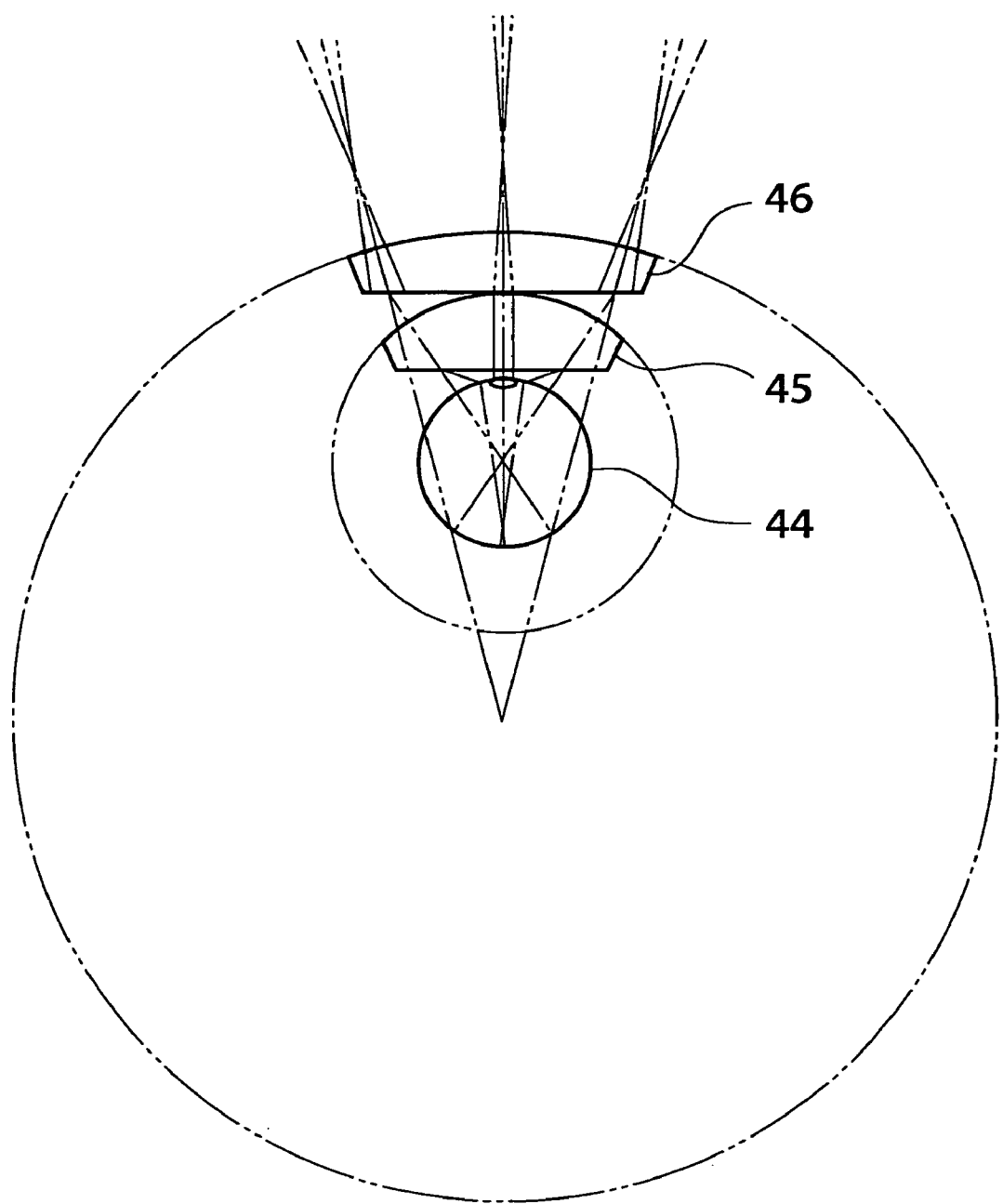
FIG. 19 is a view showing how to make a viewing angle small by disposing a reverse fisheye lens unit in an eyeball.

FIG. 19 is a method in which a reverse fisheye lens system (this system functions as an eyepiece optical system) is arranged at eyeball 44 and a virtual image corresponding to a wide field-of-view image projected on a retina of eyeball 44 is created. Light flux that has a position of forming an image on the retina of eyeball 44 is overly deflected by eyepiece lens 45 of a flat surface that faces eyeball 44. At a surface of eyepiece lens 45 opposite eyeball 44, a lens of a curvature such that a centre of the curvature of the surface becomes approximately a centre of eyeball 44 is employed and light flux incident upon the curved surface is approximately orthogonal to a line tangent to the curved surface. Furthermore, a surface of lens 46 facing eyeball 44 is also a flat surface and light flux incident upon a curved surface thereof formed on a surface thereof opposite eyeball 44 is approximately orthogonal to a broken line of the curved surface by using a predetermined curvature and lens materials. The foregoing conditions being satisfied, a faithful image can be obtained without practically producing coma on both of the flat and curved surfaces (chromatic aberration is not referred to herein, but it is necessary to consider it within a whole system covering from the liquid crystal device to eyepiece lens 45, so nothing is described specifically here).

But, at this stage, light flux emitted from eyeball 44 still tends to disperse. Therefore, it is desirable that the fθ mirror be used in order to relay the light flux to a liquid crystal two-dimensional output device of a predetermined size (in the foregoing description, for a convenient sake, it is described that light flux is emitted from an eyeball, but in fact, the light flux from the liquid crystal two-dimensional output device reaches a retina of eyeball 44.).

Figure 20:
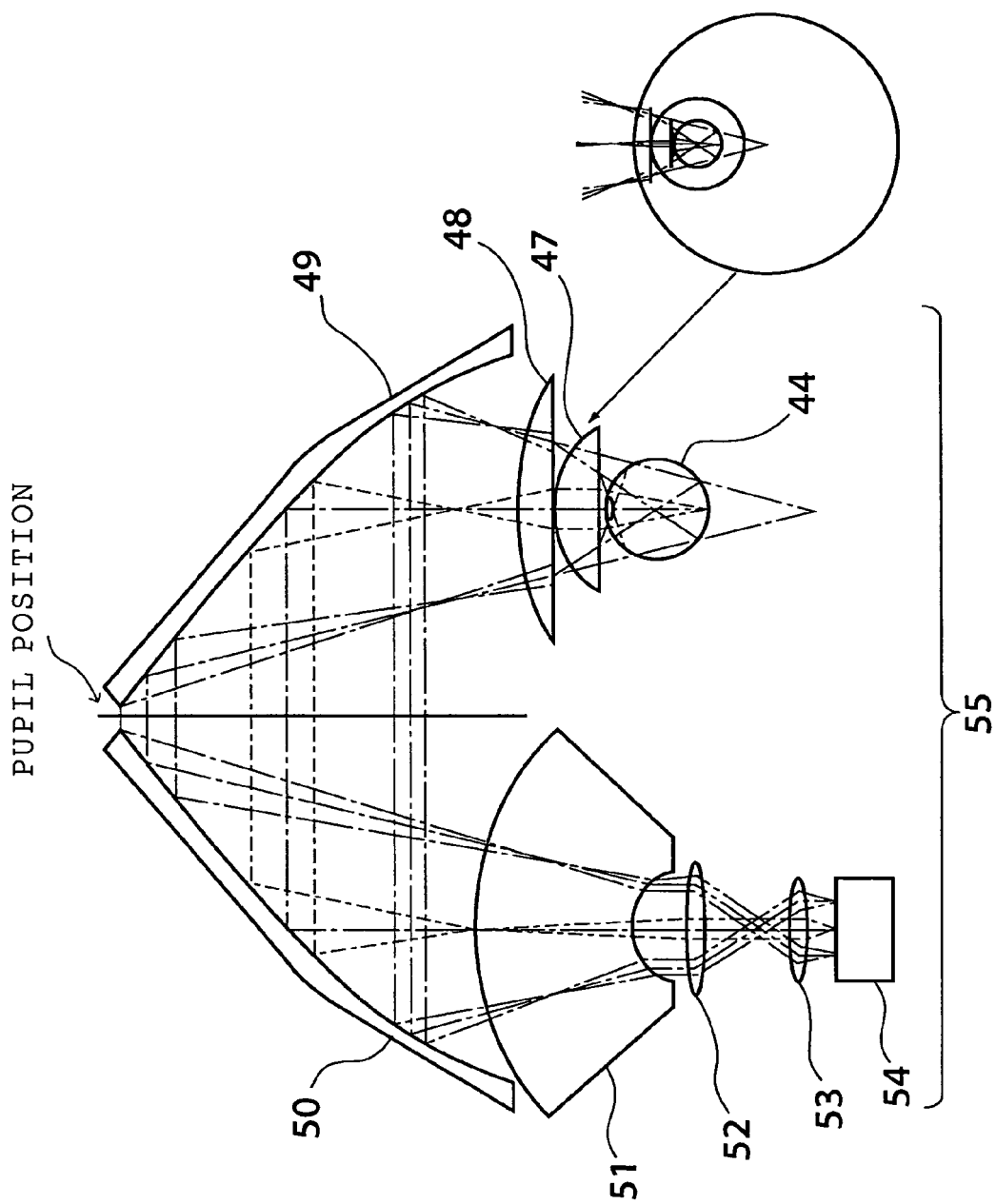
FIG. 20 is a view showing a configuration using a fθ mirror to relay light leaving from an eyeball up to a liquid crystal-type two-dimensional output device of a predetermined size.
Figure 21:
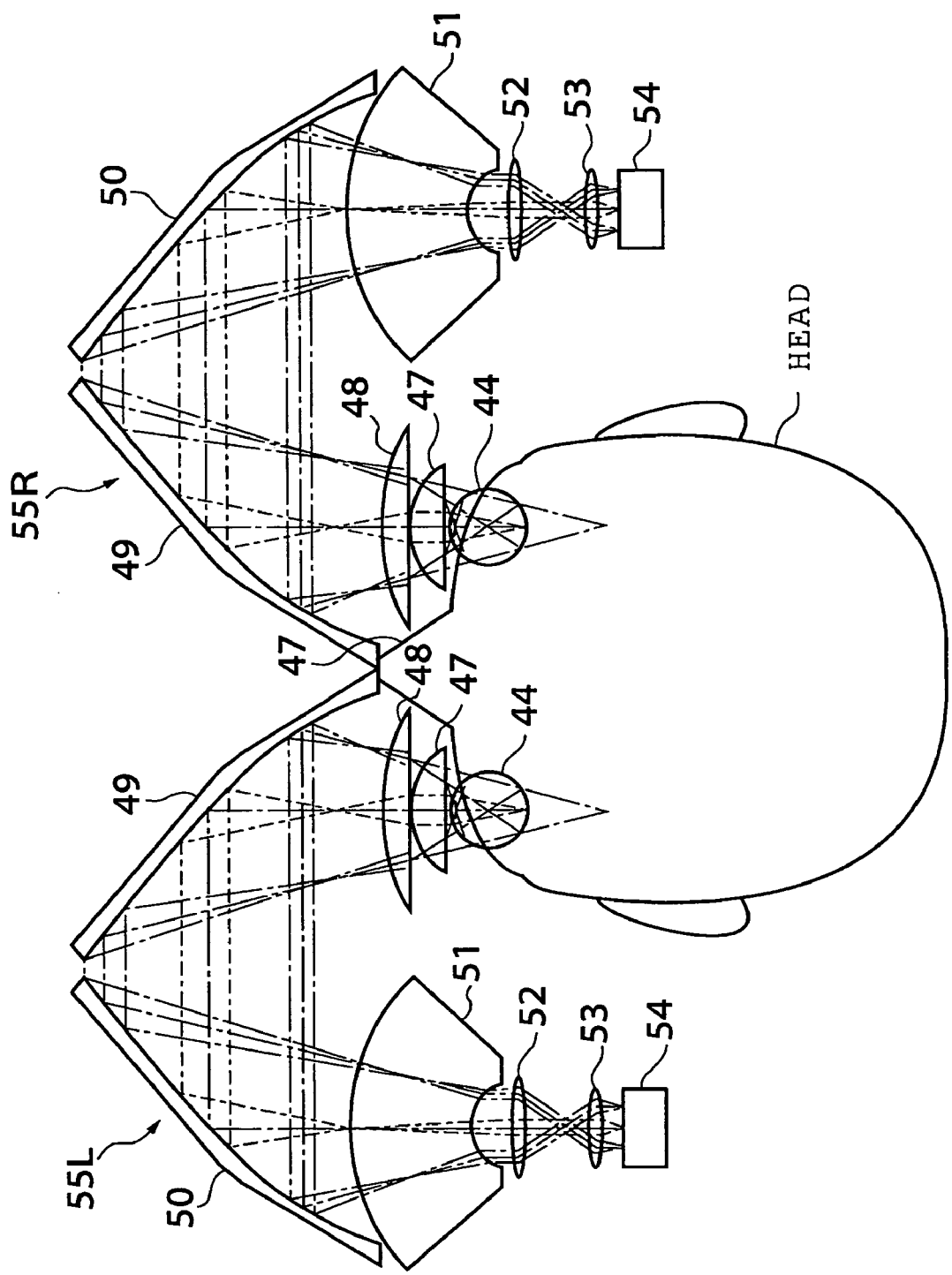
FIG. 21 is a view showing that the device shown in FIG. 20 is arranged separately to right and left eyeballs respectively.

An explanation about configuration 55 of an optical system will be given using FIG. 20. Light flux emitted from liquid crystal two-dimensional output device 54 becomes dispersing light flux by lenses 53, 52 and 51 constituting a second fisheye-type optical system and the dispersing light flux becomes parallel light flux with fθ mirror 50. The parallel light flux enters inside eyeball 44 at a wide viewing angle as converged light flux by line symmetric fθ mirror 49 arranged opposite fθ mirrors 50 such that a pupil position of this optical system becomes a centre of fθ mirrors 50 and 49, and then an image of two-dimensional liquid crystal output device 54 is formed on the retina by the reveres fisheye-type optical system of eyepiece lens 47 and lens 48 as described in FIG. 19. With this arrangement, as a broadening angle of light flux is broadened by lenses 53, 52 and 51 and the fθ mirror is used, and the broadened broadening angle of the light flux is restored to the original angle thereof again by the reverse fisheye-type optical system of eyepiece lens 47 and lens 48, and the light flux of the restored original angle enters eyeball 44, this arrangement enables to obtain a wide field of view more effectively than the fθ mirror as described before in FIGS. 3 and 4. FIG. 21 shows that such systems 55L and 55R are separately arranged to each of left and right eyes, wherein an asymmetric image plane at using the elliptical mirror is not formed.

But, when the foregoing arrangement is used, an asymmetric image plane is not formed, convex-type curvature of field easily produced when using a fisheye lens is not corrected and remains as it is. The closer to an edge of the image plane, the larger this curvature of field and thus it becomes necessary that a pupil be stopped down.

Figure 22:
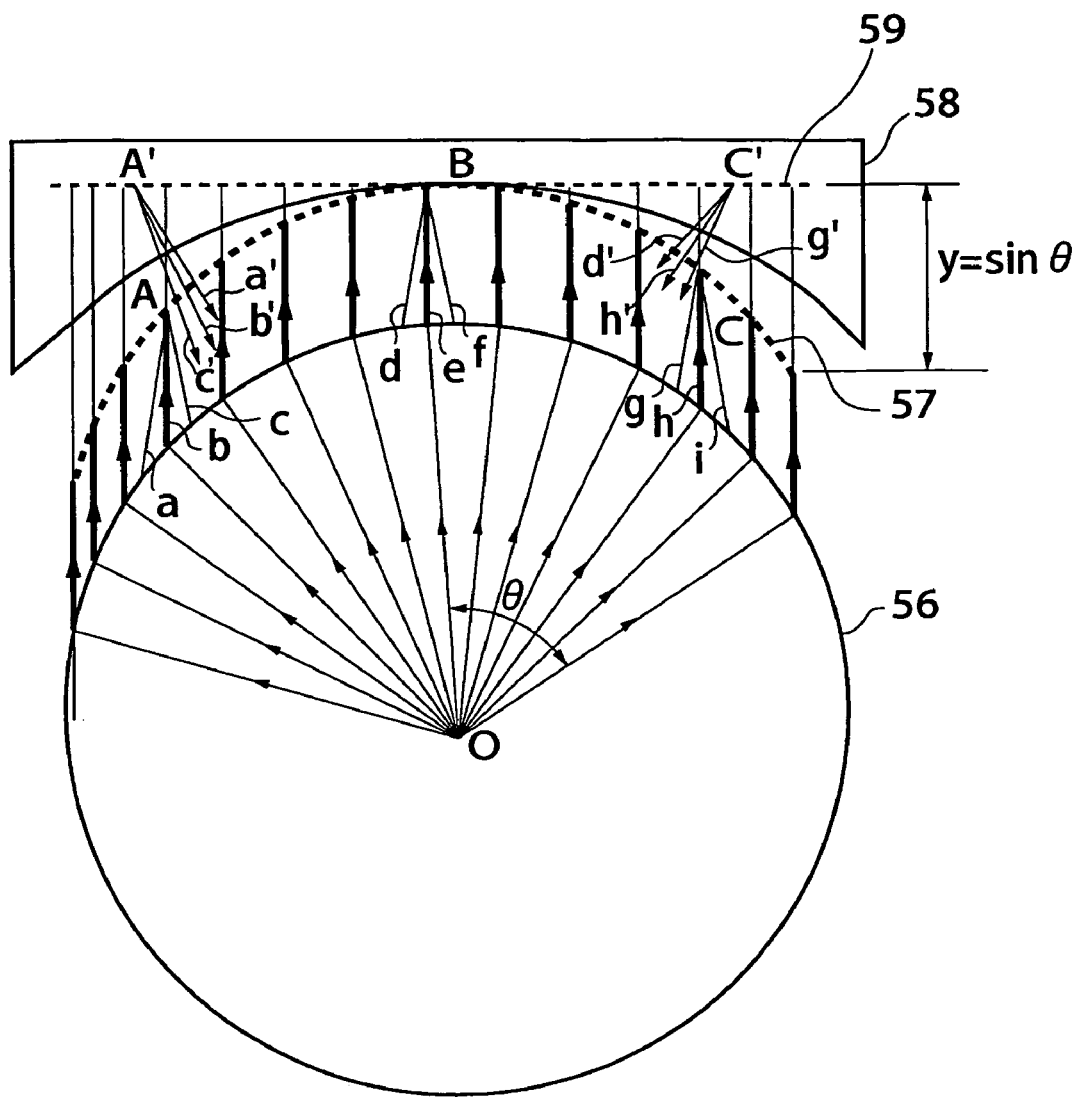
FIG. 22 is a view showing an example where curvature of field is corrected by way of a curved surface mirror.

Therefore, another example in which this curvature of field is corrected by way of a curved mirror will be described referring to FIG. 22. For a simple sake, FIG. 22 shows an example in which principal rays of diverging light flux emitted from centre O of spherical surface 56 become parallel using the arrangement as described in FIG. 19 and simply shows that distortion has a shape like y=sin θ (θ is an angle from a centre of an object). Namely, when there is no curvature of field, let fifty-ninth (59) be a surface of forming an image and then a real surface of forming an image is as indicated by fifty-seventh (57) and let y be a distance of surface 59 of forming an image in the case of non-curvature of field and a distance of real surface 57 of forming an image, hence y=sin θ as shown in FIG. 22.

This means that ideally, light emitted from the flat surface of forming an image must converge at point O, but in actual fact, the light emitted from surface 57 of forming an image converges at point O due to curvature of field.

If this parallel light flux is reflected with a flat surface mirror, a condition of curvature of field remains unchanged at all. But, when curved mirror 58 of a predetermined curved surface is arranged in proximity to this surface 57 and reflects the parallel light flux, a focus position varies depending upon the curved surface.

For instance, principal ray e enters curved mirror 58 at right angles and is formed at point B on a surface of curved mirror 58 at a centre position of curved mirror 58, so this is the same that each beam of light d, f and e is reflected by a flat surface mirror and a position of a virtual light source of the reflected light remains unchanged at point B. But, beams of light a, b and c forming at point A in the neighborhood are reflected toward directions of a', b' and c' by curved mirror 58 and a virtual light source of the reflected light is formed at a position of A'. Similarly, beams of light g, h and i forming at point C in the neighborhood are reflected toward directions of g', h' and i' by curved mirror 58 and a virtual light source of the reflected light is formed at a position of C'. Like this, when a reflection surface of curved mirror 58 is formed such that A', B' and C' are formed on image-forming surface 59 of the same flat surface, curvature of field produced by spherical surface 56 can be eliminated by using the reflection by curved mirror 58.

Conversely, when the curved mirror reflects light flux to be formed on image-forming surface 59 of a flat surface, the real image-forming surface becomes fifty-seven (57) and a formed image thereon has curvature of field. As this beam of light passes through curved surface 56, the curvature of field is cancelled out and the beam of light is formed at the centre of curved mirror 56.

This curved mirror can optionally adjust a virtual focus point depending upon various conditions, but in compensation for of this adjustment is that telecentricity tilts, namely, principal ray emitted from an object surface does not become parallel to an optical axis, so, if an extreme correction is made, a tilt of telecentricity becomes large and thus there is a risk that light flux might go out of an effective lens aperture. Therefore, it is desirable to use an aspherical surface that lets an incident angle of the light flux and the curved surface intersect approximately at right angles such that a reflection surface of the curved mirror comes within depth of focus and telecentricity is not overly deflected at a part where a N.A. is small and the depth of focus is shallow, and lets the virtual focus point lie on image-forming surface 59 of a flat surface in proximity to a centre where the N.A. is large and the depth of focus is shallow.

Thus, the foregoing ideal image-forming surface can be obtained by so designing such that a curvature of an aspherical reflection surface of curved mirror 58 becomes an integral surface of a tangent surface that has a middle tilt of a tilt of a surface tangent to each curved surface of curvature of field and the virtual focus point surface at each position and a tangent surface having a middle tilt between the tilts of each tangent surface. An example of a preferred embodiment of display device 75 using this technology will be described below in reference to FIG. 23. An upper side of this diagram represents a front-side direction of viewing. Polarizing beam splitter 65 reflects light flux emitted from liquid crystal panel 74 via lenses 73 and 72 and the light flux makes circularly polarized light by λ/four-plate 66 and then lenses 67 and 68 form post-correction image plane 71 in proximity to correction curved surface 70 of curved mirror 76'. Post-correction image plane 71 formed is a flat surface, so that a projected image is also approximately flat (equivalent to image-forming surface 59 of the flat surface in FIG. 22) since a surface of the liquid crystal panel is a flat surface. Being reflected by correction curved surface 70, the light flux is formed on predetermined curved image plane 69 as described in FIG. 22. λ/four-plate 66 and polarizing beam splitter 65 are for gaining a light amount and thus, when the light amount is sufficient, a conventional half-mirror can be substituted for them and λ/four-plate 66 can be omitted, too. Also, when a liquid crystal member of three-piece G, B and R is used, three liquid crystal elements have an inherent specific polarized azimuth, so, in the event that λ/four-plate 66 is used, it is necessary that an attention like implementing random polarization etc be paid.

Light flux reflected on correction curved surface 70 and emitted from a virtual image formed on curved image plane 69 become straight polarized light by λ/four-plate 66 via lenses 68 and 67 and the straight polarized light transmits through polarizing beam splitter 65 and further passes through crystal ball 61 by fisheye-type optical system 64, and an image on a surface of liquid crystal panel 74 is clearly projected onto retina 60 of eyeball 62. Namely, curved image plane 69 is a surface such that light exiting from the curved image plane 69 cancels out curvature of field of second fisheye-type optical system 64 and is formed on retina 60, and a shape of correction curved surface 70 is determined such that the image of liquid crystal panel 74 formed on post-correction image plane 71 formed after correction forms image plane 69 of such the curved virtual image.

Figure 24:
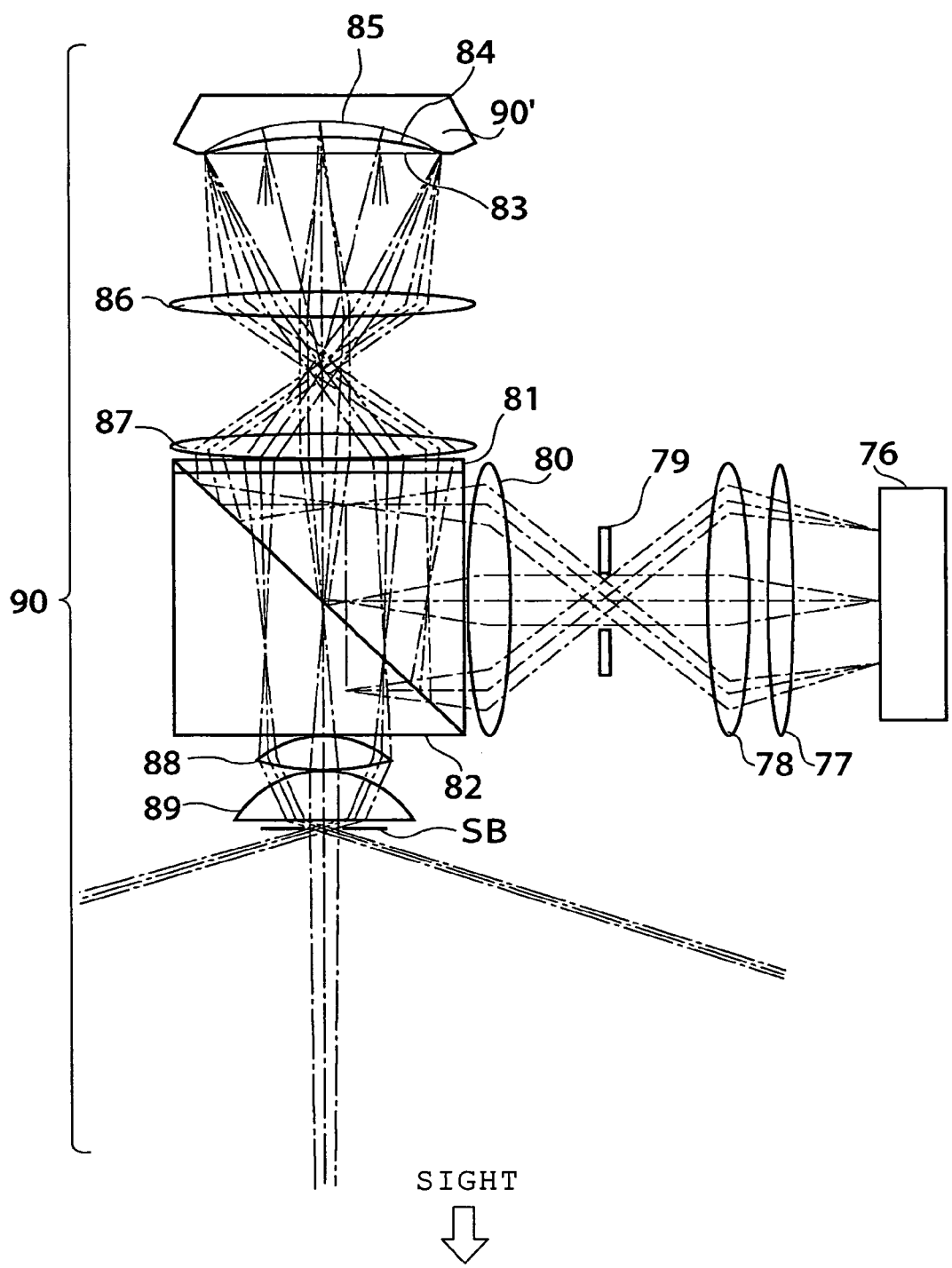
FIG. 24 is a view showing a schematic configuration of an image pick-up device, wherein an arrow indicates a direction of view.

This embodiment enables to correct curvature of field produced by the fisheye-type optical system, so this embodiment can be applied to an image pick-up device having the same distortion characteristics as this invention. FIG. 24 is a schematic view of image pick-up device 90, wherein a lower part of this diagram represents a direction of viewing. Light flux from an external passes through aperture stop SB and enters lens systems 89 and 88 constituting a fisheye-type optical system with an angle of an order of 140 degrees and after transmitting through deflecting beam splitter 82, the light flux reaches correction curved surface 84 via λ/four-plate 81 and lenses 87 and 86.

As lens systems 89 and 88 constituting a fisheye-type optical system have strong curvature of field, an image-forming surface becomes a curved image-forming surface as shown by eighty-eight (85). But, with reflection by correction curved surface 84 of curvature-of-field correction mirror 90', curvature of field is corrected as described before and an image-forming surface of reflected light becomes post-correction image-forming surface 83 of a flat surface. Then, light emitted from post-correction image-forming surface 83 is reflected by deflecting beam splitter 82 via lenses 87 and 86 and λ/four-plate 81 and is introduced to pupil variable aperture 79 by lens 80. Light flux that is stopped down to a predetermined size by pupil variable aperture 79 is affected by actions of lenses 78 and 77 and then an image of an external world is projected on CCD two-dimensional array sensor 76.

An image-forming surface in proximity to CCD two-dimensional array sensor 76 is curved and, in fact, lies at a position of predetermined radius R that is a distance from lens 89 up to CCD two-dimensional array sensor 76. Accordingly, an image existing at a radius rather than predetermined radius R is configured to be out of focus. Herein, the more pupil variable aperture 79 is stopped down, the smaller N.A and the deeper the depth of focus, so it becomes possible to focus on an object in a radius of a predetermined broad range.

Figure 23:
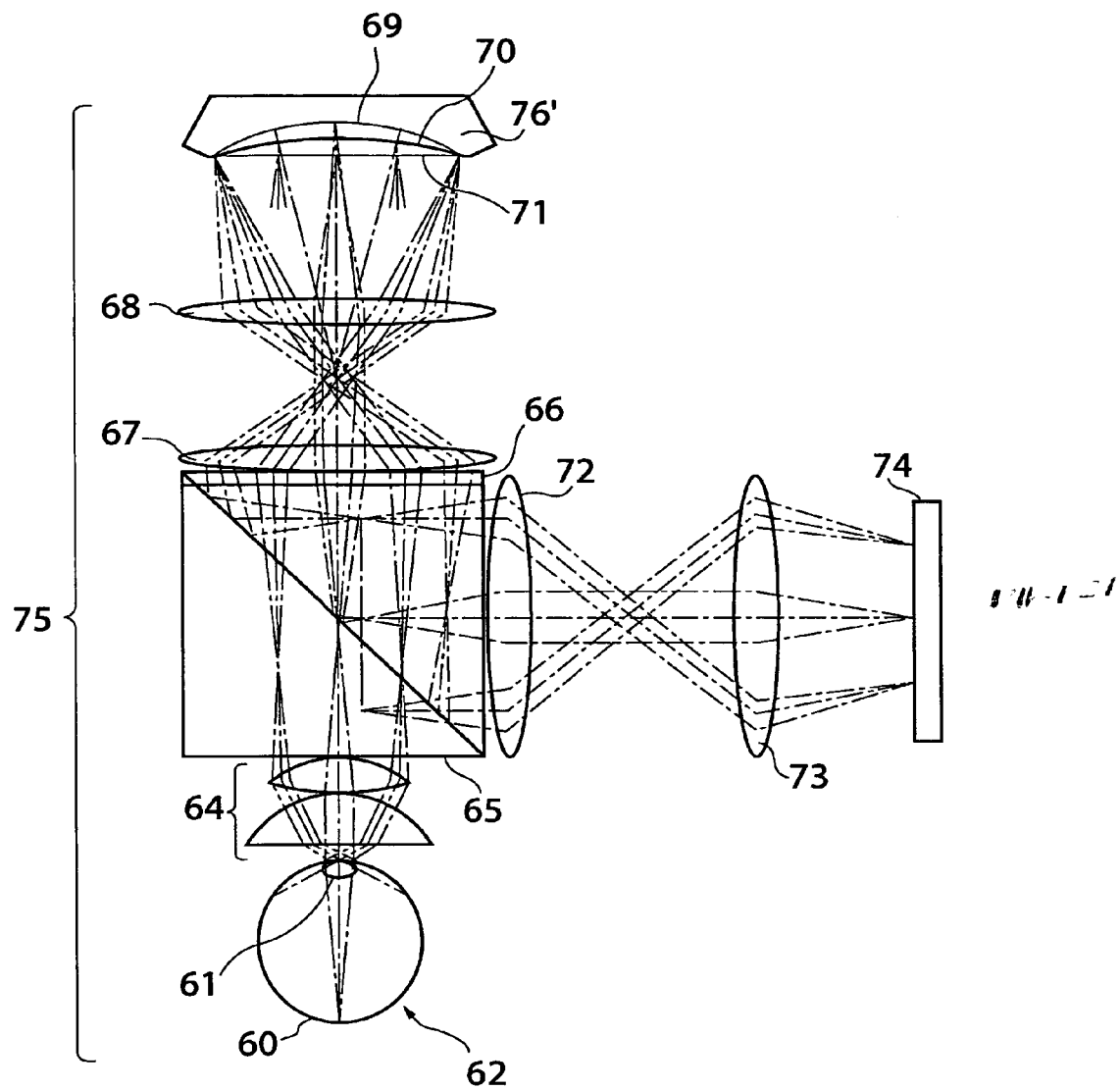
FIG. 23 is a view showing one example of an embodiment of a display device.

In a case where information output from CCD light sensor element 76 is played back with display device 75 as shown in FIG. 23, a clear image can be played back at a focus position by opening pupil variable aperture 79 and incorporating a focus device into image-forming device 90 although an image outside of the focus position becomes blurred when a clear image is required. Contrary to this, when information in all rather than a clear image is needed, an image of great depth of focus can be enjoyed by stopping down pupil variable aperture 79 when the image is played back with display device 75.

Like this, by way of display device 75 and image-forming device 90 as shown in FIGS. 23 and 24, a system capable of observing an image of a hitherto unseen wide view can be achieved. However, it cannot be said that the foregoing arrangement makes the most of an effect of this invention fully and further improvement makes it possible to discover high value thereof. Thus, a product profile making the most of this invention will be further made clear and a system to achieve this invention will be explained below. Let an object to achieve with a system capable of outputting a wide view on a display device be more specific as follows.

<u>1</u>. Do not get felt eyestrain

<u>2</u>. Get realism of a cinema theater exceeding a projector

<u>3</u>. Get a high image quality better than a projector

<u>4</u>. Get a three-dimensional image without an uncomfortable feeling

<u>5</u>. Get a new function of a high value added exceeding a human eye

Regarding <u>1</u>, a necessary system becomes clear with an analysis and improvement of eyestrain. First of all, position eyestrain as a present-day disease and consider a system that eliminates its cause.

(1) Long-Hours Use of a TV and Computer

A display stays nearby us and an eye is kept on a screen.

⇒Desire to view something different and far ahead. As for an order of fatigue, TV>projector>cinema theater ⇒Viewing something at a long distance does not cause an observer eyestrain.

(2) Use of a Commercially Available Wearable Display Device (a) A viewing angle is narrow (30 degrees) and a focus position is fixed (2 m ahead). ⇒Obtained information is so limited. ⇒In a video game, an eye is shifted laterally (a lateral eye movement)(a wide angle) and thing rather than a video screen can be viewed at a wide viewing angle (a wide angle and a variable focus position).

(b) Workload takes place to the observer when focusing eyes. An image quality is inferior to a typical TV.

(3) Keep on Chasing a Fast Moving Subject

In a train and a vehicle in an amusement park, an actively moving and nearby object is viewed. ⇒Swaying a head lets a line of sight be fixed or a still subject is found out and it is viewed.

With consideration of the foregoing results, high likelihood conditions that do not cause eyestrain are to broaden a field of view, enhance an image quality, enable to sway an eye laterally and view a subject at infinity, have a different focus point at a plurality of focus points and secure a motionless image within a field of view. By satisfying such the conditions, eyestrain can be alleviated.

Next, Let's talk about realism of a cinema theater exceeding a projector (<u>2</u>). A human being feels a perspective by making both eyes cross-eyed. An amount of cross-eyed determines a focus position arbitrarily. Even by way of a high performance projector, a projection distance exists as below and a wide image at a long distance cannot be enjoyed in a space of a house like in a cinema theater house.

Figure 25:
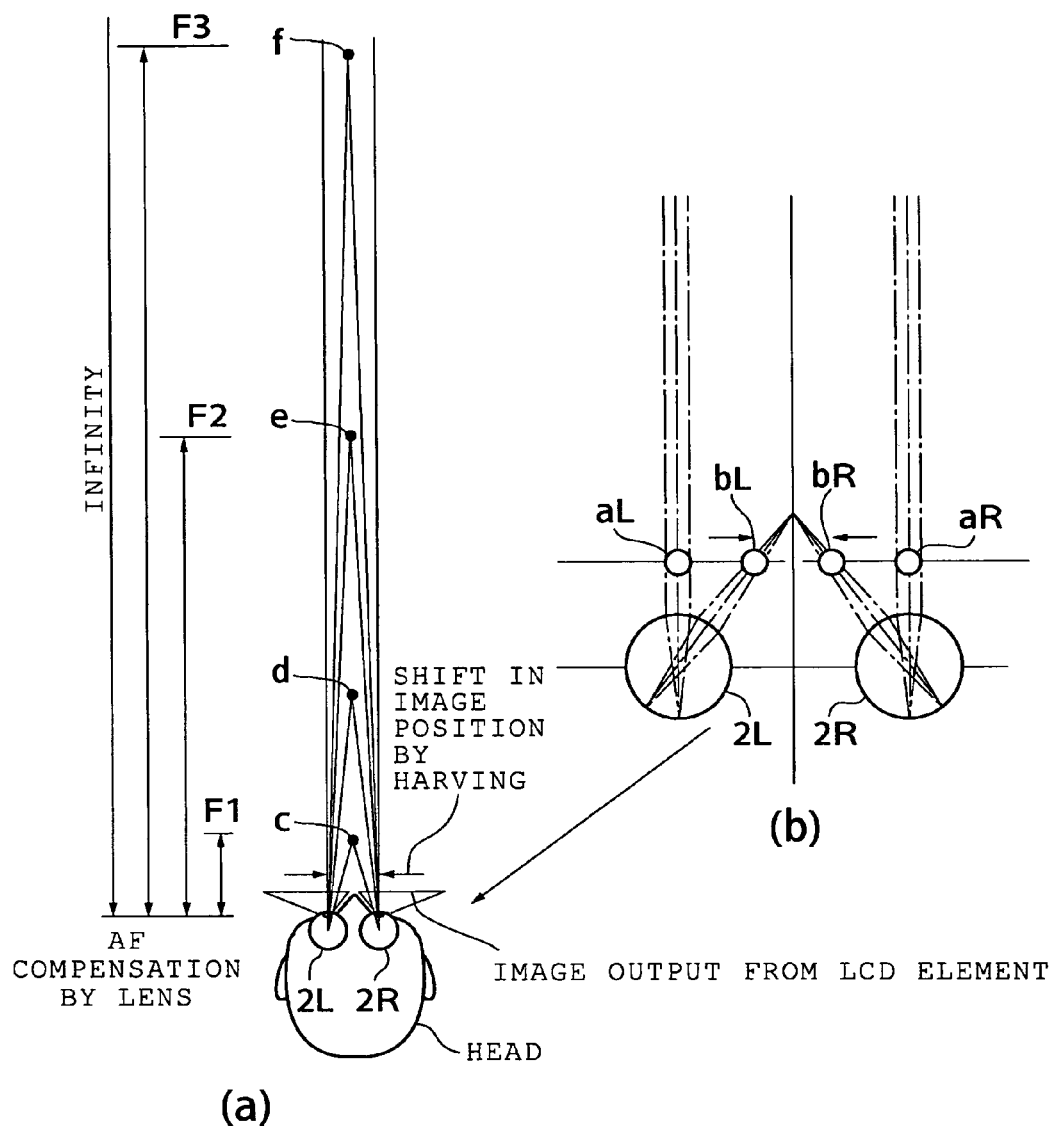
FIG. 25 is a view showing a position of a focus point and a direction of sight lines of both eyes in the right and left image display device when forming an image a far away and at a close distance.

FIG. 25 is a view explaining the above description understandably, wherein, for instance, when an image output from a liquid crystal element projected onto field of view of a human being is an image at infinity, as shown in (b), the image is projected such that each image can be viewed at positions of aL and aR on parallel light flux. But, when the image lies at a close distance, as eyes are cross-eyed and thereby a focus of eyes is arbitrarily so set as to see things at a close distance, so the image is projected such that the image output from liquid crystal element gets close inside and each image is viewed at positions of bL and bR and it is necessary that focus of a projection optical system up to crystal balls 2L and 2R and an image output from a liquid crystal two-dimensional display device be aligned with the positions of bL and bR accordingly.

In this case, it is conceivable that the image output from the liquid crystal element is shifted electrically or with a software application, but optical harving may be used.

When the optical harving is used, as there is no loss of data on a marginal area, the optical harving has an advantage that the optical harving can secure a broader field-of-view image than the shift by the electrical process or software application. Namely, if the image display device is configured such that a virtual image plane can be created optionally from a close-up image to an infinity image like points c, d, e and f in FIG. 25(a) by including the focus device and giving projection images of both eyes the lateral shift, it becomes possible to feel realism exceeding a cinema theater as if a screen floats in a sky.

Next, let's touch on item 3 "Get a high image quality better than a projector". Currently, there are varieties of projectors available on the market from so-called QVGA of resolution: (number of horizontal pixels) 320×(number of vertical pixels) 240 dots to SXGA of three-time resolution of 1280×1024 dots wherein a color image of 1280×1024 dots is separately created by three pieces of GRB liquid crystal elements and three images are put together to one image of three-time resolution of 1280×1024 dots.

If this embodiment of this invention uses a device of a low resolution, its liquid crystal element is visible in a large screen like a cinema theater size and thus realism gets lost. Therefore, when an image quality better than that of a projector is desired, it is requisite to adopt a so-called SXGA technology in which a color image of 1280×1024 dots is separately created by three pieces of GRB liquid crystal elements and its resolution is boosted to three-time resolution by compositing, and if this technology has a priority over others by all means, a glasses-type display device or a head-mounted display device becomes intolerable in its size as well as weight.

Figure 31:
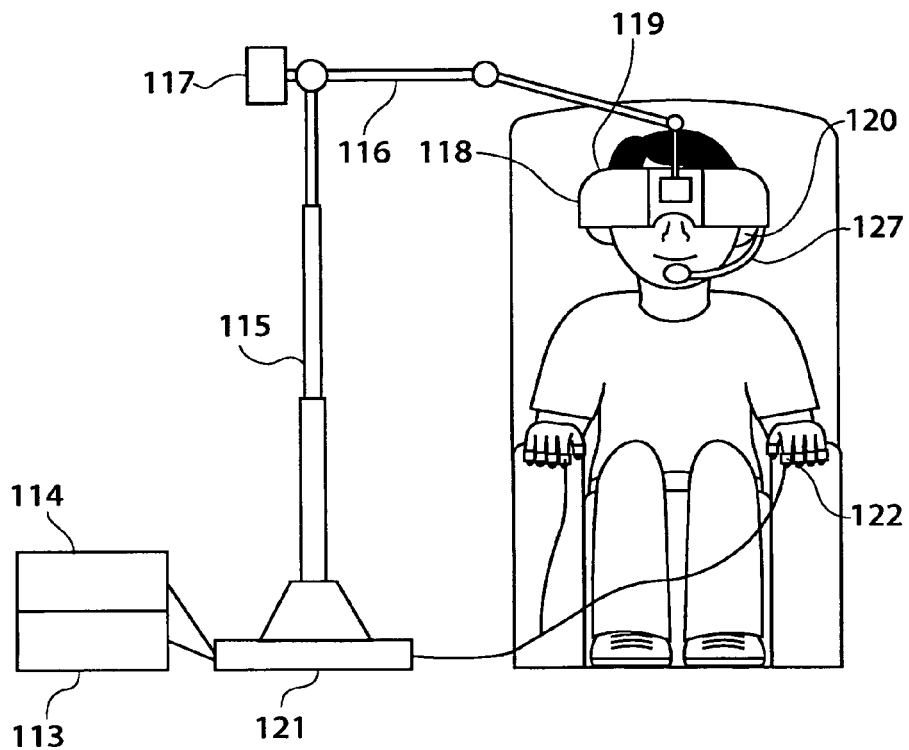
FIG. 31 is a view showing an overall configuration of a floor-standing image display device.

Then, as an example, an embodiment of this invention adopts a floor-standing type display device with a 360-degree viewing angle as shown in FIG. 31. Although the display device may be fixed onto a chair and/or a bed, this floor-standing type display device is perceived as a best when considering its ease-of-use mobility in a house. This system can be connected to DVD, video cassette deck and TV image output device 114 etc and is also connectable to a personal computer and video game device 113 etc like a conventional projector. This system is designed such that image composite/converter 121 converts images of these current contents to non-distorted images on a display device and a plurality of images can be displayed at a time on a display device.

With this system, image information from output device 114 and video game device 113 can be displayed by converting the image information with whole viewing angle display device 118 supported by anti-vibration articular bar 116 having a plurality of articular sections via support section 115 of an extensible extension bar. Herein, this system is provide with weight member 117 to cancel out weights of anti-vibration articular bar 116 and whole viewing angle display device 118 and a articular system is devised such that a user does not feel its weight and further the system follows a face movement.

Basically, a user feels only inertia force in moving anti-vibration articular bar 116 and whole viewing angle display device 118, and thus, with adoption of this system, a high quality image can be obtained. Furthermore, with adoption of this floor-standing display device, the high quality liquid crystal element can be separately arranged to both eyes, so, if a pitch between the liquid crystal elements is set so as to be displaced by half in the right/left images, a double high quality image can be obtained and thus it becomes possible to get an image quality exceeding that of a projector.

In this embodiment, the system is further provided with headphone 120 for cinema and DVD entertainments, suction-type face fitting device 119 allowing this system to be gently fitted on a face and microphone 127 for input of a voice for use in a personal computer/e-mail etc and this system is configured such that virtual keyboard 122 as shown in FIG. 13 and information of an operation button can be output to a peripheral portion of a display image.

Figure 30:
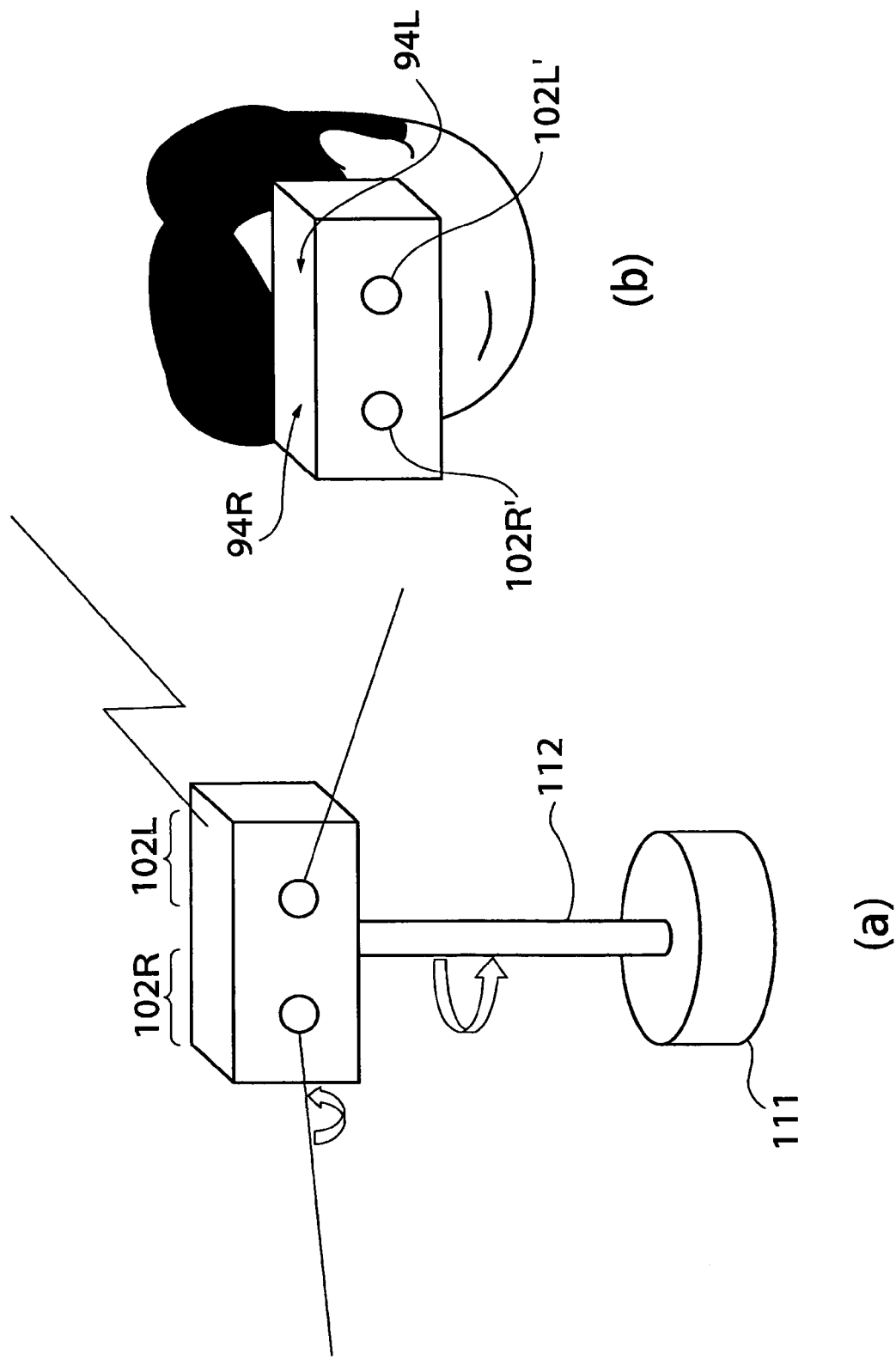
FIG. 30 is a view showing an example of a fixed-type image pick-up device for use in a security and disaster precaution and wild animal watching etc.

Next, let's move on item 4 "Get a three-dimensional image without feeling uncomfortable". Image pick-up device 90 is already described in FIG. 24, but, FIG. 30 shows two image pick-up devices for both eyes (102L, 102R or 102L', 102R') basically arranged at the same spacing as the both eyes for both eyes. When an image is output by two whole viewing angle display devices 118 of two display devices 75 shown in FIG. 23 and is arranged at the same spacing as that of eyes for both eyes, the image can be observed as three-dimensional image. In the diagram, the image pick-up devices (102L and 102R) are arranged on image pick-up rotary device 111 and image pick-up tilt device 112.

In an image pick-up device for both eyes as shown in FIG. 30 (b), the image pick-up device for both eyes includes display devices 94L and 94R on a face side that display images of image pick-up devices 102L' and 102R'. Namely, this is an example of wearable image pick-up devices with a display device.

However, such a displayed 3-D image is the same as the one seen through polarized glasses in a movie theater, wherein an image of an object viewed at a close range is blurred although it looks in a three-dimensional way and is different from an image of the object actually viewed at a close range by a human being. This is because, as explained in FIG. 25, we cross eyes when observing an object at a close range and then focus our eyes on it arbitrarily, so the image of the object in itself still exists on the screen although an illusion of the object lying at a quasi-close distance is successfully given by shifting images of both eyes inwards on a long-distance screen, and then the image on the screen and the image on the retina become defocused images.

As a solution for solving this problem, in order to duplicate an image like a 3-D image actually viewed through eyes, an automatic focus system is built in display device 75 as shown in FIG. 75 and a focus control is performed based upon information about a focus/image shift of the image pick-up devices for both eyes (102L, 102R or 102L', 102R'), and then any image at any position has no artificiality and thus a clear 3-D image can be obtained. Herein, focus information of the image pick-up devices for both eyes (102L, 102R or 102L', 102R') is information about an auto-focused image at a centre position of the devices and is provided to whole viewing angle device 118 and display devices 94L/94R along with image information. As for a method of providing, it takes a method in which information is written into a portion of a storage device. As explained about image pick-up device 90 in FIG. 24, when pupil variable aperture 79 is opened, a central image observed by the image pick-up device for both eyes (94L/94R or 102L/102R) is seen clearly and another image except for the central image is seen blurred, that is, the same image as viewed by a human being can be provided.

On the other hand, when pupil variable aperture 79 is stopped down, all images are seen clearly to some extent, so that an illusion image can be created such that an object at a long distance is contracted at a close range and an object at a close range is enlarged at a long distance when images on both eyes are caused to be shifted intentionally on the display device projecting onto a retina and a focus is set up based upon an amount in a shift. And, the focus system can provide offset on each eye separately and thus when a suitable setting for eyesight of an observer is implemented, there is no need for wearing glasses or a contact lens.

Lastly, let's discuss about item 5 "Get a high value added new function exceeding a human eye". Use of the foregoing functions so far enables to enlarge a personal computer screen at a long-distance position, so children's impaired eyesight due to a long-hour watching of a subject at close distance can be prevented. Furthermore, eyestrain derived from a long-hour viewing of a personal computer's display can be improved by an effect of this invention.

An embodiment of this invention to achieve all of 1. Do not get felt eyestrain, 2. Get realism of a cinema theater exceeding a projector, 3. Get a high image quality better than a projector, 4. Get a three-dimensional image without an uncomfortable feeling, and 5. Get a high value added new function exceeding a human eye as described above will be described below in reference to FIGS. 28 and 29.

Figure 28:
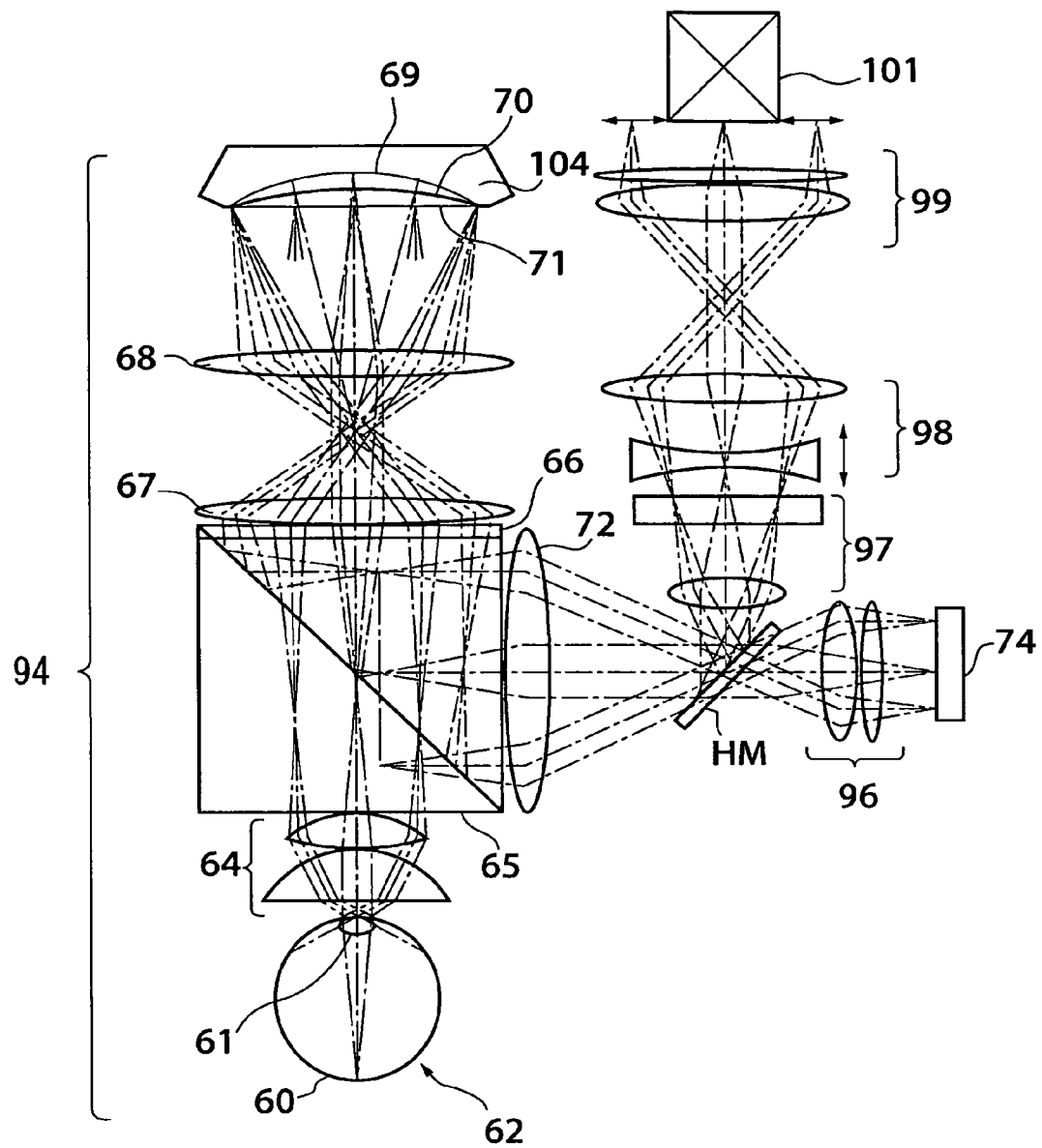
FIG. 28 is a view showing an example of a display device wherein an automatic focus control device is arranged in a fisheye-type optical system including an eyepiece lens.
Figure 29:
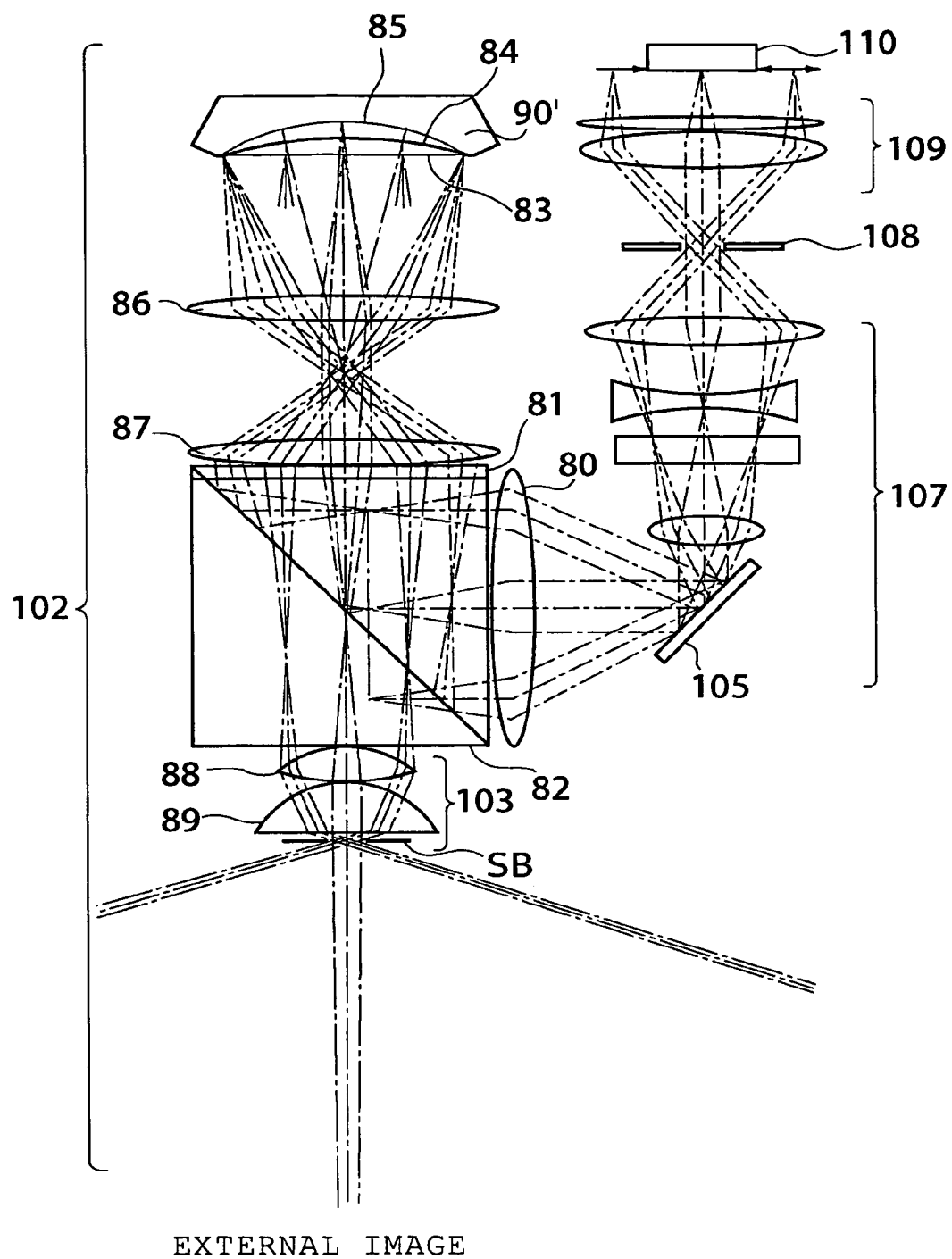
FIG. 29 is a view showing an example of an image pick-up device wherein an automatic focus control device is arranged in a fisheye-type optical system including an eyepiece lens.

FIG. 28 is a view to explain display device 94 and FIG. 29 is a view to explain image pick-up device 102.

FIG. 28 has common parts in the device in FIG. 23, so explanations about the common parts will be omitted herein and a different point will be mainly explained. Furthermore, a following explanation refers to only a part of a left-eyeball, but a part of a right-eyeball has the same configuration, too and thus it is needless to say that the part of the right-eyeball provides the same function and effect.

First of all, to deal with a focus arbitrarily set with a human-being crossed eye, fisheye-type optical system 64 is replaced with fisheye/AF (automatic focusing) optical system 95 that arranges an automatic focus control system in a fisheye-type optical system including an eyepiece lens. With arrangement of this automatic focus system, a focus control can be implemented with almost no change of an image-forming position by curvature-of-field correction mirror 104 in correspondence to a state of the human-being crossed-eye.

In the image display device of FIG. 28, as liquid crystal panel 74, a whole field-of-view viewable VGA liquid crystal element is used. Hereinafter, liquid crystal panel 74 will be referred to as whole field-of-view viewable VGA liquid crystal element 74. Light emitted from whole field-of-view viewable VGA liquid crystal element 74 transmits through half mirror HM after passing through AF (automatic focus) optical system 96, and is introduced by an optical system almost equal to the one as described in FIG. 23 and then an image of whole field-of-view viewable VGA liquid crystal element 74 is formed on retina 60 of eyeball 62.

On the other hand, light emitted from high resolution three-piece SXGA liquid crystal element 101 passes through AF (auto focus) system 99, and is introduced to zoom optical system 98. Zoom optical system 98 changes magnification by moving a negative lens back and forth. Then, The light passing through position shift harving 97 for two eyes is reflected on half mirror HM and is introduced by an optical system almost equal to one as described in FIG. 23, and then an image of high resolution three-piece SXGA liquid crystal element 101 is formed on retina 60 of eyeball 62.

With this configuration, all the effects of the foregoing 1 through 5 can be obtained and a new effect as shown in FIG. 26 is created. FIG. 26 shows in more detail a case where an image is optically composited with the half mirror by using a compositing method of image information control device 27 shown in FIG. 12, and shows an image on a side of the left-eyeball as an example herein.

FIG. 26 shows a field of view of this embodiment in a two-dimensional way as practically necessary viewing angles of −50 to +40 degrees in a longitudinal direction and −75 to +65 degrees in a lateral direction. As a matter of course, large distortion occurs because an image is projected onto eyeball 62 using the fisheye-type optical system, but the same concept as the one shown in FIG. 12 may be applied to handle this distortion. Preferably, the foregoing problem can be solved by introducing distortion with reverse characteristics to distortion of the optical system projecting onto the eyeball with the optical system from the half mirror to the liquid crystal element, thereby. Anyway, FIG. 26(a) shows image 91 output from whole field-of-view viewable VGA liquid crystal element 74 for a left eye, wherein the image display device is configured such that the image can be viewed across whole field of view. A blank portion at a centre thereof is a portion where an image is composited by half mirror HM and image 92 output from high resolution three-piece SXGA liquid crystal element 101 for a left eye is composited.

In the meanwhile, image 92 output from left eye field-of-view viewable high resolution three-piece SXGA liquid crystal element 101 is shown in (b) of FIG. 26. An angle of output image 92 is smaller than viewing angles of −50 to +40 degrees in a longitudinal direction and −75 to +65 degrees in a lateral direction by using zoom optical system 98 as described above. The viewing angle of the image is variable from ±15 degrees (equivalent to an image of 52 inch square at 2 m ahead) to the above-defined largest degrees, and image 92 output from left eye field-of-view viewable high resolution three-piece SXGA liquid crystal element 101 can be obtained as a high quality image of horizontal pixels 1280×vertical pixels 760 dots.

The reason why an image to be viewed is separated into image 91 output from left-eye whole field-of-view viewable VGA liquid crystal element 74 and image 92 output from left-eye field-of-view viewable high resolution three-piece SXGA liquid crystal element 101 and the separately formed images are composited is that viewing angles of contents about DVD, VIDEO and BS (Broadcasting Satellite) images etc currently available in the market are predetermined and an image size suitable for its image quality is more preferable than the wide viewing angle. Namely, if an angle of view is broadened needlessly, roughness of a pixel become discernible and thereby a disadvantage that poorness of an image quality is annoying becomes larger than an advantage that a large screen is obtained. Therefore, in this embodiment of this invention, an angle of view is set so as to be most suitable angle of view to these contents by way of a zoom unit and under any setting thereof, image 92 output from high resolution three-piece SXGA liquid crystal element 101 is configured to be capable of obtaining a high quality image of horizontal pixels 1280×vertical pixels 760 dots at all times.

When output images 91 and 92 are composited with half mirror HM, composite image 93 as shown in FIG. 26(c) is obtained and is projected on a retina. If the image is processed electrically and with a software application, horizontal/vertical resolutions of 1280×760 dots are split in accordance with an angle of view corresponding to a maximum screen, so that the resolution within a predetermined angle of view gets deteriorated. But, use of an optical zoom is very effective in this regard and a display device of a high image quality can be provided.

An explanation about a role of image 91 output from whole field-of-view viewable VGA liquid crystal element 74 will be further given in detail. Output image 91 is configured to cover almost whole field of view of a human being and by controlling AF optical system 96, any focus position can be set as described above. Even if image 92 output from high resolution three-piece SXGA liquid crystal element 101 is set in such a way that the image is viewed at a close distance by a control of AF optical system 99, image 91 output from whole field-of-view viewable VGA liquid crystal element 74 is settable so as to be positioned at infinity as well by way of AF optical system 96, so that a plurality of focus images in responsive to any of lateral brisk eyeball movements in order not to cause eyestrain can be provided.

Once a plurality of focus images are composited, a fixed image at a different focus position can be created as one image in the event that other image displays an active movement. Namely, when a human eye focuses on the fixed image, other actively moving image becomes defocused and then information of a display about the actively moving image can be alleviated from human consciousness. This can alleviate the sickness in VE developed by following an actively moving image, and, on the whole, this is effective in relieving eyestrain.

Furthermore, in order to prevent an accident like a blackout developed when a child keeps on eyeballing a TV image and impaired eyesight developed by viewing a 3-D image against the laws of nature, there are some general consumer products like wearable display device etc that a children, who is 16 years old and below, is prohibited from wearing. However, in this invention, the system is configured so as to provide a plurality of focus images and duplicate a state where a 3-D image etc is naturally viewed with an eye and furthermore the system has a function that sets an image to infinity so as not to eyeball a close range object and an adjustment system that matches spacing between eyes, so it is effective that this invention can provide an easier image on an eye than a typical personal computer and TV entertainment.

And, by regularly outputting a character image etc to image 91 output from whole field-of-view viewable VGA liquid crystal element 74 and thereby, causing viewer's attention to be directed toward output image 91 intentionally, the system can be used in such a way that eyeballing image 92 output from high resolution three-piece SXGA liquid crystal element 101 is avoided as well, so this invention further has an easy effect on an eye, too.

When output image 92 is changed to any size using the zoom system as described above, certainly it is necessary that the zoom system be controlled so as to limit a range of output image 91 such that the changed size does not overlap with the image. Principally, frame portions of both images are controlled so as to slightly overlap with each other and an overlapped portion of output image 91 is set to an image with a bright frame, the overlapped portion looks like a frame on a screen or TV and thus nobody has a sense of abnormality to a composite image.

And, the VGA liquid crystal element is used for the whole field of view, but if a viewing quality of an image is poor with this element, it might lead to reducing realism, too. Inherently, a marginal image is for not having blackout and/or eyestrain felt and thus there is no need for dealing with a vigorously changing motion image. Therefore, a late response-type liquid crystal element for a still image of high resolution used in a digital camera etc may be adopted.

A method of compositing image 91 output from whole field-of-view viewable VGA liquid crystal element 74 and image 92 output from SXGA liquid crystal element 101 has been described so far and if this composite is applied to both eyes separately, a total of four liquid crystal elements are needed. But, this is not preferable even from a view point of a size and a cost. On the other hand, there is a method in which image 91 output from whole field-of-view viewable VGA liquid crystal element 74 and image 92 output from SXGA liquid crystal element 101 are optically split without having independent liquid crystal elements for both eyes and an image is separately provided to both eyes, but, in this case, a different image cannot be sent to both eyes and image information having parallax conscious of a 3-D image cannot be displayed separately. Thus, FIG. 52 shows a configuration in which the image display device uses two SXGA liquid crystal elements and a beam splitter that composes and splits each light flux is arranged, and then both of the composite image and the above-mentioned 3-D image can be provided by switching over the beam splitter to a half mirror type and a total reflection (or a total transmission) type.

Figure 52:
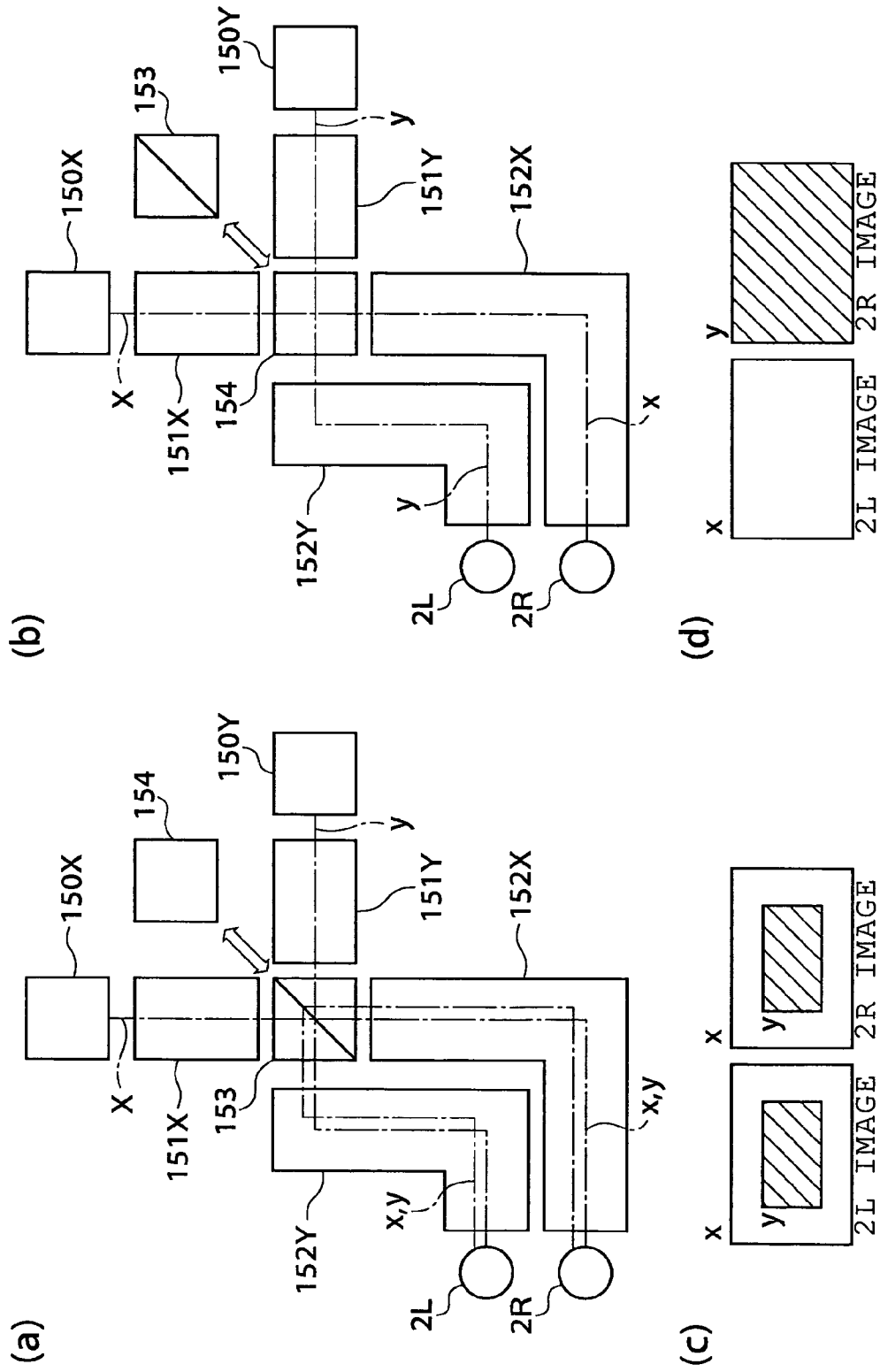
FIG. 52 is a schematic view showing one of examples in an embodiment of this invention.

In FIG. 52, (a) thereof is an example in which images x and y different in size are composited and the composite image is displayed (c) on left and right eyes as the same image and x is equivalent to image 92 output from SXGA liquid crystal element 101 and y is equivalent to image 91 output from VGA liquid crystal element 100. (b) of FIG. 52 is an example in which different images x and y with same size are displayed (d) on left and right eyes as a different image. As described in FIG. 8, a 3-D image can be enjoyed by converting x and y images to different images having parallax. (a) and (b) of FIG. 52 show optical paths of light flux x and y when switching between half prism 153 compositing light flux x output from high resolution three-piece SXGA liquid crystal element 150X and light flux y output from high resolution three-piece SXGA liquid crystal element 150Y and optical member 154 designed so as to make its optical path equal to that of half prism 153.

In FIG. 52 (*a*), light flux y of high-resolution three-piece SXGA liquid crystal element 150Y is zoomed down to a size corresponding to resolution of an image output from content by optical zoom unit 151Y. Contrary to this, light flux x output from high resolution three-piece SXGA liquid crystal element 150X is zoomed up to an image of a whole field of view by optical zoom unit 151X. Light flux x and y are split by half prism 153 respectively and one of respective split light flux and another of split light flux are composited and as light flux x and y, light flux x and y are projected respectively on a retinal of left eyeball 2L and a retinal of right eyeball 2R as the same image (c) by relay optical systems 152*y* and 152X. On the other hand, in FIG. 52 (*b*), light flux y output from high resolution three-piece SXGA liquid crystal element 150Y is zoomed up to a predetermined size of an image by optical zoom unit 151Y, whereas light flux x output from high resolution three-piece SXGA liquid crystal element 150X is zoomed to the same size as the one of light flux y by optical zoom unit 151X. Light flux x and y transmit through without being split/composited by optical member 154 and are separately projected on retinas of left/right eyeballs 2L and 2R as respectively independent image (d).

In this embodiment, both images are high quality images that use the SXGA liquid crystal element, so a clear image can be obtained even on a marginal portion of the image like (c). In this case, for instance, let light flux y of (c) be a screen image of a cinema theater, it is good to provide a marginal image as the image including a viewer of a cinema theater. As an image quality at a marginal portion is good, realism can be felt as if an observer actually stays in a cinema theater and as a result, there is an effect that an observer can enjoy an image as the image having depth. Furthermore, there is no doubt that only two SXGA liquid crystal elements can obtain the same performance as the system of the total four liquid crystal elements, so this system takes a big effect in decreasing a cost and reducing a size.

Now, let's move on a sickness in VE (Virtual Environment) The sickness in VE is different from eyestrain and is a phenomenon that an observer feels when viewing a wide field-of-view image like this invention. The sickness in VE is not limited to a display of an active movement and regarding a slight flicker of an output image due to a handshake of a video camera, a change in scenery thanks to enlargement and contraction of an image by a zoom action of a video camera (especially, a contraction action that makes an image smaller creates an image that can be perceived when a human being drives backwards at a high speed and this image does not exist as a past memory. That's why people are prone to the sickness in VE when observing a rear scene in a car.) and regarding an observation image of a wide area scenery captured by turning a video camera laterally etc, generally, a brain gets uncomfortable feeling against an image of moving scenery although the observer does not move at all, and in some cases, observers start feeling bad as the sickness in VE. Especially, this feeling is strongly felt when scenery flows in an observer's line of sight and the higher resolution of an image, the wider a field of view, the sickness in VE is felt at the same time when obtaining realism and a sense of 3-D and nobody can escape from this phnomena.

This invention proposes to use an optical zoom for maintaining resolution of an image at a predetermined level and with regard to a moving image, it is enough to make an image size small, but this is not effective in order to obtain realism by way of a screen of a wide field of view. The reason why generally, a movie image does not cause the sickness so much is that the movie uses a lot of images captured with a fixed camera of paying an attention to the sickness or images from a leading actor/actress's point of view with reference to an object at a center. However, a DVD image, HD image, satellite broadcasting and terrestrial broadcasting images that are not assumed to be shown at a cinema house are not created on the assumption that they are projected on a wide field-of-view screen and therefore, if they are made wide field-of-view images forcedly, it might cause the sickness.

Then, as a method in which a wide field-of-view image does not cause the sickness in VE as it is, a control method in which image information is temporally taken into an internal storage device and then the image information is processed in correspondence to an image movement, and the information that is stored again is shown to an observer is conceivable. In this case, firstly, image data of DVD, satellite, high vision and terrestrial broadcastings are captured into an internal buffer and an image output from the internal buffer is divided into a marginal image block and a central image block. A lateral shift amount of content of an image in each block during a predetermined period of time is computed and when content included in the marginal image block and content included in the central image block are shifted toward the same direction, it is judged that these shifts are attributed to a hand shake or a lateral screen movement and then images are processed such that an image bit as a whole is shifted by the same amount as the movement amount toward a direction opposite a direction of content movement in such a way that the image does not move laterally during the predetermined period of time and thereby a whole screen looks still.

Of course, as the marginal image gets lost due to a relative shift of an image, it is necessary that the marginal image portion out of display image information be secured for a shift correction of an image when this control method is used.

When this relative shift amount is larger than an image portion for a marginal correction, a method for switching over to a next screen with no relative shift is taken. Namely, a small movement like a handshake is completely corrected and an image that moves in an observer's line of sight like a flowing scene becomes an image as if a camera's image-pick up position is shifted a little bit one after another. This is the same method as the observer blinks while the scenery moves in the line of sight when an observer views scenery of a wide area and there is no need for viewing a brisk flow of the image as it is, and thus this enables to decrease outbreak of the sickness in VE.

This is the same even in a case where an device of this invention is used in a 3-D video game with a player's point 4 of view, wherein a picture image of the conventional image display device that causes the sickness in VE by seeing flowing scenery with a movement of a joystick that changes an angle of a line of sight is changed into a picture image such that a whole screen thereof is switched over sequentially one after another like blinking during a scene movement in a player's line of sight. This enables a reduction in the sickness in VE attributable to a wide field-of-view image. Obviously, this sickness in VE occurs because a brain gets confused due to non experienced encounter in the past, so the sickness will be improved by getting used to it.

Thus, use or non-use of this picture image change mode is configured so as to be freely selectable via ON/OFF switch. As for a child, patient and relaxation-oriented user, it is effective that the sickness in VE is prevented byway of the picture image change mode and it is preferable that a non-processed image be provided to an attraction and game that enjoys the sickness in VE. Inherently, as an output of a wide field-of-view image requires distortion correction, it is desirable that a distortion correction and the preventive sickness in VE processing be performed in the same control system.

Furthermore, in addition to preventive measures of the sickness in VE, it is important that tiredness is not felt and to this end, it is necessary that a suitable image for an eye of each person be provided to left/right eyes. A space between human eyes is an order of 6.5 to 7.5 cm and with some adjustment of a space between right and left images, an image having no abnormality and no eyestrain can be provided.

When providing an infinity image, it is necessary that images of left and right eyes be set at a distance matching a space between observer's eyes and to this end, calibration is required when an observer wears a product of this invention. Calibration is an adjustment method in which a cross-marked image is presented alternatively to the left and right eyes and a state of the cross-marked image looking double is adjusted such that the cross-marked images overlaps. Both images can be adjusted by a harving system or an adjustment of a digital image by way of a software application by changing a space between both images, and thus a space between observer's eyes is calibrated by an input via an input member such that the cross-marked images overlap by way of an observer's line of sight.

Herein, it is necessary that the cross-marked image be adjusted toward a direction where the space between the cross-marked images is shortened as a default of a direction where the cross-marked images exist apart. This is due to the following reason. When an observer is in a state of viewing a close range image, it is easy to view the cross-marked image by overlapping, but when the cross-marked image is spaced farther away than a space between the left and right infinity images equal to a space between both eyes, a human eye cannot view them by overlapping. Thus, by defaulting the direction of the cross-marked image apart from each other, a space between eyes can be easily measured when an object is at infinity, not at a close range.

Next, an example of an embodiment of image pick-up device 102 will be described in reference to FIG. 29. FIG. 29 has many common parts as the device of FIG. 24, an explanation about the common parts will be omitted here in and a different part will be mainly described.

First, when focus is achieved using a focus control device of AF optical system 109 arranged in front of CCD two-dimensional array sensor 110, a position of forming an image at curvature-of-image correction mirror 90' varies. To correct this, AF optical system 109 is replaced with fisheye/AF optical system 103 that has lenses of the same characteristics as lenses 88 and 89 of FIG. 24 arranged on an object side and further has an automatic focus control system is used.

In FIG. 29, image pick-up device 102 is configured such that an external image is projected on CCD two-dimensional array sensor 110 via zoom system 107, pupil variable aperture system 108 and automatic focus (AF) system 109 after light flux is deflected by mirror 105.

Furthermore, states of a zoom and focus are stored, and information of the states of the zoom and focus are send to whole viewing angle display device 94 and then with duplication of all the states faithfully, distortion characteristics can be made same and thus a electric and software application distortion corrections by an image composition/converter device are not required and a faithful image can be obtained.

Figure 27:
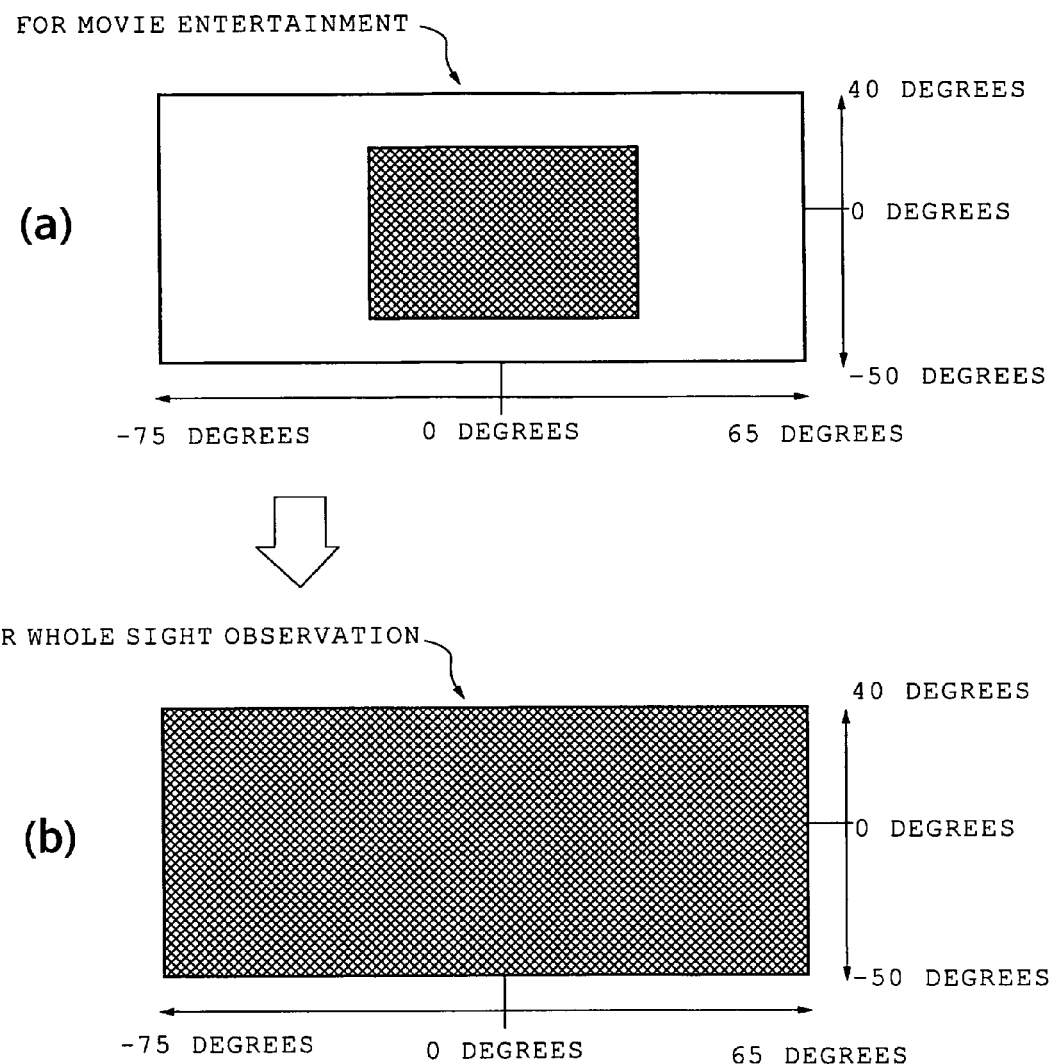
FIG. 27 is a view showing a compositing image when adjusting a zoom unit. (a) shows a case for a movie viewing purpose, (b) for a whole file-of-view observation and an arrow indicates that the zoom unit changes a mode from the movie viewing to the whole file-of-view observation.

(a) of FIG. 27 shows a state where an image is output from current content, whereas (b) thereof is a view showing a case where information from image pick-up device 102 is configured to be viewable on a whole field-of-view screen. This can be achieved by matching zoom system 107 to a status of the whole field-of-view image and matching zoom system 98 within whole viewing angle display device 94 to the same status.

Herein, when a projection image is set to become larger than an effective angle of view of the CCD two-dimensional array sensor by driving a zoom system of image pick-up device 102, image pick-up device 102 becomes a fisheye-type optical system that has a zoom system and can enlarge a central portion of an external image. If output image information is observed on whole viewing angle display device 94 while fixing the zoom system, an image that enlarges the central portion of the whole field-of-view image can be observed. In this case, as distortion states of the zoom system and the whole viewing angle display device are different from each other, it is necessary that distortion be corrected electrically and in a method of a software application. But, an enlarged image of high resolution can be obtained even when comparing with a method in which a portion of an image obtained by a conventional fisheye-type optical system is cut out and then the cut-out portion is enlarged. Therefore, this invention works well with respect to usage necessary to enlarge a specific portion from a monitoring of a wide area such as security and disaster precautions and wild animal watching etc.

Fixed-type image pick-up device 102L and 102R shown in FIG. 30 (a) may be used in the security and disaster precautions and wild animal watching etc. Furthermore, as shown in FIG. 30 (b), display devices (94L and 94R) are used and actions of a head's upward/downward and rightward/leftward movements of an observer wearing whole viewing angle display device 118 are detected, and by directing the same action as the one of the human head movement to image pick-up devices (102L and 102R) by way of a remote operation, thus, the same realism as the head points at directions of upward/downward 90 degrees and rightward/leftward 360 degrees at a place where the image pick-up devices (102L and 102R) are arranged can be enjoyed at any place.

However, when information of an image and operation is transmitted via a wireless or the Internet, a volume of image information becomes large and thus a long-hour transmission becomes a brake. Therefore, it may be devised such that an image is transmitted in a way like a frame-advance still picture instead of a motion picture, and thus a situation on the spot is instantaneously known. The (b) of FIG. 30 is a wearable image pick-up device with display devices (102L', 102R', 94L and 94R) and since it is sufficient to be capable of checking only how a taken motion picture looks like from a view point of the display device, a low priced and lightweight liquid crystal element as shown in FIG. 24 can be used and designed so as to be portable. With these image pick-up devices (102L and 102R), the whole field-of-view image and the 3-D image can be obtained anywhere and thus, it can be expected that a market expands as a new content and new opportunities come into bud in many business areas.

Figure 32:
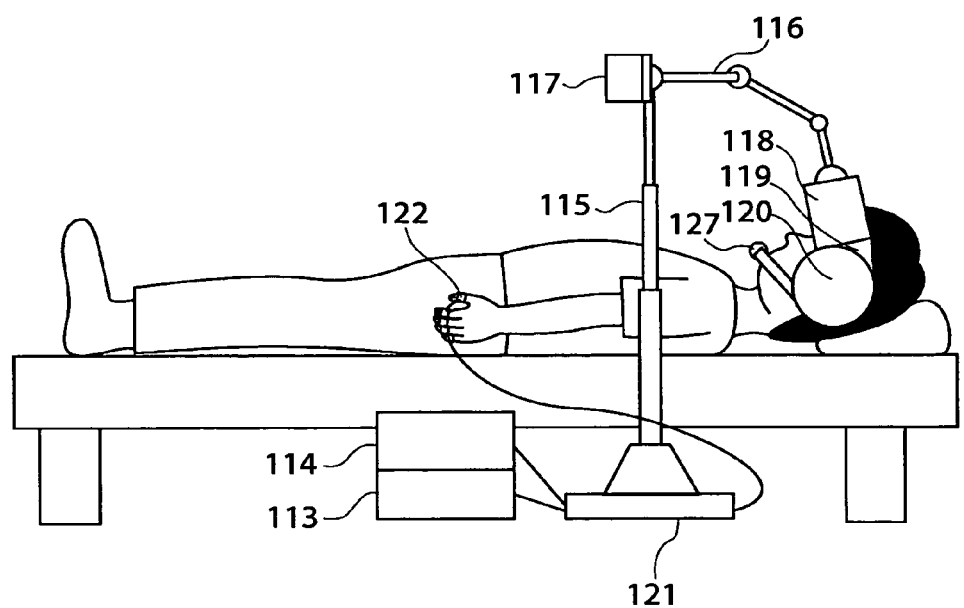
FIG. 32 is a view showing a case where a display device of a whole viewing angle is used when lying on the back.

FIG. 32 shows that whole viewing angle display device 118 as shown in FIG. 31 is used while the observer lies on his/her back. Providing of a realism-packed image to movement restricted patients and bedridden senior citizens has a big relaxation effect and marketability of the image full of realism is large from a potential business point where vigor for recovery from illness and for living can be given.

Figure 33:
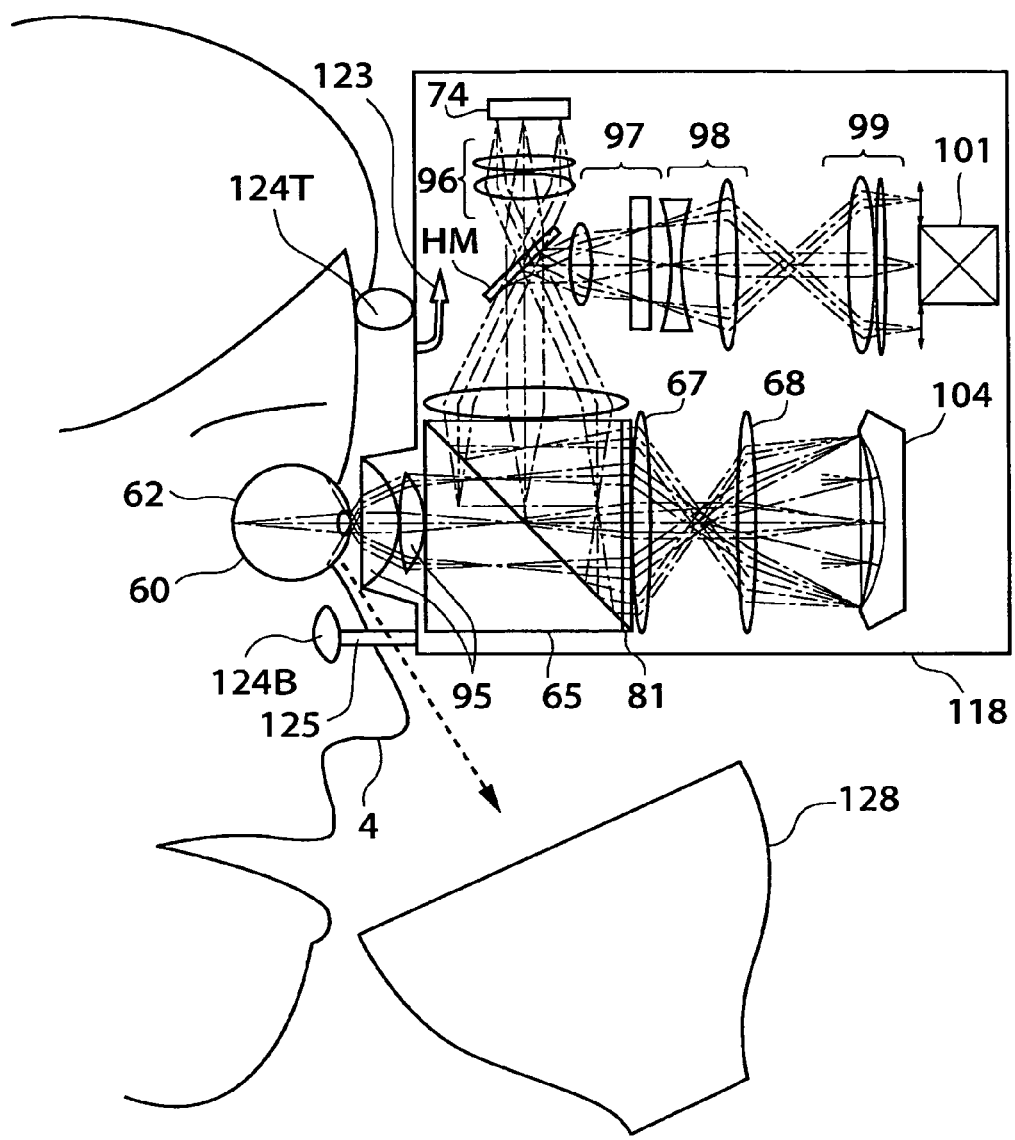
FIG. 33 is a view showing an overview of a configuration of the display device of a whole viewing angle that fits a face by absorption.

FIG. 33 is a schematic cross-sectioned view taking a side view of whole viewing angle display device 118 of FIG. 31. As shown in the diagram, a necessary viewing angle of a longitudinal direction is narrower than that of a lateral direction, so a deflecting direction of polarizing beam splitter 65 is made into the longitudinal direction so that polarizing beam splitter 65 can be designed to be compact. Further, in order to use a space efficiently, it is desirable that, in each optical system, a part where light flux does not pass through be cut in the longitudinal direction.

As shown in FIG. 33, whole viewing angle display device 118 has a suction-type face fitting unit. By sealing across a wide area of a space between a body of whole viewing angle device 118 and a face by contact material 124T and setting a slightly negative pressure in the inside by suction device 123, the viewing angle display device 118 is designed so as not to a sense of abnormality felt around a nose when wearing glasses and a feeling of fastening to an ear when mounting a headphone. Of recent, many of minus ion or fragrance generating devices have been developed and incorporation of these devices into the display device takes a further relaxation effect. Furthermore, as contact material 124T does not completely seal the space, so an inside air is not built up and a wind is felt to some extent, so the display device is devised so as not to be offensive to a wearer. In addition, contact material 124T has a function such that a space between an eye and an eyepiece lens is not contracted than a predetermined space and therefore, safety designing is carried out.

In contact material 124B at a lower portion of contact material 124T, transparent material 125 capable of observing an external is arranged entirely below an eye so that a wearer can have a glass of water etc from water cup 128 etc while wearing the body of whole viewing angle display device 118. Contact material 125 is composed of a ND (neutral density) filter that limits an incident light amount such that light incident upon a display image of the internal from an external does not deteriorate an image quality.

Figure 34:
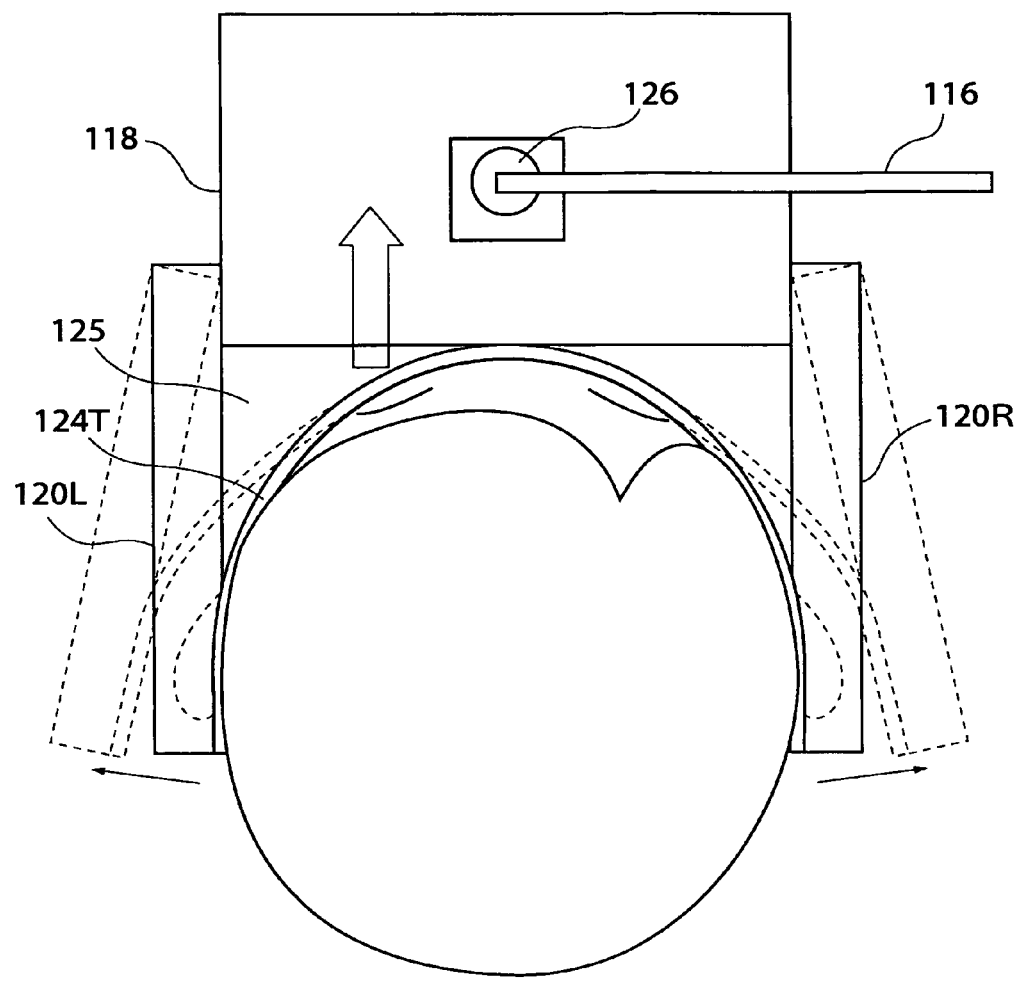
FIG. 34 is a plane view looking at the display device of a whole viewing angle from an upper position.

FIG. 34 is a plane view taking a top view of whole viewing angle display device 118 of FIG. 31, wherein anti-vibration articular bar 116 supports the body of whole viewing angle display device 118 via articular member 126, but its supporting position is arranged at a position of a centre-of-gravity of the viewing angle display device including headphone sections 120L and 120R. With this arrangement, the body of whole viewing angle display device 118 is designed so as to be able to maintain its posture and is constructed so as to be able to be mounted without an uncomfortable sense even when taking a seat or lying on his/her back. Because, weight member 117 balances such that an observer does not feel a weight of the body.

With contact material 124T, headphone sections 120L and 120R are also placed at a close contact with a head so that a wearer does not get a fastening feeling or an ear's pain unlike a conventional headphone. In a case of dismantling the body of whole viewing angle display device 118 from a head, headphone sections 120L and 120R are opened rightward and leftward shown by broken line in the diagram and then the internal negative pressure gets back to an atmospheric pressure. This enables to remove the body thereof from a head easily.

Figure 35:
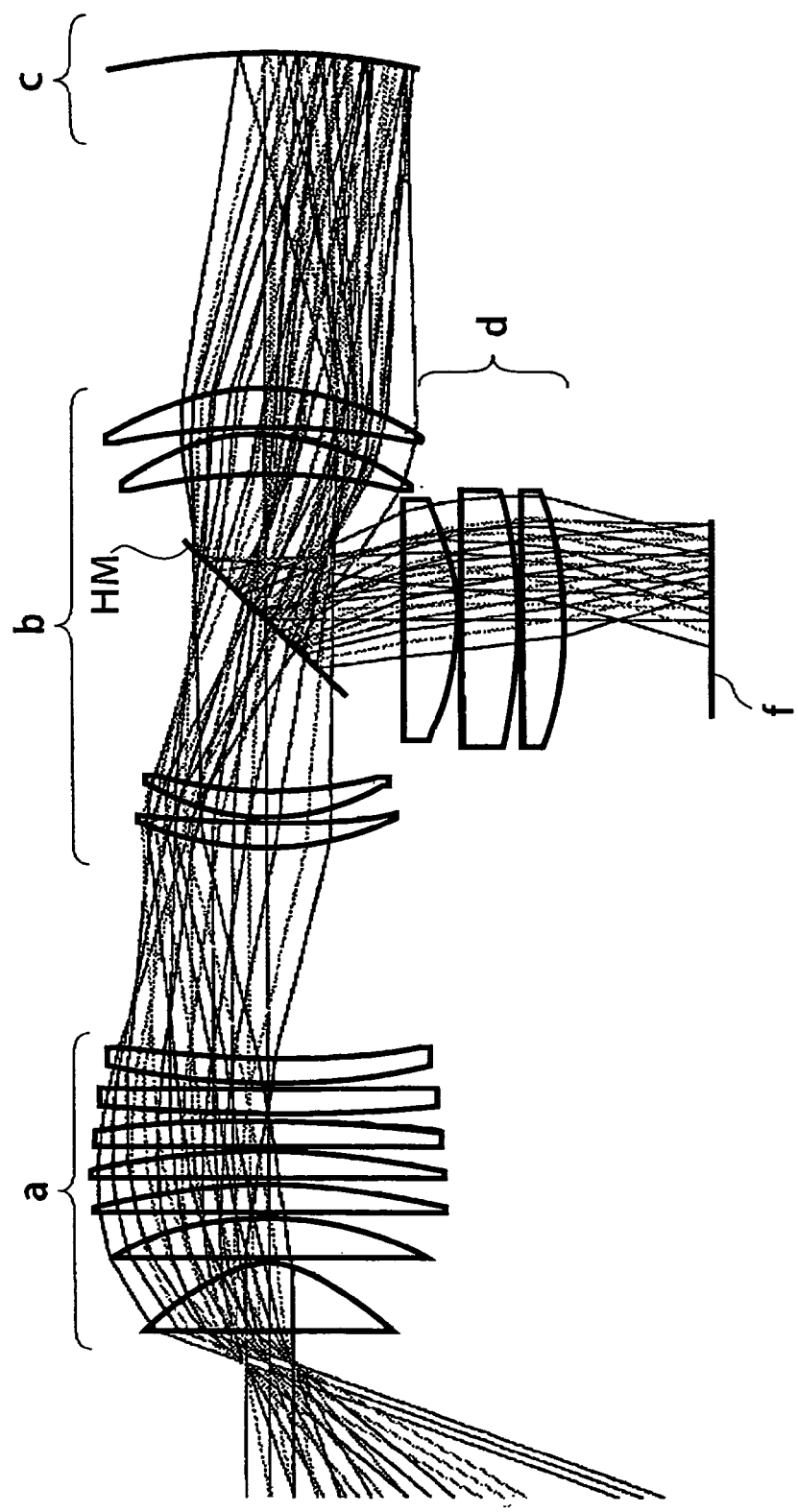
FIG. 35 is a schematic view of a fisheye-type optical system including the eyepiece lens in the embodiment of this invention and a view showing light flux of ±70 degrees when the crystal ball moves 20 mm, considering a quick movement of a human-being eye.
Figure 36:
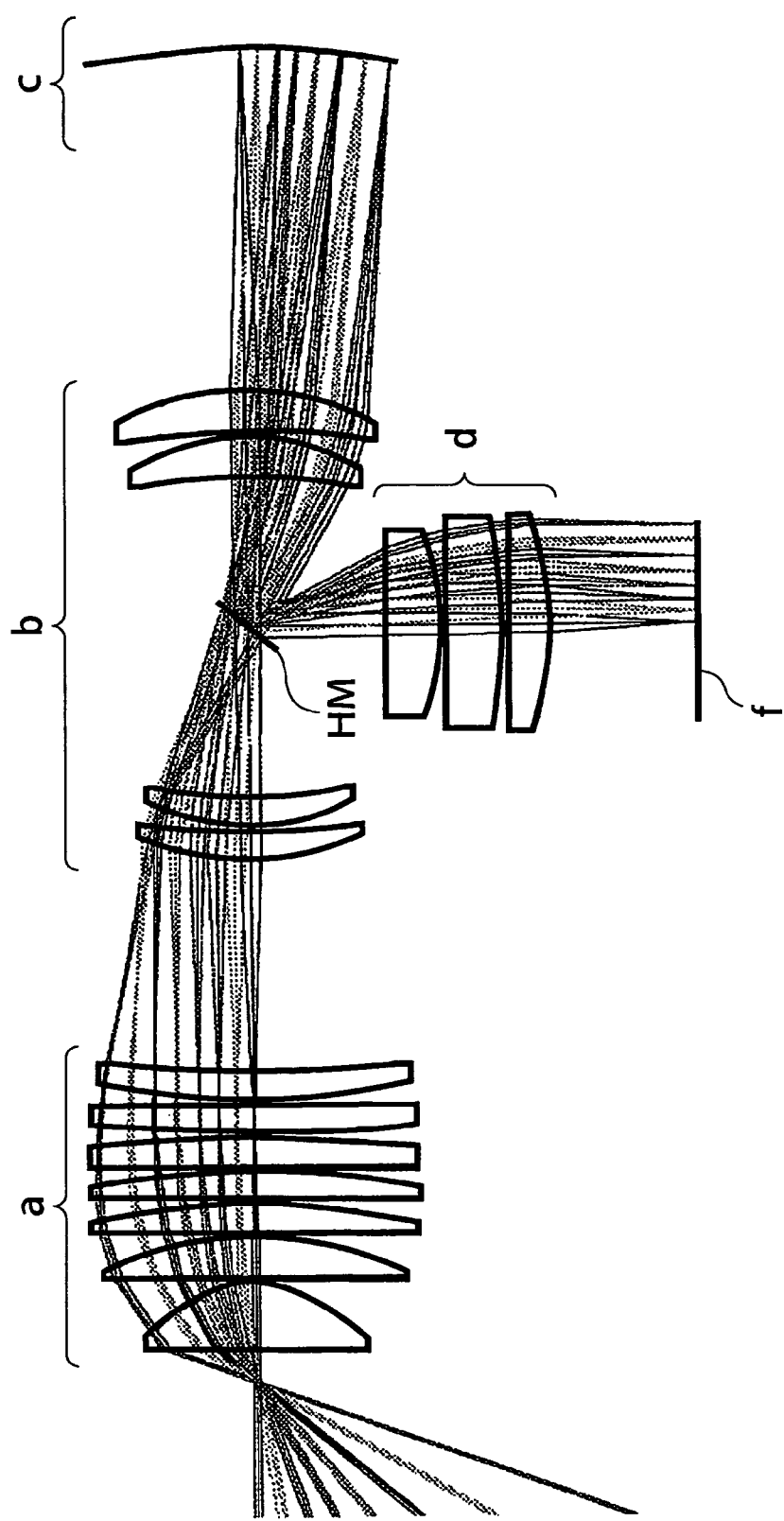
FIG. 36 is a schematic view of a fisheye-type optical system including the eyepiece lens in the embodiment of this invention and a view showing a case where a size of an eye pupil is set at an order of 3 mm equivalent to a typical size thereof indoors.

Next, an example of a simple optical design will be described. FIGS. 35 and 36 are the same optical design and FIG. 35 shows light flux of ±70 degrees when a crystal ball moves by 20 mm with consideration of a human eye's brisk lateral movement. (a) section of an optical system is eyepiece lens group including a Conic surface, wherein a hyperboloid lens is used on a side of a pupil in an eyepiece lens in order to suppress coma. Its curved surface Z (r) is represented by $$Z(r) = \frac{c \times r^2}{1 + \sqrt{\{1 - (1+k) \times c^2 \times r^2\}}}$$

where c is curvature, $r^2=x^2+y^2$, k is a Conic coefficient and K<−1 is used.

Coma is improved, but, large curvature of field occurs due to use of the hyperboloid lens and telecentricity of each light flux is overly distorted at a position of forming an image emitted from an exit pupil of eyepiece lens group (a) (a conjugate position in a relation to a retina). When the image formed at this position of forming the image is relayed to curved surface mirror (c) by way of relay lens group (b), naturally, the large curvature of field and the distorted telecentricity are duplicated. But, this curved surface mirror (c) has an effect that reverses a curved direction of curvature of field produced on an image formed by reflected light flux, thus curved surface mirror (c) is definitely requisite to obtain an almost flat image plane on final image plane (f) projected by objective lens group (d) after the image is deflected by half mirror HM arranged in proximity to the pupil.

In FIG. 35, although spherical aberration seems to be large, but this is for checking vignetting and it can be said that spherical aberration and coma herein can be substantially neglected when the spherical aberration and coma are checkable with a real pupil (suppose that the size of the human pupil is 3 mm when viewing an object indoors).

Furthermore, with arrangement of the curved surface mirror in proximity to a surface of forming an image, coma and spherical aberration produced by the mirror reflection can be reduced. Furthermore, arrangement of curved surface mirror (c) at a position a little bit deviated from the surface of forming an image enables to produce coma and spherical aberration intentionally and correct the coma and spherical aberration so as to cancel out coma and spherical aberration produced by lens groups (a), (b) and (d).

Furthermore, as shown in the diagram, a tilt of telecentricity (a difference in an incident direction of each principal ray with respect to the reflection surface) is overly different on curved surface mirror (c) depending upon an incident angle upon the eyepiece lens section. To correct this, curved surface mirror (c) is made into an aspherical surface mirror and thereby it becomes necessary that the tilt of telecentricity be changed forcibly.

Herein, curved surface Z (r) of the aspheric surface mirror is represented by $$Z(r) = \frac{c \times r^2}{\{1 + \sqrt{1 - (1+k) \times c^2 \times r^2}\}} + A \times r^4 + B \times r^6 + C \times r^8 + \\ D \times r^{10} + E \times r^{12} + F \times r^{14} + G \times r^{16} + H \times r^{18} + J \times r^{20}$$

where curved surface Z (r) of the aspheric surface mirror is a rotationally symmetric quadratic curve, c is curvature, $r^2=x^2+y^2$, A, B, C, D, E, F, G, H and J a spherical coefficients (even number order), k is a Conic coefficient, k=−1 and a saucer-shaped curved mirror of a>1.0*10$^{-7}$ (but, a mirror is a concave surface. In a case of a convex surface, a<−1.0*10$^{-7}$) is used.

Then, as shown in FIG. 35, it can be seen that all light flux is projected without vignetting. FIG. 36 shows light flux in a case where all light flux is sure to be projected without vignetting and a pupil with a size of an eye pupil set to an order of 3 mm being a normal size indoors is directed to an optical axis. FIG. 36 shows light flux of 0, 10, 20, 30, 40, 50, 60 and 70 degrees and it can be seen from FIG. 36 that an image of a small aberration is formed on a flat image plane. Furthermore, the tilt of telecentricity is linearly corrected across all the light flux, too and the display device is so configured as to easily incorporate the zoom system, automatic focus system and harving system as described.

Figure 37:
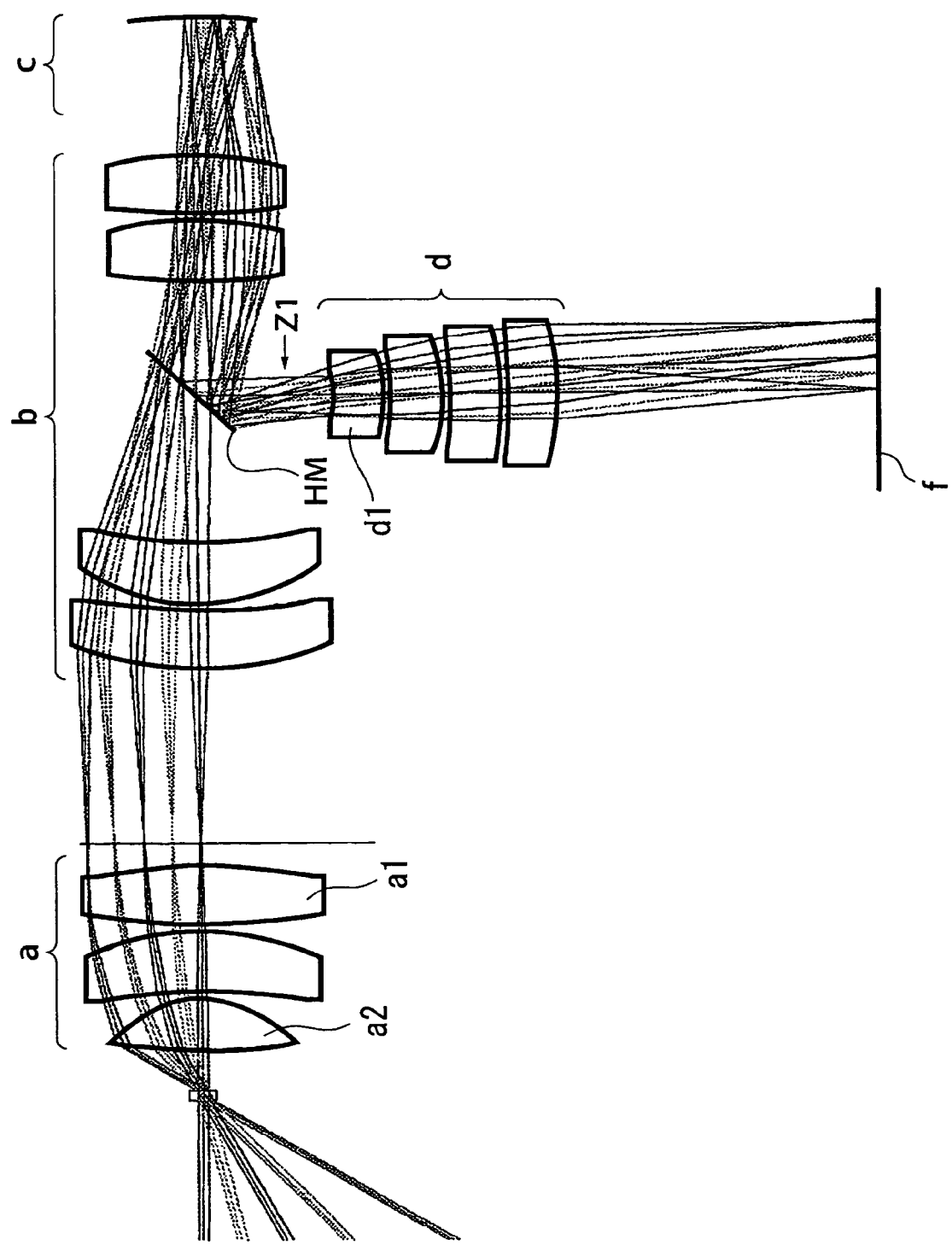
FIG. 37 is a schematic view of a fisheye-type optical system including the eyepiece lens in the embodiment of this invention and a view showing light flux in a case where defocused curvature of field is intentionally introduced corresponding to a viewing angle from a center of a viewing.
Figure 38:
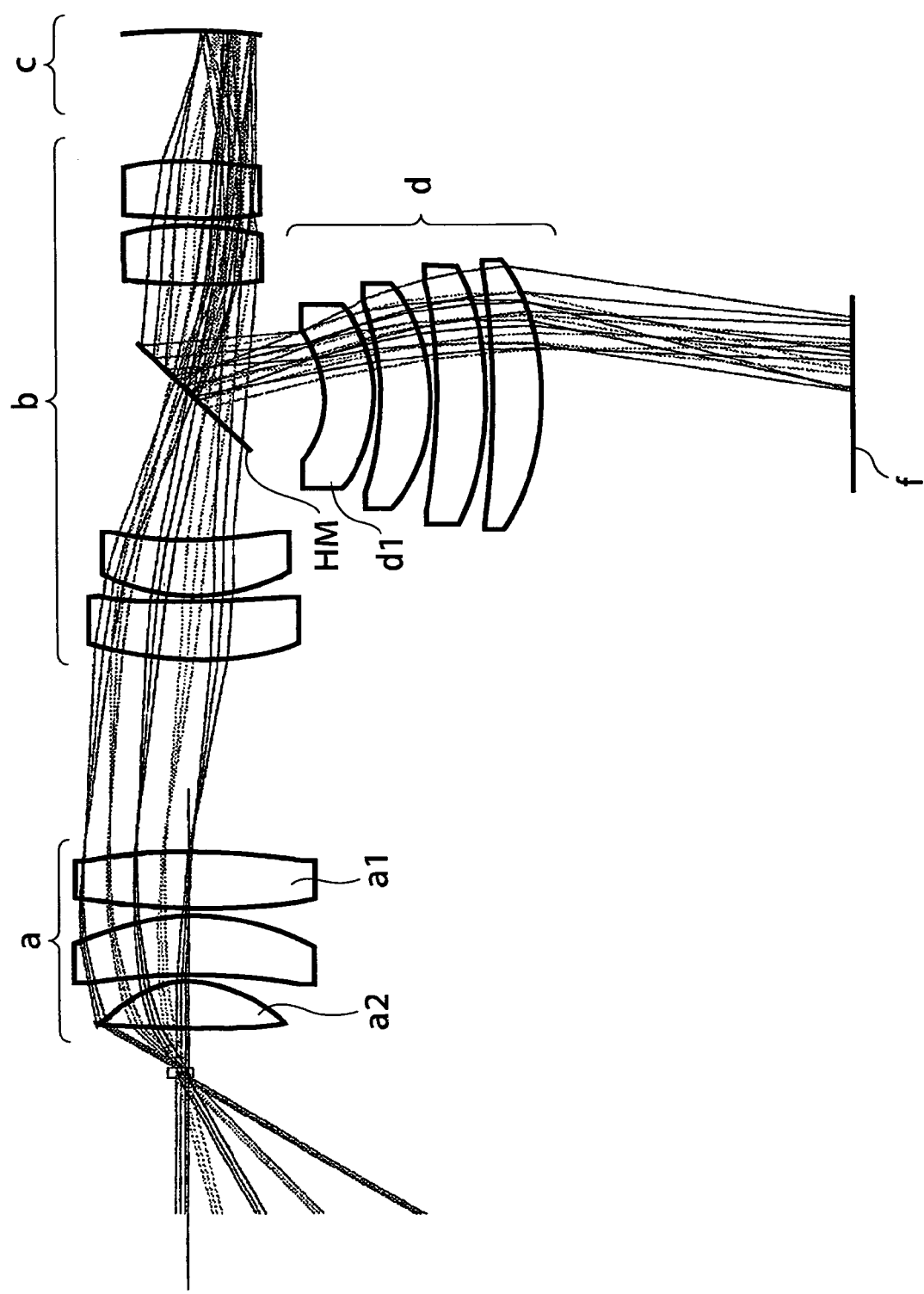
FIG. 38 is a schematic view of a fisheye-type optical system including the eyepiece lens in the embodiment of this invention and a view showing light flux in a case where a focus position does not vary that much even with a quick eyeball movement.
Figure 39:
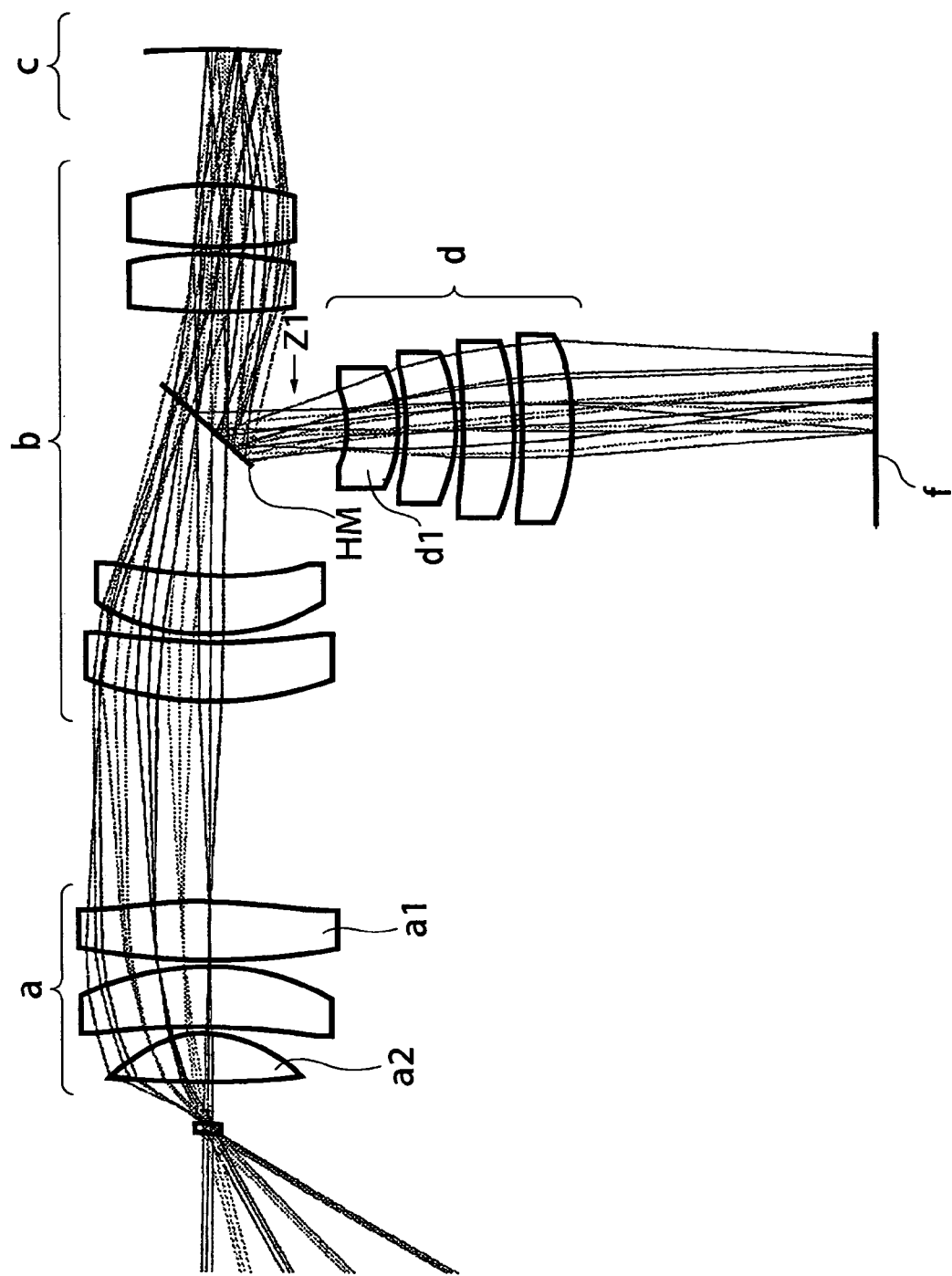
FIG. 39 is a schematic view of a fisheye-type optical system including the eyepiece lens in the embodiment of this invention and a view showing light flux in a case where an eye views an object at 50 cm ahead.

Another example of an optical design will be described. The foregoing embodiments assume that the focus position varies to some extent in responsive to the human eye's lateral brisk movement and then the human eye focuses on an object following this variation of the focus position. FIGS. 37, 38 and 39 show the same design examples, wherein FIG. 38 is a view of a ray of light when an eye moves laterally (eye's lateral brisk movement). FIG. 37 shows an example in which a human eye does not see a wide range accurately at the same time, but clearly sees only a range of ± few degrees from a centre at which the eye points and therefore, by using this, defocused curvature of field is intentionally introduced corresponding to a viewing angle from the center that the eye sees. And furthermore, eyepiece optical system (a) and the like use aspherical lens (a1) in proximity to a first conjugate surface in relation to a retina in order to reduce a number of lens elements and enhance characteristics of marginal telecentricity.

Herein, section (a) of an optical system is eyepiece lens group (a) including a Conic surface and herein, a hyperboloid is used on a surface opposite a pupil side of eyepiece lens (a2) in order to suppress coma. Its curvature Z(r) is represented by $$Z(r) = \frac{c \times r^2}{1 + \sqrt{\{1 - (1+k) \times c^2 \times r^2\}}}$$

where c is curvature, $r^2 = x^2 + y^2$, k is a Conic coefficient and k<−1 is used.

Aspherical lens (a1) of which one surface is arranged in proximity to the first conjugate surface in relation to the retina is a saucer-shaped curved surface lens, wherein curved surface Z(r) of another surface thereof is a rotationally symmetric quadratic curve and represented by $$Z(r) = \frac{c \times r^2}{\{1 + \sqrt{1 - (1+k) \times c^2 \times r^2}\}} + A \times r^4 + B \times r^6 + C \times r^8 + D \times r^{10} + E \times r^{12} + F \times r^{14} + G \times r^{16} + H \times r^{18} + J \times r^{20}$$

where c is curvature, $r^2 = x^2 + y^2$, A, B, C, D, E, F, G, H, J are aspherical coefficients (even number order), K is a Conic coefficient and K=−1, a saucer-shaped curved surface of $a < 1.0 * 10^{-7}$ is used.

In this case, as the tilt of telecentricity is corrected by at least two aspherical surfaces so as not to be overly different depending upon the incident angle upon the eyepiece lens, curved surface mirror (c) uses a normal spherical surface mirror. This is to change the tilt of telecentricity forcibly and arrange the pupil position (position where light flux converges) at position (z1) in proximity to an entrance position of objective lens group (d). Furthermore, as it is possible to intentionally place the pupil position toward an object, an effect that a reduction optical system is easily designed can be obtained.

The reason why the pupil position (position where light flux converges) is arranged at position (z1) in proximity to the entrance position of objective lens group (d) is that a focus adjustment corresponding to the eye's lateral brisk movement does not let, as shown in FIG. 38, the focus position vary that much even with the eye's lateral brisk movement. Namely, aspherical lens (d1) is inserted into an entrance section of objective lens group (d) and with consideration of a position displacement (as shown in FIG. 38, light flux passes through margins of a pupil surface) at a pupil position accompanied by telecentricity shift due to the lateral eye movement, lens d1 has a lens surface of a low curvature at an marginal section with respect to a centre and thereby lengthens its focus position. Originally, as eyepiece lens group (a) has a characteristic that a focus point gets close to an eyepiece direction of the eyepiece lens due to the eye's lateral brisk movement, a large change in a focus plane is suppressed by getting a focus position closer to a position of the liquid crystal display element by aspherical lens (d1).

A surface on the pupil side of aspherical lens (d1) employed herein is a hyperboloid surface and its curved surface Z(r) is represented by $$Z(r) = \frac{c \times r^2}{1 + \sqrt{\{1 - (1+k) \times c^2 \times r^2\}}}$$

where c is curvature, $r^2 = x^2 + y^2$, k is a Conic coefficient and k<−1 is used.

However, as obvious from FIG. 38, it can be seen that an image plane becomes oblique with the eye's lateral brisk movement action. Thus, as aspherical lens (d1) cannot completely correct the oblique image with the hyperboloid surface only, it is desirable that the oblique image be corrected by an aspherical surface Z(r) thereof represented by $$Z(r) = \frac{c \times r^2}{\{1 + \sqrt{1 - (1+k) \times c^2 \times r^2}\}} + A \times r^4 + B \times r^6 + C \times r^8 + D \times r^{10} + E \times r^{12} + F \times r^{14} + G \times r^{16} + H \times r^{18} + J \times r^{20}$$

where Z(r) is a rotational symmetric quadratic curve, c is curvature, $r^2 = x^2 + y^2$, A, B, C, D, E, F, G, H, J are aspherical coefficients (even number order).

FIG. 39 is a view to show light flux when seeing an object 50 cm away with eyes. It can be seen from FIG. 39 that only a focus position of the liquid display element varies, whereas distortion characteristics and an aberration do not vary that much. Therefore, with an adjustment of a space between lenses of this objective lens group (d) or a space between final image plane (f) and objective lens group (d), a focus adjustment can be easily made from 50 cm up to infinity.

In this optical design, curved surface mirror (c) is used to change the tilt of telecentricity forcibly and arrange the pupil position (position where light flux converges) in proximity to the entrance position of objective lens group (d), but if the hyperboloid lens is used as a first eyepiece lens of the eyepiece lens group and the rotationally symmetric quadratic curve lens is used as a lens in proximity to a first conjugate surface when designing eyepiece lens group (a) and relay lens group (b), a faithful second conjugate surface can be obtained at the position of curved surface mirror (c), too. In this case, a liquid crystal element may be directly arranged at the position of curved surface mirror (c) or a first liquid crystal may be arranged at the position of curved surface mirror (c) and light flux is directly introduced to objective lens group (d) by reversing the splitter mirror section of this optical system, and then a second liquid crystal may be arranged via a zoom system (not shown) (Actually, light emitted from the liquid crystal section converges at the pupil position, but, for easy understanding sake, the explanation is given herein such that infinity light flux is emitted from the pupil position and is formed on the surface of the liquid crystal element).

Furthermore, although a correction of chromatic aberration is not touched on herein, basically, a system in which a correction is made by combining a plurality of positive and negative lens elements and lens elements of different refractive indices may be incorporated or liquid crystal elements of receiving light in a case of a video camera and emitting light in a case of a display are separated into three colors of R G B, and then after the separation, lateral chromatic aberration and Z chromatic difference of distance may be corrected.

A direction of bending a mirror is basically toward upper and lower directions where a necessary viewing angle is narrow and thus, practically optical systems (b) and (d) do not contact each other as shown in the diagram. Furthermore, the above-mentioned embodiment cites the combination of the hyperboloid, the positive lens and the aspherical saucer-shaped negative mirror or the hyperboloid, the positive lens and the aspherical saucer-shaped negative lens, but the embodiment is not limited to these combinations and other combinations can be contemplated.

Figure 40:
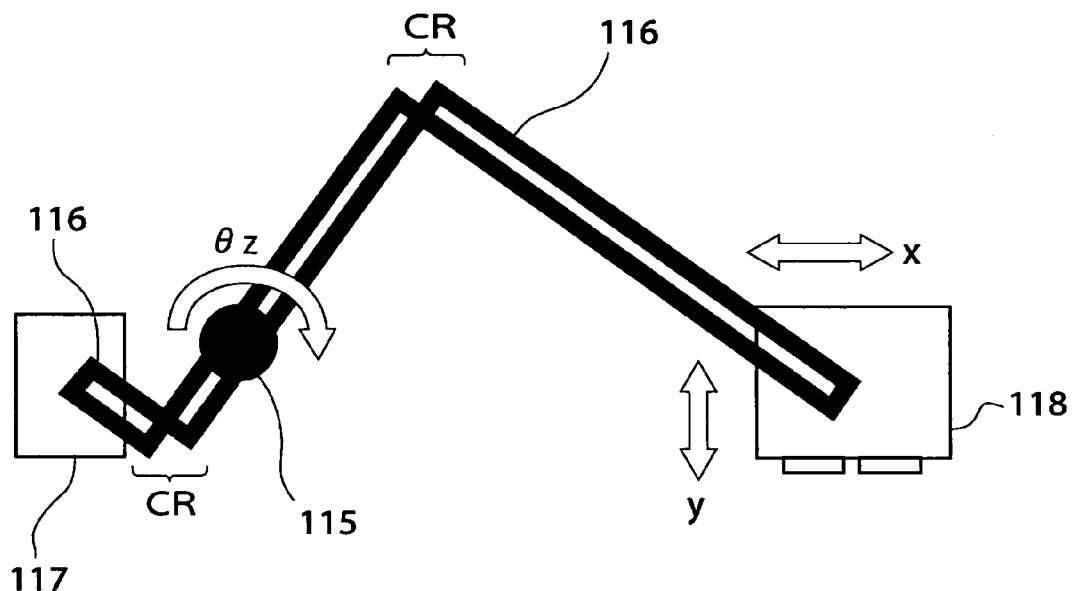
FIG. 40 is a view showing an example where the display device of a whole viewing angle is supported by way of a magic hand technology.
Figure 41:
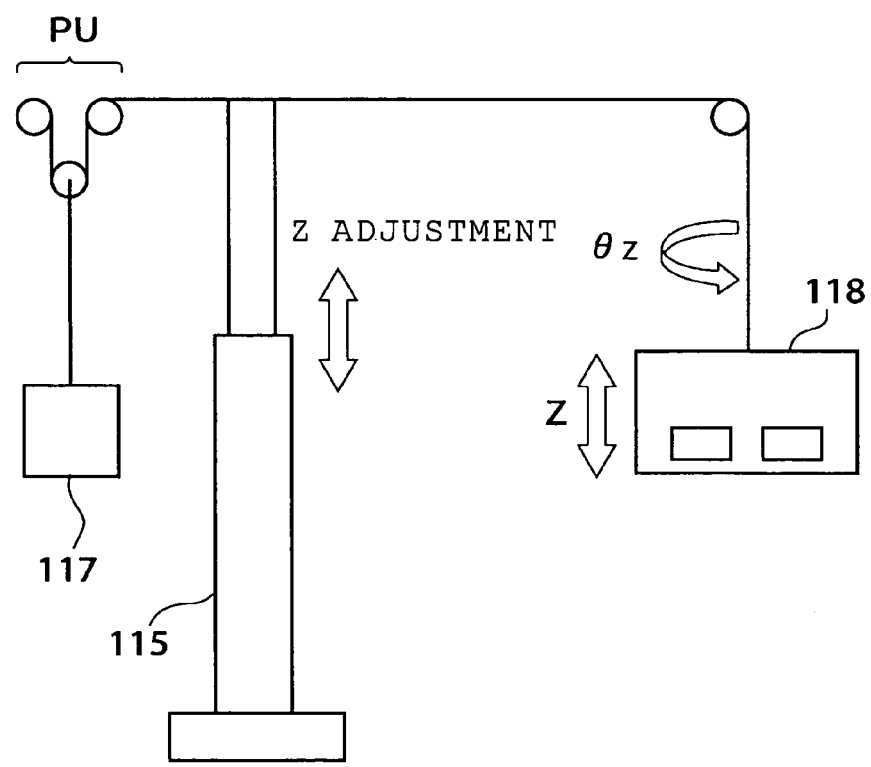
FIG. 41 is a view showing an example where a weight of the display device of a whole viewing angle is cancelled out by way of a counter weight.
Figure 42:
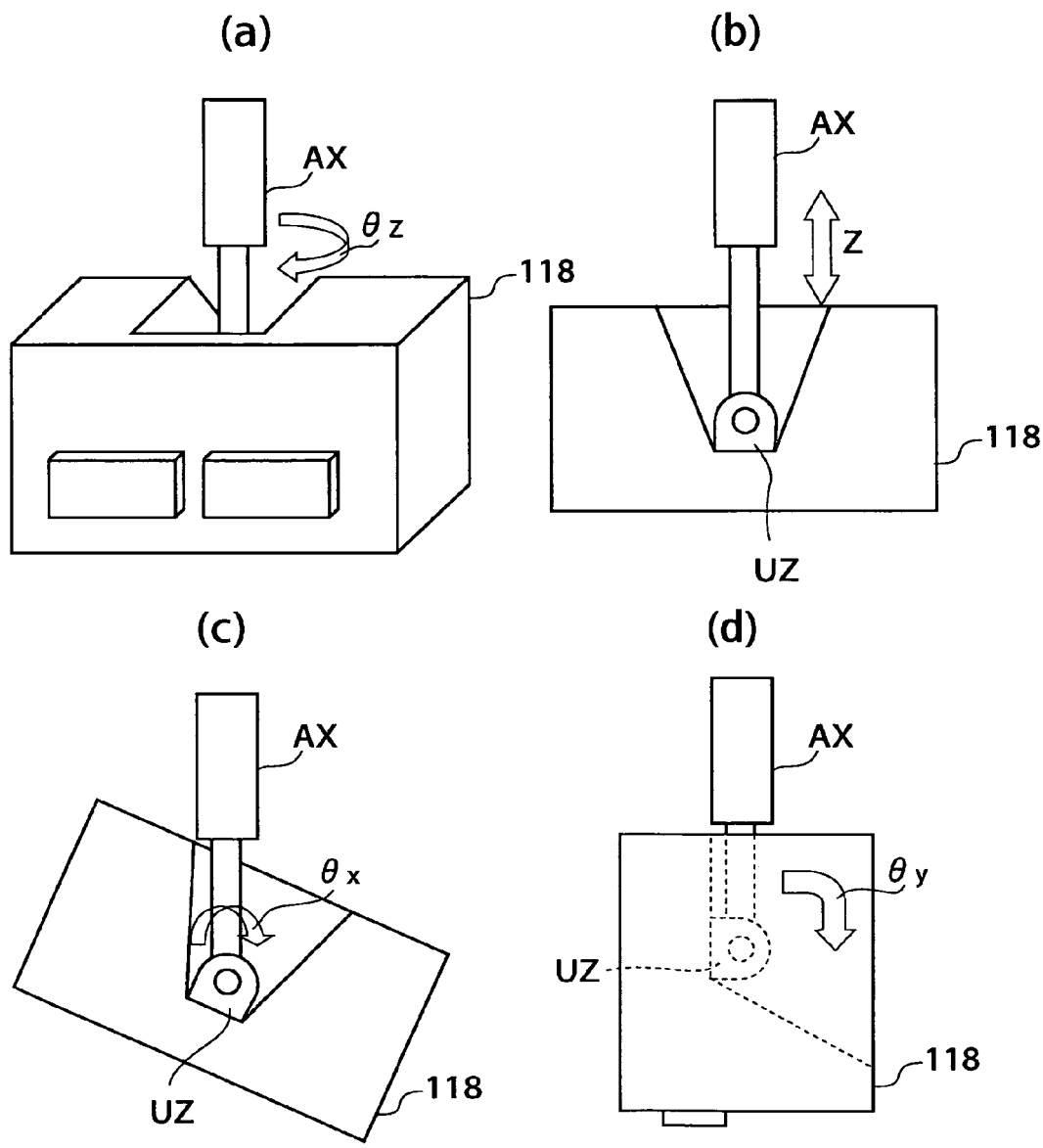
FIG. 42 is a view showing an example where the whole viewing angle display device is made freely movable by way of a universal joint.

Next, in reference to FIGS. 40 through 42, the device cited in FIGS. 31 and 32 will be more specifically described hereunder. An object of making the device into a floor standing type thereof is to make an observer not feel a weight of the display optical system. To achieve this, a face movement is sensed by a sensor etc whereby the device is so controlled as to move in the same way as the face by an actuator, but a cost becomes high. Thus, an embodiment hereunder uses a method in which an actuator is not used as much as possible.

In order for an observer not to feel the weight of the display, it is necessary that a mechanism work such that no workload is generated at all six degrees of freedom of the face movement. Thus, as shown in FIG. 40, magic hand technology (x, y and $\Theta z$ actuations) is used, elevator technology (Z and $\Theta z$ actuations) in FIG. 41 and centre-of-gravity supporting technology ($\Theta x$ and $\Theta y$ actuations) in FIG. 42 are used.

FIG. 40 shows a mechanism in which cross section CR is configured to be coupled capable of turning around and be extensible like the magic hand. In magic hand section (anti-vibration articular bar) 116, a distance ratio of a distance from support section 115 up to the weight member to a distance from support section 115 up to whole viewing angle display 118 is m:n and a moment ratio in a case of the same weight is m:n. As a weight ratio of weight member 117 including a hanging bar to whole viewing angle display device 118 including the hanging bar is n:m, an actual moment against support section 115 stays constant in relation of m×n=n×m without relaying on an extension of magic hand section 116. Therefore, when a coupling section of the each cross section CR and a revolving axis of support section 115 get smooth by a ball bearing or an air bearing etc, x, y and $\Theta z$ actuations become possible with almost no workload. With this arrangement of this mechanism, it is not necessary that rigidity of the support section be increased that much and a vibration can be suppressed. Also the configuration is easy to avoid a risk like a falling down of the body etc.

In FIG. 41, like an elevator, when a weight ratio of weight member 117 to whole viewing angle display device 118 is n:m, a configuration is made well balanced by way of pulley PU. For example, in a case of n:m=2:1, pulley PU of a type as shown in FIG. 41 may be used. The support section is configured such that the support section is movable upward and downward by hand and it is possible to set a height roughly depending on a situation where an observer lies on his/her back, takes a seat or stands on foot. On the other hand, when an observer moves a face upward and downward with a predetermined posture, whole viewing angle display device 118 moves upward and downward by around 2 to 30 cm. At this moment, when a revolving axis of pulley section PU gets smooth by the ball bearing or the air bearing, z actuation becomes possible almost without generating any workload.

FIG. 42 shows an example in which revolving axis AX is arranged at centre of gravity of whole viewing angle display device 118 and axis AX is configured such that there is freedom available for $\Theta x$, $\Theta y$ and $\Theta z$ actuations no matter where the face moves. (a) is a perspective view looking from a front right upper direction (an eyepiece direction) of the display device. (b) is an elevation view thereof looking from a rear, wherein it is configured capable of revolving by an angle required for an action to turn a head leftward and rightward around universal joint UZ. (c) shows a state where a head revolves leftward and rightward. Furthermore, (d) is a side view thereof and shows freedom allowance of universal joint UZ when a head moves back and forth. Especially, (d) represents a state where a user lies on his/her back, wherein there is provided a groove required when the user moves its face downward by 90 degrees to that direction.

Although these respective diagrams 40, 41 and 42 are depicted separately, a pulley for bending a string of each hinge section (not shown) is devised such that a expansion strength balances a tension strength by a way of stringing (way of stringing along the magic hand) so as to put each characteristics into use. Furthermore, as a hanging section of a string is restricted to only upward and downward actuations within the hanging bar by a guide mechanism, swaying of the display and the weight section like a pendulum is avoided.

In the foregoing embodiment, with respect to the weight ratio of whole viewing angle display device 118 to weight member 117, a balance is kept by respective distance from support section 115. However, with this configuration, since weight member 117 by itself is off a revolving center, inertia is generated when whole viewing angle display device 118 is moved horizontally, so that a sense of an uncomfortable wearing occurs to a user. Moreover, a hanging string of weight member 117 acts like a pendulum and further there is left a vibration of a low frequency.

Figure 50:
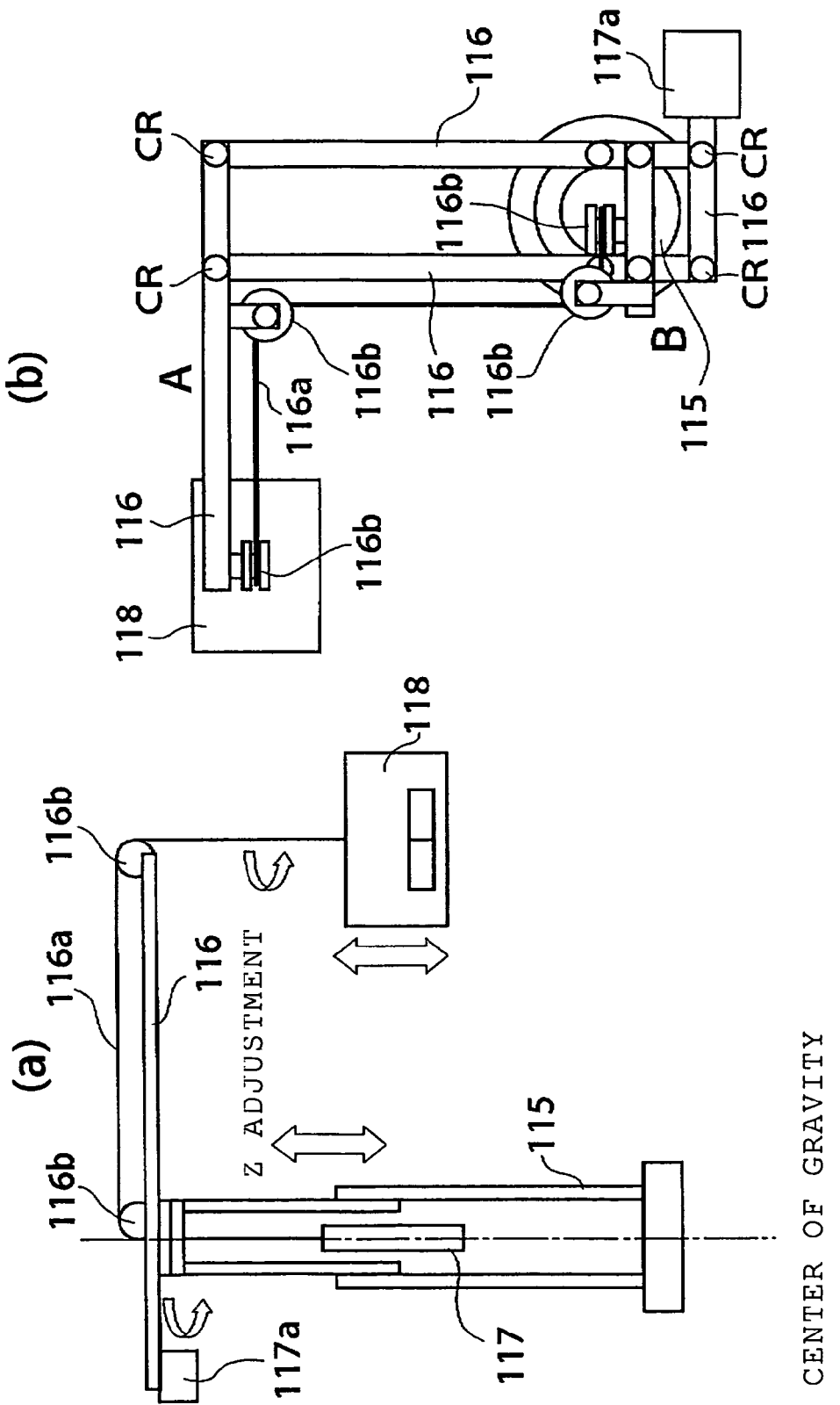
FIG. 50 is a view showing a sate where the display device of a whole viewing angle is supported by accommodating the weight into a supporting member.

As a method to solve these problems, whole viewing angle display device 118 is supported by a configuration shown in FIG. 50. FIG. 50 (a) is a side view and (b) is a view looking from an upper direction. It should be noted that the same reference symbols as in FIGS. 40 and 41 are the same sections, so their explanations are omitted herein. A mechanism of this configuration supports hanging string 116a capable of unreeling by pulley 116b fixed onto magic hand section 116 and hanging string 116a supports whole viewing angle display device 118 and weight member 117.

In this configuration, there is provided weight member 117 inside support section 115 that is a center of revolving. Thus, even if whole viewing angle display device 118 revolves/moves around support section 115, inertia is not generated due to weight member 117. This configuration suppresses the abnormal sense of wearing since inertia does not occur due to weight member 117 when whole-viewing angle display device 118 moves and its movement is stopped.

In the configuration shown in FIG. 50, there is provide second weight member 117a that is lighter than weight member 117 such that its center of gravity comes in proximity to a center of support section 115 and a workload is not put on the bearing etc arranged between support section 115 and magic hand section 116. This weight is lighter than one of weight member 117 shown in FIG. 40, so generated inertia is small when whole viewing angle display device 118 moves.

Figure 51:
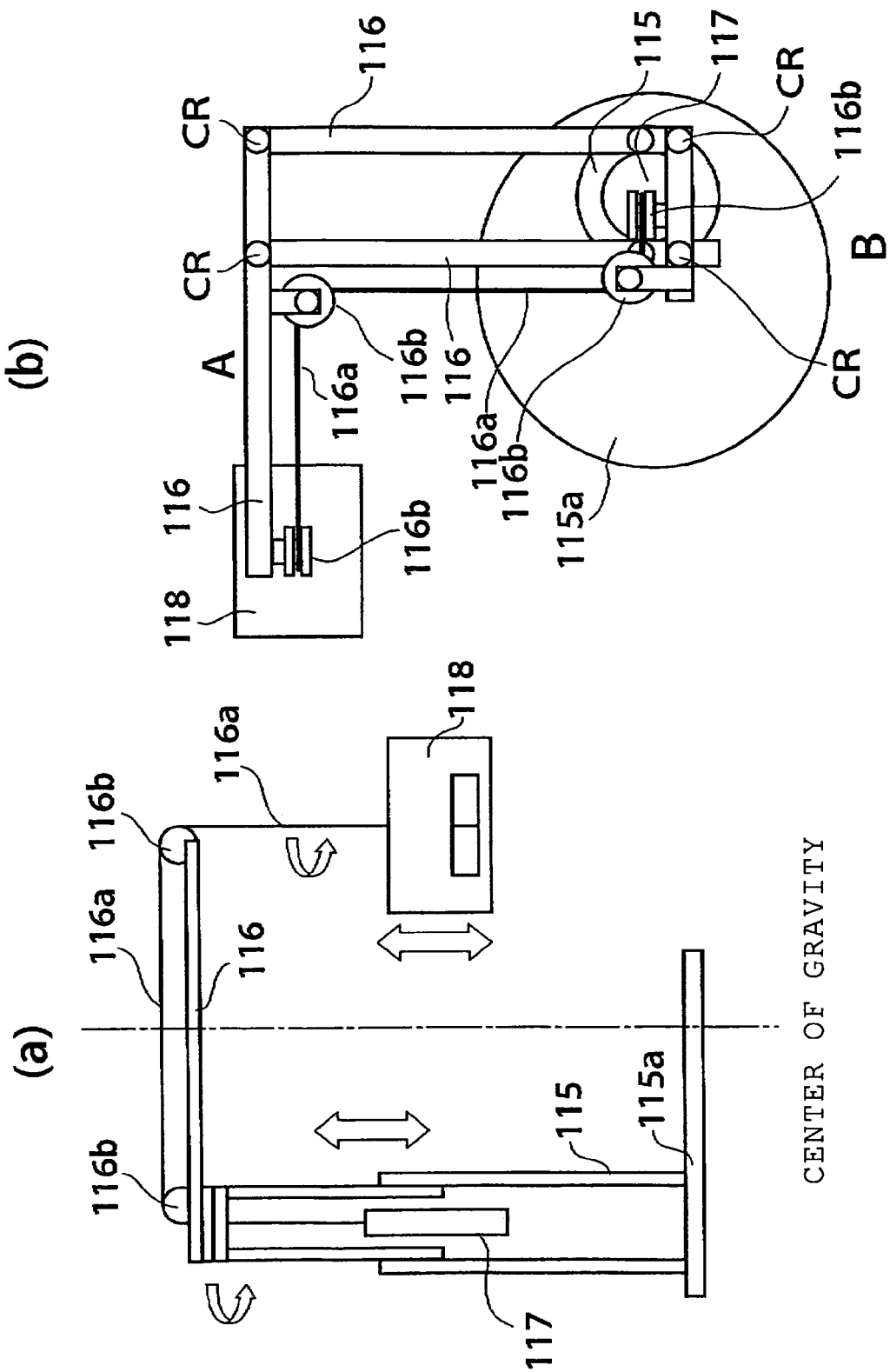
FIG. 51 is a view showing a sate where the display device of a whole viewing angle is supported by accommodating the weight into a supporting member.

In order to further increase stability with a configuration shown in FIG. 51, an installation area of support section 115 is expanded and there is provided leg section 115a that extends below a position of center of gravity. Leg section 115a extends below center of gravity, so stability can be maintained even when the device stands on a floor. FIG. 51 (*a*) is a side view and (b) is a view looking from an upper direction. It should be noted that the same reference symbols as in FIG. 50 are the same sections.

In this case, strength against support section 115 is asymmetric, so a workload is put on a revolving mechanism where support section 115 revolves. Therefore, when rigidity is increased by doubling the installation area of the ball bearing section and the like and further the installation area is placed beneath a chair or a bed that the user occupies and the installation area is fixed there, there is no actuating device in a direction opposite the device. Therefore, an advantage in a space and safety is brought about.

Furthermore, in the whole viewing angle display device of the floor standing type shown in FIGS. 50 and 51, hanging string 116*a* supports whole viewing angle display device 118 with pulley 116*b* fixed in proximity to cross section CR of magic hand section 116. Therefore, hanging string 116*a* is always parallel with magic hand section 116 even when magic hand section 116 expands/contracts and strength is not generated by expansion/contraction of the magic hand section and thus presence of the string can not effect that much a lateral movement of magic hand section 116 (no workload), so a sense of wearing can get alleviated.

Like the foregoing, mechanics therein is designed so as to suppress the sense of wearing as much as possible, but when weight of whole viewing angle display device 118 is equal to and more than 1 Kg, a slight workload is inevitably generated due to friction caused by its weight when whole viewing angle display device 118 moves. In order to suppress this, it is desirable that tension of hanging string 116 and a relative angle of cross section CR of magic hand section 116 be checked and actuator giving actuation power to cross section CR and hanging string 116*a* at a start-up be provided. Especially, as maximum static friction is larger than kinetic friction when moving a still object, it is good to control this friction through a feed-back control in accordance with the tension of the string and the relative angle of cross section CR.

A specific way in which whole viewing angle display device 118 of the floor standing type is supported has been described so far. The configuration of device 118 follows a face movement of a user based upon predetermined conditions, but there is likelihood that it is prone to external strength (e.g. earthquake or a tilt of a floor standing installation are). That is, when support section 115 itself vibrates due to outbreak of earthquake, device 118 is largely swung around by inertia of magic hand section 116 and the body of whole viewing angle display device 118 and thereby it is likely to cause danger in a surrounding area. In this respect, it becomes necessary that, with incorporation of an earthquake sensing sensor into the body thereof, an abnormal movement of magic hand section 116 be locked and a revolving direction lock release device be provided so as to smoothly dismantle whole viewing angle display device 118 at a contact portion with a face. The tilt of a floor standing portion becomes a workload with respect to a movement in a predetermined direction and this gives a user an uncomfortable sense when wearing the display device. To avoid this uncomfortable sense, a level measuring device for checking whether or not a surface of the device is in a horizontal position and a level adjustment device for placing the device in a horizontal position are built in so that a user's smooth movement can be obtained in all directions.

Also, the head-mounted display or glasses-type display follows a subtle movement of a face instantaneously, so the sickness in VE is apt to develop. As the body of the image display device of this invention is supported by a floor and the part of the body thereof is also supported by a face (includes a head, ear etc) and the body thereof is relatively heavy, so that the body thereof has the effect that the body does not follow due to inertia with respect to a subtle movement of a user, but follows with respect to a big movement thereof only, and thereby the body thereof has an effect that makes the sickness in VE becomes difficult to develop. In order to further utilize these effects efficiently, it is preferable that there be provided a stopper and the like restricting a movement at movable members such as pulley 116*b* holding magic hand section 116 and hanging string 116*c* when a user settles in a predetermined posture.

The display device is fixed at a desired position by this stopper, so that a situation where the display device does not contact a face completely can be provided to a user who feels a sense of wearing even with a slight contact with the face and this can be contributed in order to further offer realism. Especially, in the embodiment shown in FIG. 48 to be explained later, not only an image detection area of a retina by a crystal ball's movement corresponding to a eyeball movement but also a wide image display area capable of supplying a high quality image even in a case where a face and the display device relatively move laterally can be provided, so that an effect becomes further high.

Like the foregoing, the whole viewing angle display device 118 of the floor standing type has a big advantage in comparison with the head-mounted display device or the glasses-type display device, so that the device 118 produces further an effect with respect to a user who observes in a reclining posture before going to bed. In this invention, the display device moves in accordance with a face movement, so this can create an atmosphere where a user easily falls asleep by letting the user enjoy a display image in a relaxing posture before sleep or supplying an image and music of a high sleep effect to a user difficult to get to sleep.

However, it is likely that the display device would become obtrusive with respect to a movement like rolling over etc after falling asleep. Thus, in this invention, there is provided a timer in display device 118, wherein a power switch will be not only turned off after falling asleep but also an automatic wind-up system is incorporated therein such that hanging string 116*a* is automatically wound up and the display section is also lift up from a face so as not to be obtrusive to a user in bed. Furthermore, there is provided a function that actuates the display section to a position where it does not become obtrusive when a user gets up by expanding/contracting magic hand 116 after lifting up the display section.

With this arrangement, a user can use this display device readily even before retiring and then comfort and safety at bedtime can be secured. A safety precaution just in a case where the display section gets stuck on a part of a face and cannot be lift up is dealt with by restricting lifting strength and the like.

The arrangement as described above projects an image output from LCD on the retina inside at least one of the eyeball by way of the fisheye-type optical system, but it can be seen that the optical system in response to the lateral brisk eyeball movement can project the image without vignetting at the pupil with combination of the curved surface mirror and the aspherical lens. However, a focus is fine and distortion is few at the center part viewed by the laterally moving eyeball, whereas distortion and a focus state get deteriorated sharply in proximity to the center part.

Figure 43:
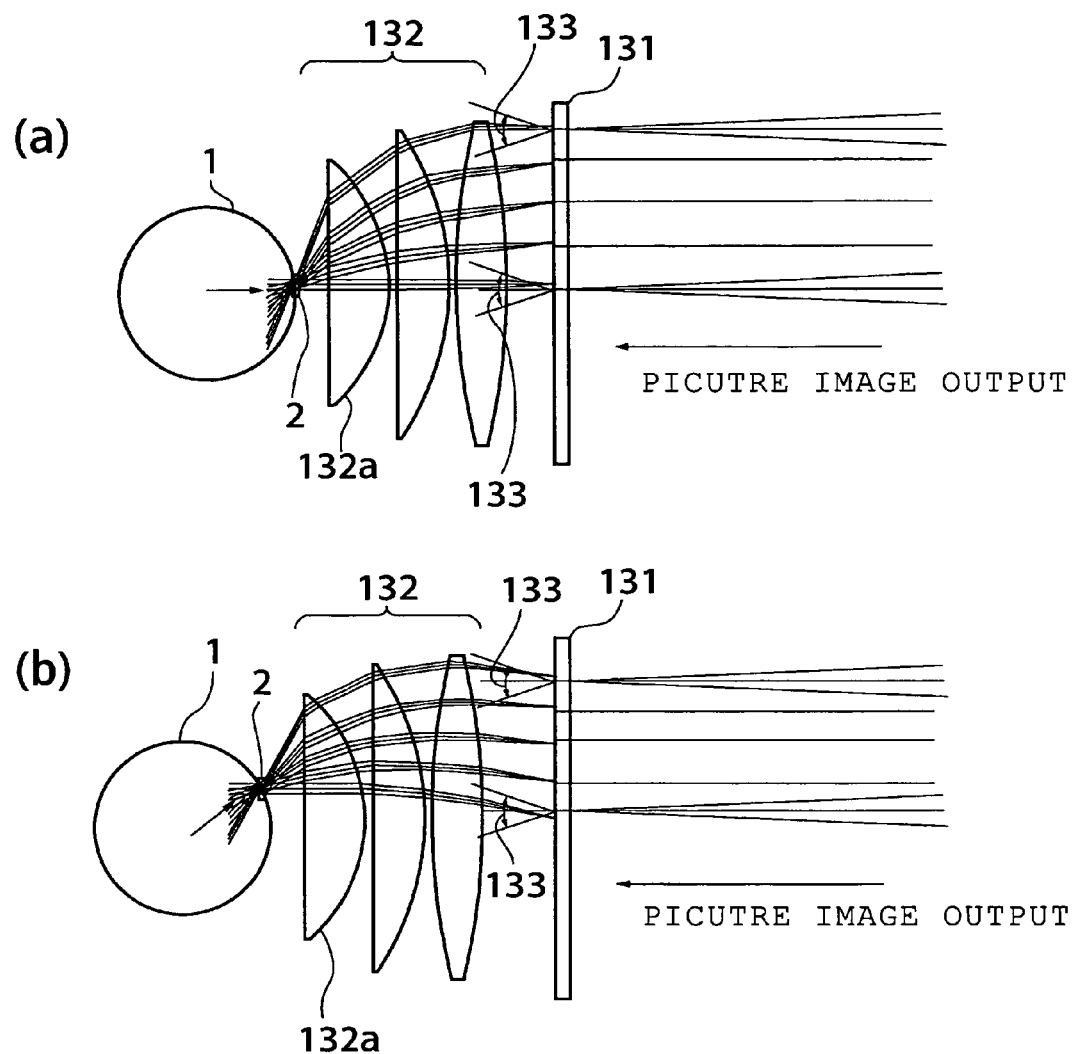
FIG. 43 is a view showing an example where curvature of field on a surface of forming an image and a tilt of telecentricity are made small by way of a hyperboloid lens. (a) indicates a case where there is no lateral shift of an eyeball (quick eyeball movement), (b) there is the lateral shift of an eyeball with 30 degrees (quick eyeball movement) and an arrow represents an output of a picture image.

Therefore, in a following embodiment, as described in each embodiment shown in FIGS. 20, 23, 28, 35 through 39, using what the intermediate image is formed on a side of the liquid crystal two-dimensional display device (opposite the eyeball), the embodiment is configured to be capable of dealing with the lateral brisk eyeball movement, too by inserting a diffusion glass to a position of forming the intermediate image. FIG. 43 is a view explaining this configuration and shows an example of an optical system that lessens curvature of field on an image-forming surface and a tilt of telecentricity around a diffusion glass by way of a hyperboloid lens. An image output converges at a crystal ball of eyeball 1 via diffusion glass 131 and eyepiece lens group 132. (a) of FIG. 43 is a case where the eyeball does not move laterally and (b) thereof shows a laterally moving eyeball of 30 degrees. In this example, the nearest lens to eyeball 1 is hyperboloid lens 132a. The hyperboloid lens is a lens of which one-side surface is made of hyperboloid and as shown in the diagram, a far surface from eyeball 1 is hyperboloid.

Figure 44:
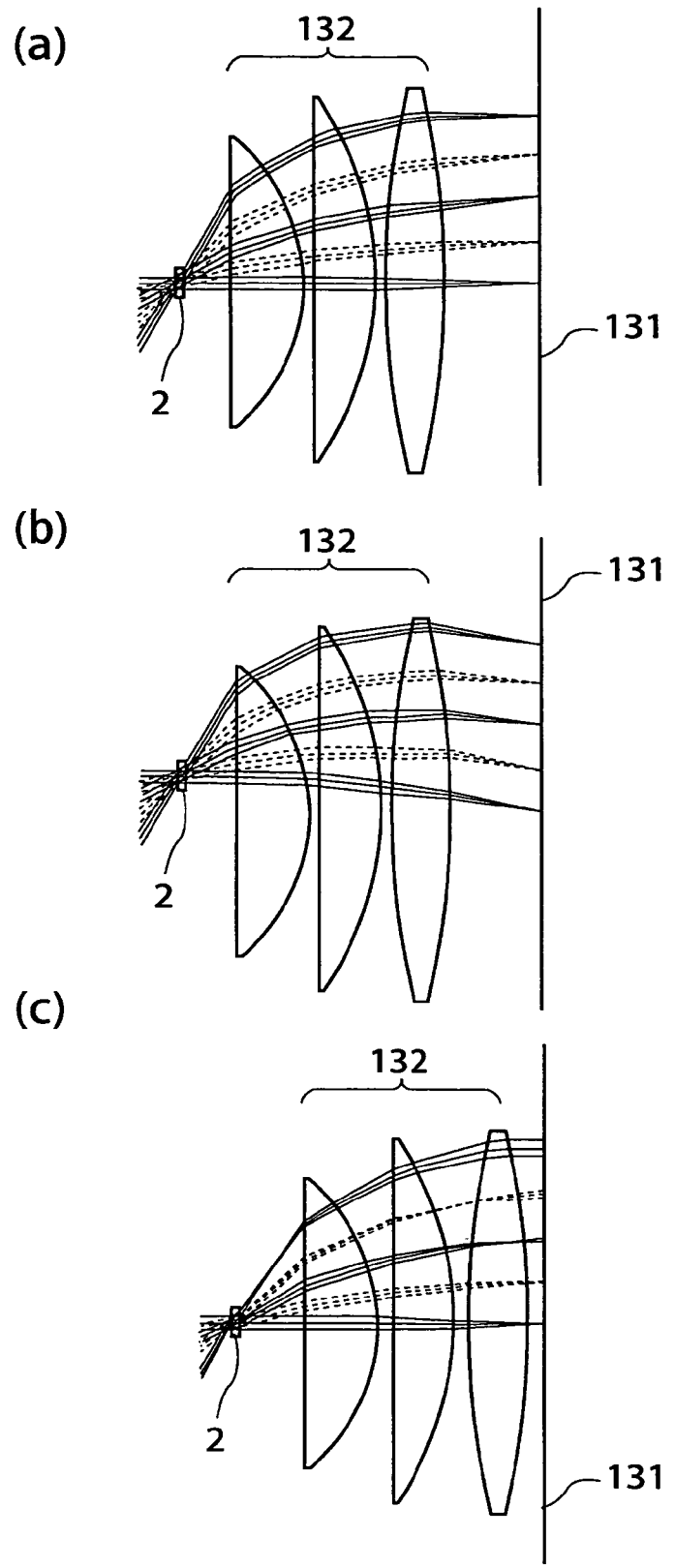
FIG. 44 is a view showing light flux for each angle of view of an optical system shown in FIG. 43.

Optical characteristics are shown in FIG. 44. FIG. 44 (a) is an example where a pupil views a center and FIG. 45 (a) shows aberrations on this occasion. Eyepiece lens system 132 is a fisheye-type optical system that makes telecentricity almost straight. Namely, eyepiece lens system 132 is designed such that principal ray of light of each light flux at a position where diffusion glass 131 is inserted is almost parallel to each other (allowable for a tilt of an order of ±10 degrees) and is almost parallel to a normal line of an incidence surface of diffusion glass 131, so that the eyepiece lens system 132 produces the same distortion as in the fisheye-type optical system. Thus, distortion of around 50% is produced at an viewing angle of ±60 degrees. FIG. 44 (b) shows an example where a pupil faces in a 30-degree direction, wherein FIG. 45 (b) shows aberrations on this occasion.

When compared with telecentricity of FIG. 44 (a), it can be seen that telecentricity is tilted by an order of 10 degrees. That is, principal ray of light of each light flux is tilted by the order of 10 degrees in comparison with a case (a) where crystal ball 2 faces in a 0-degree direction. Next, FIG. 44 (c) shows a case where a user views an object at 50 cm ahead, not infinity, wherein FIG. 45 (c) shows aberrations on this occasion. In this case, eyepiece lens section 132 is designed such that a focus position does not come into eyepiece lens section 132. However, as seen from FIGS. 45 (b) and (c), a shift in distortion is small even when comparing with FIG. 45(a) and it can be seen that a faithful image can be obtained throughout an entire field of ±60 degrees when a screen and the like is arranged at the position of forming an image.

In a case where this eyepiece optical system is used, a method of using diffusion glass 131 will be described hereunder. An example where a pupil views a center is shown in FIG. 43(a), whereas FIG. 43(b) represents a case where the pupil faces toward a 30-degree direction. As seen from comparison of (a) with (b), a shift in distortion is small, but it can be seen that telecentricity is titled by ±10 degrees at maximum as described above. When making the fisheye-type optical system corresponding to this lateral shift (lateral eyeball movement), it is known that distortion is slightly produced in an optical system that can project without vignetting at the pupil like the foregoing embodiment.

Therefore, as remedial measures, an optical system from the liquid crystal two-dimensional output device to diffusion glass 131 is designed with N.A. (stands for numerical aperture) that enables to obtain a sufficient resolution of an image and adopts a method in which light flux corresponding to a change in the tilt of telecentricity is transmitted to a pupil by diffusing the light flux with diffusion glass 131.

That is, the optical system causes to diffuse ray of light at the angle of divergence as shown by arrow 133 of FIG. 43 with diffusion glass 131 such that ray of light entering crystal ball 2 exists even when a tilt of crystal ball 2 varies.

Like this, it is designed such that, at the intermediate image formed by light flux transmitted to the crystal ball from the image formed by the two-dimensional optoelectric device the optical system, the angle of divergence of light flux of each position emitting from the intermediate image becomes sufficiently large by way of the diffusion glass.

As described above, with a change in the pupil position due to the lateral shift of the crystal ball (an action of a lateral brisk eyeball movement), an angle formed by all principal rays passing through the center of the pupil and the surface of forming the intermediate varies. Thus, the angle of divergence of light flux emitted from the intermediate image is made equal to or larger than the amount of variation. With this arrangement, even if the lateral shift of the crystal ball takes place, light flux from the intermediate image can be supplied to the pupil stably and even when the lateral shift of the crystal ball (action of the lateral brisk eyeball movement) occurs, the two-dimensional display device that a user can observe a faithful image can be obtained.

Herein, it is good to use a diffusion glass that has field of view of ±30 degrees and an angle of diffusion of ±10 degrees or so and whose roughness is not discernible even with a human eye, namely, a glass equivalent to an angle of diffusion A of roughness #700 and over in terms of ground glass.

Naturally, it is desirable that a material whose luminous intensity distribution does not overly vary at around +20 degrees be used since an angle of the laterally brisk moving eyeball is said to be around ±50 degrees. Diffusion glass 131 is arranged at the position of forming the image as described above and acts to diffuse beam of light that forms the image, so a resin and the like can be used instead of diffusion glass 131 if it has the action of diffusing beam of light.

Also, diffusion glass 131 that will be fabricated hereunder exerts a favorable performance, too. A way of fabricating this diffusion glass is that adhesive is applied over a polyester film of a uniform thickness and a smooth surface and then abrasive whose diameter is precisely controlled in a micron grade is coated thereon in a clean room. As for abrasive, carbide and oxide such as silicon carbide, chromic oxide, tin oxide, titanium oxide, magnesium oxide, aluminum oxide and the like are suitable and diffusion glass 131 can be fabricated with a uniform ultra-precise finishing of an order of 0.3 to 40 μm and a yield ratio becomes small.

An image become opaque when these materials are processed spherically, but uniform abrasive can be layered in a random order with a predetermined thickness, and the angle of divergence can be made large so that an viewing angle of 60 degrees and over can be secured without yielding graininess at all even in a DVD image or a HD image. This diffusion glass 131 is preferable in terms of a low production cost. Furthermore, it is preferable that a thickness of this abrasive layer be within depth of focus of a projection image.

Well, a size of abrasive is selectable from mesh number #320–#15000 and a strong polyester film is used, so that durability is enhanced. In silicon carbide, chromic oxide, tin oxide, titanium oxide, magnesium oxide, aluminum oxide and the like, when abrasive of an order of micron is used, the image becomes opaque. In this case, it is necessary that projection illumination to diffusion glass 131 be intensified. But, when the display device is of the floor standing type, high-powered light source can be used, so that a light source of a desired power can be used in correspondence to transparency of diffusion glass 131.

Furthermore, as the light source itself is bright, brightness of a projection image becomes quite bright and side effects like stray light, hot spot and like are reduced even without wearing a light shade device (goggle etc) between the eyepiece lens and both eyes so that deterioration of the sense of wearing can be avoided. However, the light source in itself is a heat source too, so it is necessary that a cooling fun and the like cooling the heat source be incorporated into the device. As a user feels uncomfortable if advent of the cooling fun directs at the user, it is necessary that a vent direction of the cooling fun be designed not to direct at the user. Also, when the cooling fun vibrates the device, this vibration also gives a user an uncomfortable feeling. In this case, the light source may be arranged on a side of a floor support section by separating the light source from the body of the device and thus light flux may be guided to the device via an optical fiber and the like.

In reference to FIGS. 46 and 47, an explanation about an optical system that relays light flux from the liquid crystal two-dimensional output device to diffusion glass 131 will be given. FIG. 46 shows an optical system where light flux coming from a surface where high resolution three-piece SXGA liquid crystal element 101 exists or is conjugate surface (f) in relation to the surface passes through half mirror HM via zoom automatic focus control system (g) and objective lens group (d) and is reflected by half mirror HM after distortion produced by the eyepiece lens system is corrected by reflection on curved surface mirror (c), and is formed on LCD conjugate surface 141 (where diffusion glass 131 is arranged) via relay lens group (b) by reflecting. Distortion characteristics of this optical system is shown in the diagram, but it can be seen that 50% of distortion occurs in a direction opposite the direction shown in FIG. 45 (*a*) when comparing with FIG. 45 (*a*). This represents that reverse correction of the foregoing distortion is achieved by this optical system, wherein pincushion distortion produced by the eyepiece lens system is corrected by barrel distortion of this optical system and a grid image is faithfully reproduced on the retina without correction by a software application.

FIG. 47 is an example of an enlargement optical system designed on the assumption that distortion is corrected by a software application and this enlargement optical system does not include the curved surface mirror as shown in FIG. 46. In this enlargement optical system, light flux from a surface where high resolution three-piece SXGA liquid crystal element 101 exists or is conjugate surface (f) in relation to the surface passes through achromatic lens (h) via zoom automatic focus control system (g) and objective lens group (d) and is reflected twice by reflection mirrors M3 and M4 via relay lens group (b) after the light flux is reflected by reflection mirrors M1 and M2, and then is formed on LCD conjugate surface 141 (where diffusion glass 131 is arranged). In order to reduce a number of lens elements and lessen curvature of field, a hyperboloidal lens (one surface of a lens is hyperboloid) is included in an eyepiece lens system (not shown) and relay lens system (b). Aberration of this optical system is so small that a faithful projection image can be achieved. It should be noted that achromatic lens (h) is not necessarily used.

Like this, this embodiment adopts the optical system that can deal with the lateral brisk moving eyeball by inserting the diffusion glass to the image plane in proximity to the eyepiece lens and with this system, a configuration of the enlargement optical system after the eyepiece lens can be made simple.

Figure 48:
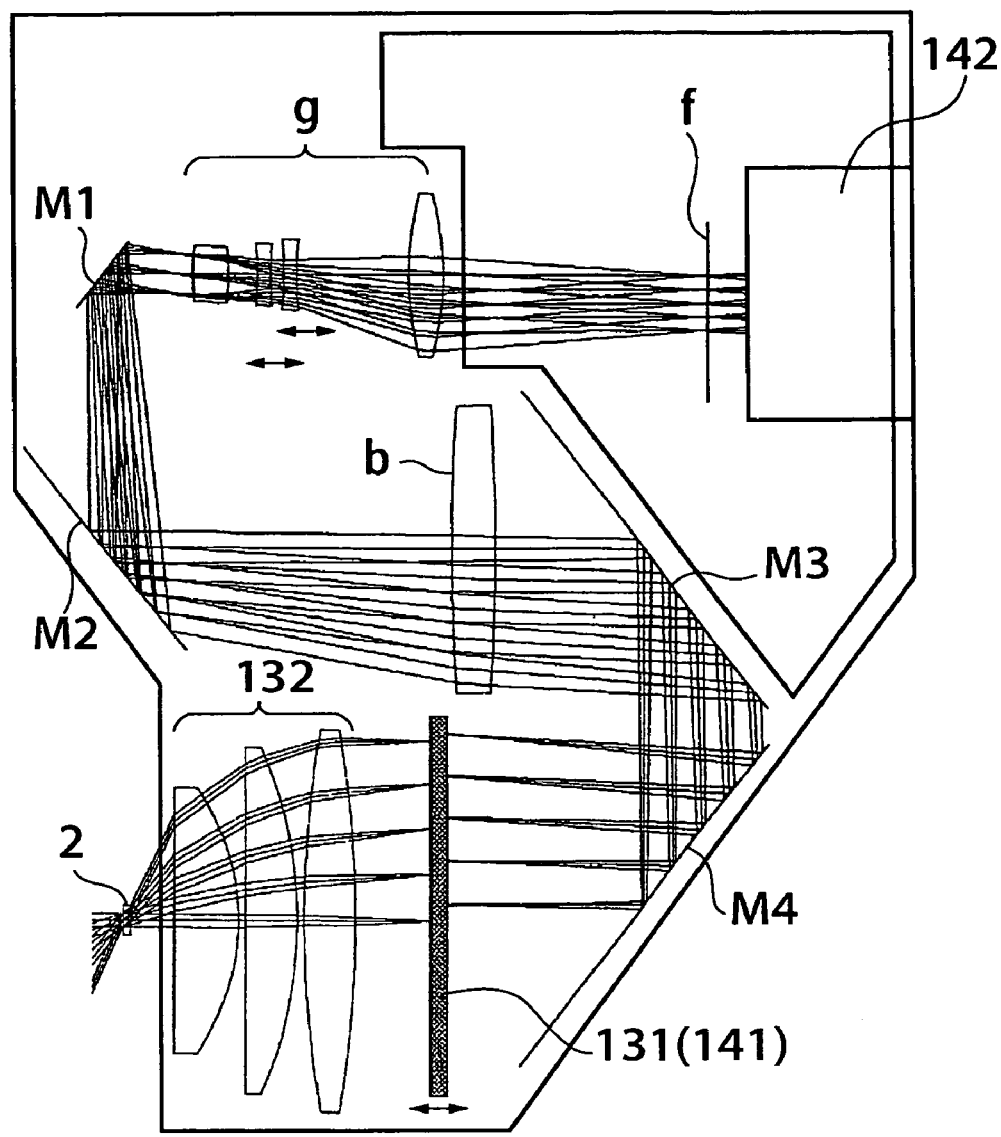
FIG. 48 is a schematic view of a device of an embodiment of this invention using an optical system shown in FIGS. 44 (a) and 47.

As the liquid crystal two-dimensional output device, FIG. 48 shows a schematic view of a device embodied by this invention using the optical system of FIGS. 44 (*a*) and 47.

According to FIG. 48, GRB three-piece LCD module 142 is used and a LCD element for G, a LCD element for R and a LCD element for B are made same light flux (is referred to as LCD conjugate surface f in the diagram) by a dichroic mirror, and the light flux is deflected by reflection mirrors M1 and M2 via zoom automatic focus control system (g) of a four-element lens of positive 1, negative 1, positive 2 and negative 2, and is enlarged/projected on diffusion glass 131 via relay lens (b) and reflection mirrors M3 and M4. Herein, a lens surface of positive 1 doubling the eyepiece lens is a hyperboloidal lens and a surface of an objective lens is also a hyperboloidal lens, so that the number of the lens elements is reduced and curvature of field is corrected.

Light flux diffused at an order of ±20 degrees by diffusion glass 131 is configured to project an image from the LCD element on the retina inside at least one of eyeballs via eyepiece lens 132. Herein, when infinity is viewed, diffusion glass 131 lies distant from the eyepiece lens and is controlled such that LCD element conjugate surface (f) and a surface of diffusion glass 131 become in conjugate relation to one another by moving two negative lenses in the zoom automatic focus control system (g). Also, in a case where an object at 50 cm ahead is viewed, diffusion glass 131 is controlled such that diffusion glass 131 is actuated so as to get close to the eyepiece lens and, at a position of actuated diffusion glass 131, LCD element conjugate surface (f) and the surface of diffusion glass 131 become in conjugate relation to one another by moving two negative lenses in zoom automatic focus control system (g).

On the other hand, the image from the LCD element is broadened to field of view of ±60 degrees under the foregoing situations and there would be no problem if an image from the video of a wide image capable of receiving the field of view of ±60 degrees is reproduced. But, if a usual video signal or computer image is output, such the broadened image is not certainly eye-friendly. That is, it is desirable that an image of field of view with ±30 degrees and below comfortable to see with a usual lateral moving eyeball be output. Thus, according to this invention, field of view can be reduced down to field of view with ±30 degrees and below by moving two negative lenses in zoom automatic focus control system (g). Furthermore, in a case where a number of pixels corresponding to content is an order of 760×400 (TV and DVD), an image is reduced to field of view with an order of ±15 degrees and in a case of an order of 1280×800 (BS and a motion image output from large amount of pixels), an image is reduced to field of view with an order of ±30 degrees. Reduction of the image permits to yield a clear image with no discernible pixel.

Like the foregoing, with enlargement/reduction by way of the zoom system, a screen size corresponding to a number of pixels can be selected at will and all contents can be dealt with.

Furthermore, the zoom system helps improve the sickness in VE, too. Usual content is not supposed to be output as a wide field-of-view image, so there are many cases where, for an image effect purpose, pictures are taken while pointing a video camera at various directions or a zoom is overused, not fixing the video camera in use at a specific position. There is not any problem at all with a display device equivalent to a TV image of a regular 10–50 inches, but it is likely that a screen of 60 degrees and over (equivalent to 100 inches) causes a self movement perception syndrome (an illusion as if he/she moves around is created and affects a sense of balance. A picture image that feeds information to field of view of a wide range affects the sense of balance and a mismatch between visual information and somatosensory information due to the picture image can provoke discomfort and a feeling of illness or sickness.)

But, a wide field-of-view image at infinity of 60 degrees and over of a landscape or distance captured by a fixed camera is close to a real image and is realism-packed, and yields a parallax-free natural three-dimensional sense, so that the wide field-of-view image is very effective in relaxation or to heal eyestrain. Therefore, as the image display device of this invention, the device is adjusted by the zoom system corresponding to not only a resolution of content but also content of an image and thereby information of a pleasing image can be obtained. Thus, it is desirable that the zoom system include a zoom system of about 2x and over covering from the wide field-of-view image at infinity of 60 degrees and over (equivalent to 100 inches) to an image of 30 degrees and below (equivalent to 50 inches) hard to cause the self movement perception.

It is needless to say that this optical system is applicable to the two-pair system employed as the twin-optical system as described previously.

When the twin-optical system is adopted, GRB three-piece LCD module 142 may be arranged respectively for each optical system, but GRB three-piece LCD module 142 may be used as a common module for right and left eyes. In this case, this can be achieved by splitting light flux emitted from GRB three-piece LCD module 142 into a plurality of light flux with a splitting optical element and distributing split flux to each optical system for the right and left eyes. Well, as an image reflected by the half mirror or the polarized beam splitter has its right and left reversed, in this case, it is good to reflect reflected light flux again and arrange a reflection optical element letting the light flux enter one of the twin-optical systems in an optical path. It is preferable that an optical system be configured so as to form the intermediate image on LCD conjugate surface (f) temporarily in order to relay an image from GRB three-piece LCD module 142 to the optical system as shown in FIG. 48 after splitting light flux.

In the image display device of the embodiment of this invention as described above, the image display device has the optoelectric element that outputs image data and projects an output image output from the optoelectric element on a retina of an eyeball via at least two reflection surfaces of the curved surface, the first reflection surface of the curved surface deflecting flux before entering an eyeball is the first elliptic mirror of which the first focus point is in proximity to a crystal ball of an eyeball and the second focus point of the first elliptic mirror is configured so as to exist between the first elliptic mirror and the second reflection surface of the curved surface, so that a wide field-of-view image can be transmitted to an eyeball efficiently.

Furthermore, when the second reflection surface of the curved surface is the second elliptic mirror and an image on the optoelectric element is projected on the retina of the eyeball with a correction optical system including the second elliptic mirror, large distortion can be corrected and a faithful display image can be viewed.

Let a reflection surface be the second elliptic mirror, and the second focus point of the first elliptic mirror and the first focus point of the second elliptic mirror are made substantially in alignment, and the first and second focus points of the first elliptic mirror and the first and second focus points of the second elliptic mirror are arranged so as to line substantially in a straight line. With this arrangement, image information having the wide field-of-view to be projected to the first focus point from the second focus point of the second elliptic mirror is projected to the first focus point from the second focus point of the first elliptic mirror and a second focus image of the second elliptic mirror can be exactly reproduced at a portion of the first focus point of the first elliptic mirror. Furthermore, it becomes possible to obtain a much more faithful image if curvatures of the first and second elliptic mirrors are made substantially equal.

Furthermore, it is preferable that a flat surface passing through a center of a line linking the first and second focus points of the first elliptic mirror and being orthogonal to the line and the reflection surface deflecting light flux of the first elliptic mirror be configured to intersect, and a flat surface passing through a center of a line linking the first and second focus points of the second elliptic mirror and being orthogonal to the line and the reflection surface deflecting light flux of the second elliptic mirror be configured to intersect, too and a fisheye-type optical system be arranged between the second elliptic mirror and the optoelectric element and an image on the optoelectric element be caused to be projected on the retina inside at least one of the eyeballs. With this arrangement, a flat surface image on the optoelectric element can be converted to a wide image with the fisheye-type optical system in a reverse to what the fisheye-type optical system projects the wide image on means for receiving light with a flat surface and also information of the wide image is enabled to be formed on the retina inside at least one of the eyeballs without distortion by way of the elliptic mirror of a wide reflection surface such that the wide reflection surface intersects with the orthogonal flat surface passing through centers of each focus points. To get a total 120 degrees of 60 degrees as a fixed viewing angle and respective 30 degrees of a viewing angle for the right and left eyes corresponding to the laterally moving eyeball, a configuration in such a way that the orthogonal flat surface passing through the center of the line linking the first and second focus points intersects with the reflection surface deflecting light flux of each elliptic mirror is requisite.

Also, in the fisheye-type optical system, as the image on the optoelectric element is configured to be projected on the retina inside at least one of the eyeballs without vignetting overly by supplying light flux including image data to an image detection area of the retina due to a crystal ball movement corresponding to a turn of the eyeball, a sufficient field of view can be provided even when the eyeball moves laterally in order for the eye to broaden field of view as shown in FIG. 5. This lateral eyeball movement is a very important evasive action against tiredness being felt when the human eyes continuously performs a single action and then a function of the eye is getting unable to follow gradually, and the embodiment of this invention that provides a field of view when the evasive action of the lateral eyeball movement starts plays an important role in order not to cause a user tiredness.

As for its method, in order to reduce an out-of-focus area produced by spherical aberration, an aperture in proximity to the pupil is made small and thereby the first fisheye-type optical system projects an image on a first element of receiving light with small N.A. The second fisheye-type optical system, on the other hand, uses distortion characteristics similar to those of the first fisheye-type optical system, but the aperture in proximity to the pupil is made large in comparison with the one of the first fisheye-type optical system. This arrangement provides a sufficient field of view even when the eyeball moves laterally for broadening the field of view. This is configured such that light flux can reach the crystal ball at the time of the eyeball lateral movement because the crystal ball of the human eye acts as the small aperture.

The embodiment of this invention enables to provide various configurations such that the image display device is arranged to at least one of the right and left eyes or an arrangement position is adjustable corresponding to a space between eyeballs by arranging the display device separately to the right and left eyes, so that a variety of utilization corresponding to usage is conceivable.

Furthermore, the optoelectric element that adopts the liquid crystal display device of emitting light in a two-dimensional way perpendicular to a direction of light flux enables to provide image information more faithful to a real field of view with a precise resolution and low energy consumption. The optoelectric element of this invention is not limited to this embodiment and when an optoelectric element is an element of emitting light in a two-dimensional way, every other optoelectric element is usable.

In another embodiment of this invention different from the foregoing embodiment, there is provided a first fisheye-type optical system to project a predetermined wide image on a first optoelectric element of receiving light in a two-dimensional way perpendicular to a direction of light flux and image data received by the first optoelectric element of receiving light in a two-dimensional way is output from a second optoelectric element of emitting light in a two-dimensional way perpendicular to the direction of light flux and the image output from the second optoelectric element is caused to be projected on the retina via s second fisheye-type optical system and a reflection surface with a shape of a curved surface.

In this embodiment, as the fisheye-type optical system projects a wide image on the element of receiving light with a flat surface, the first optoelectric element of receiving light in the two-dimensional way captures the image as image information, and the image information is output from the second optoelectric element of emitting light in the two-dimensional way and then a flat image on the optoelectric element is converted to a wide image through a reverse correction by reversely using a fisheye-type optical system of the same characteristics this time. That is, these fisheye-type optical systems may form a flat image while producing large distortion and distortion of the flat image is completely corrected at an exiting section of the second fisheye-type optical system, and the flat image can be made into a faithful wide image.

And there is production error among the first and second optoelectric elements or among the first and second fisheye-type optical systems or when a device/element of a different performance is used, it can be said that distortion is present to some degree. In such the case, more faithful image information can be obtained by controlling so as to digitally correct the image information captured by the first optoelectric element based upon the distortion error and output the image information from the second optoelectric element.

Furthermore, it is preferable that the reflection surface with a shape of the curved surface be formed by an elliptic mirror of at least two surfaces and one of two respective focus points of the two elliptic mirrors be arranged substantially at the same position as that of another of respective two focus points and thereby all focus points be arranged to line substantially in a straight line. A reason of this is not to distort an image until the image is projected on the retina of the eyeball even when image information emitted from the second fisheye-type optical system completely restores information of the wide image by the foregoing method. Distortion of image information projected from the second focus point to the first focus point of the second elliptic mirror is completely restored by tracing back the same optical path during the image information is projected from the second focus point to the first focus point of the first elliptic mirror. Therefore, it becomes possible to completely restore the second focus-point image of the second elliptic mirror at a portion of the first focus point of the first elliptic mirror. Furthermore, when curvatures of the first and second elliptic mirrors are made approximately equal, a more perfect projection image can be obtainable.

It is preferable that a pair of the image display device be arranged for the right and left eyes and a space between a pair of the first fisheye-type optical systems and a space between eyeballs be arranged so as to be equal, and a space between both of the image display device be made adjustable so as to be in agreement with a space between left and right eyes. This arrangement is effective to obtain a three-dimensional image faithful to a real image with the same field of view created by making a space between input sections of image information equal to a space between both eyes. Also, a more powerful three-dimensional image can be obtained with an intentional change of this space. This becomes effective when this image display device is used in a video game and the like.

As for another example, the reflection surface with the curved surface is formed of at least two fθ-type mirrors and a focus point of one of the fθ-type mirrors is arranged in proximity to the crystal ball of the eyeball, and another focus point thereof is arranged in proximity to the second fisheye-type optical system. With this arrangement, the second fisheye-type optical system and the second optoelectric element are prevented from protruding in a case where the foregoing elliptic mirror is used and the image display device is configured to extend toward the ear as the wearable unit. But, with this arrangement, field of view on outer edges is likely to get vignetted and thus it is preferable that this arrangement be subject to change depending upon usage.

Furthermore, it is preferable that the second fisheye-type optical system be configured such that the image on the optoelectric element is projected on the retina inside at least one of the eyeballs without vignetting the image overly by supplying light flux including image data to the image detection area of the retina due to the crystal ball movement corresponding to the turn of the eyeball. This configuration enables to provide a sufficient field of view even when the eyeball is laterally moving for broadening field of view as described above (please refer to FIG. 5). This lateral brisk eyeball movement is a very important action in an evasive action to tiredness being felt when the human eye performs a single action continuously and the function of human eyes is getting unable to follow gradually, and the embodiment of this invention that provides a field of view at the start-up the evasive action of the swift moving eyeball plays an important role in order not to cause a user tiredness. And, a reason why the image display device is configured to be arranged to at least one of the right and left eyes or a arrangement position is configured to be adjustable corresponding to a space between eyeballs by arranging the image display device separately with respect to the right and left eyes is that a variety of utilization corresponding to various uses is conceivable. Furthermore, a reason why the optoelectric element adopts the liquid crystal display device of emitting light in the two-dimensional way perpendicular to the direction of light flux and the first optoelectric element incorporates the CCD array sensor of receiving light in the two-dimensional way perpendicular to the direction of light flux is that image information more faithful to a real field of view can be provided with a precise resolution and low energy consumption. Certainly, this invention is not limited to this embodiment and when an optoelectric element is a type of emitting light in the two-dimensional way and receiving light, every other optoelectric element is applicable. In this specifications and its claims, a so-called type of emitting light refers to everything including a liquid crystal display (LCD) using a Halogen lamp and LED (light emitting diode) as a back light even if the LCD does not emit light by itself and a reflection-type liquid crystal display (LCOS) inclusive of a liquid crystal display having the diffusion glass arranged on its back and emitting light by way of ambient light.

Furthermore, in another embodiment different from the foregoing embodiment, a predetermined wide image is projected on the first optoelectric element of a spherical surface for receiving light in the two-dimensional way perpendicular to a direction of light flux and image data received by the first optoelectric element of receiving light is output from the second optoelectric element of a spherical surface for emitting light in the two-dimensional way perpendicular to the direction of light flux and the image output from the second optoelectric element is caused to be projected on the retina via the reflection surface with the curved surface. Moreover, the first optoelectric element has an opening on its spherical surface, wherein a positive lens is arranged at the opening section and a plurality of CCD two-dimensional array sensors are arranged on an inside wall of the spherical surface, and the second optoelectric element has an opening on the spherical surface, wherein a positive lens is configured to be arranged on the opening section and a plurality of liquid crystal devices are configured to be arranged on an inside wall of the spherical surface. With this arrangement, image information of a wide image can be sent directly to the retina inside at least one of eyeballs without converting the wide image to flat image information.

Furthermore, in another embodiment different from the foregoing embodiment, another embodiment includes a first fisheye-type optical system that projects a predetermined wide image on the first optoelectric element of receiving light in the two-dimensional way perpendicular to a direction of light flux, and a control system that outputs image data received by the first optoelectric element of receiving light from a second optoelectric element of emitting light in a two-dimensional way perpendicular to the direction of light flux and implements a desired control when projecting the output image output from the second optoelectric element on a retina inside at least one of eyeballs via a second fisheye-type optical system. With this arrangement, a view can be secured by viewing the wide image digitally and this embodiment has no inconvenience that a conventional image display device wearing on both eyes blocks the view completely.

Furthermore, in another embodiment, another embodiment is configured to include the control system that implements the desired control when projecting the predetermined wide image on the retina inside the eyeball so as to include at least one of a focus adjustment system for focusing on the predetermined wide image or a control system for controlling an output area of the wide image at will. With this configuration, this invention permits a user usually wearing glasses to view image information without glasses. Moreover, a necessary part of information of the wide image can be viewed as a wide image by digitally enlarging the necessary part only and thereby this acts as a magnifier for a user with poor eyesight. Furthermore, as for an observer that views an ordinal image distortedly due to an eye disease, a normal image can be provided by correcting an output image in correspondence to the distortion.

Furthermore, when the control system is configured to include an image composite function that composite first image information input from an external rather than the image display device with second image information input from the first optoelectric element and outputs a composite image from the second optoelectric element, a high-vision screen of a wide screen, a video image thereof, a DVD image thereof, a personal computer display screen thereof and the like can be displayed anywhere as needed while viewing the wide image. Moreover, as the wide image can be displayed, if a screen of a newspaper size or a magazine size is composited, a virtual newspaper and magazine floating in an air can be read while paying attention to surroundings.

The first image information is configured to be corrected in such a way that the image is similarly distorted based upon information of distortion produced by the first fisheye-type optical system and be composited with the second image information, and output. According to this configuration, as shown in FIG. 12, let (a) be any wide image 200 and (b) be external image information 201, an image to be output from the second optoelectric element includes information distortion produced by the first fisheye-type optical system and as shown in (c), image information is compressed on edges. Then, external image information 201 is composited with reverse correction on the viewing condition by way of the first fisheye-type optical system as shown in (c) and information of a faithful image is provided by restoring the information as a projection image with no distortion like an image of (d) on the retina of then eyeball.

Moreover, a video image input device that supplies one of the first image information as the video image output information is fixed onto the image display device and is configured to be detachable as needed. With this configuration, the image display device of this invention can be used in place of the conventional video camera. With the conventional video camera, a target object or a target subject person can be viewed only through an image display panel of the video camera or an optical viewfinder system. Thus, the target is lost sight of at boosting the magnification of the video camera or it is difficult to anticipate when an obstacle blocks the subject.

However, according to the embodiment of this invention, as shown in FIG. 11, by attaching the video camera on a side of the image display device of this invention, both of the image of the wide image and the composite image can be viewed on the same screen by compositing a part of image information of the video camera and a part of the image of the wide image while viewing the image of the wide image inclusive of the object. Furthermore, an obstacle and the like can be checked with image information of the wide image and the video camera can be detached from the image display device such that the image display device is not blocked, and then an enlargement image can be shot at a position where there is no obstacle or at a time of people congestion, an image at any location can be surely captured by raising a hand-held video camera only. Of course, the control system can change a proportion of the image of the wide image and the image from the video camera at will and, by storing image information of both images as image data, the proportion thereof can be changed at will when playing back the image data.

Furthermore, one of the first image information is made into image information output from a computer and another is made into information input into a computer keyboard. These are used as shown in FIG. 13, but a composite of image information is described in FIG. 14. In FIG. 14, it is necessary to display a composite portion by compositing processing portion 203 requiring a high resolution of a computer as shown in (c), tool bar portion 204 displayed on edges on a computer screen as shown in (a) and portion 205 displaying information input into the keyboard as shown in (d) into wide image 200 as shown in (b).

As described above, the image output from the second optoelectric element includes distortion produced by the first fisheye-type optical system and as shown in (e), its image information is compressed at edge portions. Thus, external image information 204 and 205 are converted in such a way that a reverse correction is performed on distortion produced by the second fisheye-type optical system as shown in (e) and by compositing the converted image information with wide image 200, the image output from the second optoelectric element provides information of a faithful image that is restored as a distortion-free projection image like an image of (f) on the retina of the eyeball.

Furthermore, the first image information is information input into a portable keyboard by a hand and the information input the portable keyboard is made into image information by detecting information of an electromagnetic element attached at a thumb with an electromagnetic detection sensor and converting the information into information of distance/direction of the thumb and another fingers and the image information representing a hand movement can be displayed at portion (d) of FIG. 14 as it is. In portion (d), an image of a virtual keyboard is displayed and when the thumb is fixed at any position and another fingers move at any position, this information is converted into two-dimensional location information inclusive of up/down/right/left directions including the distance and direction and as image information, each finger moves on the virtual keyboard and a key on the keyboard is lit up. Thus, with this arrangement, it becomes possible to select a key on the keyboard correctly while checking an image. The information input into the portable keyboard is made into the image information by detecting information of a finger pressure of each finger against an object with a pressure detection sensor arranged at each finger and converting the information of the finger pressure of each finger as recognizable image information, so it can be checked whether or not the lit-up key is typed or whether or not data is correctly inputted as image information, for example, by changing a lit-up color and the like.

Herein, as an example, a display method of using the lit-up key or via changing color is introduced, but this invention is not limited to this embodiment, but is applicable to a wide variety of applications.

Furthermore, one of the first image information is configured to be image information by converting a voice sound or a non-voice sound input from a microphone or a headphone into a character. This is because the control system has a function that converts the sound into text information. Especially, when both ears are blocked by the headphone and the like, a noise becomes small and as the control system can convert even the non-voice sound into the sound voice by vibrating a vibration paper of the headphone, even if information is input just in a whisper, the information can be converted into the image information as the text information. Moreover, when the image display device includes a mail function/telephone function in the personal computer, the text information can be input and the information can be transmitted at a high speed.

As for another configuration, the second optoelectric element and the second fisheye-type optical system are configured to be arranged separately with regard to right and left eyeballs whereas the first optoelectric element and the first fisheye-type optical system are configured to be in common with right and left eyeballs and a position of information input into the first optoelectric element is converted in correspondence to width of both eyeballs and then, the information is configured to be output as separate information in correspondence to the second optoelectric element of the right and left eyeballs. As shown in FIG. 10, field of view seen with both eyes is different in field-of-view area by a degree at which the eyes are apart from one another. If the information of the first optoelectric element in common is given to 6L and 6R of the second optoelectric elements (the liquid crystal two-dimensional output device) for right and left eyes without correcting the information, an image looks dual. In order to display this dual image as a single image, a faithful projection image can be obtained by way of the foregoing method.

Like the foregoing, this invention can capture the wide image as image information and thus can provide a full-fledged wearable information input/output device exceeding the conventional wearable image display device or wearable computer with conceivable various combinations using the captured wide image. Moreover, this invention enables sales of a tuned-in video game software, a wide image high-vision image, wide image DVD and wide image video cassette tape that effectively use the image of the wide image and furthermore, a full-fledged system of a genuine virtual reality can be provided.

Also, in order to provide the foregoing products, image information input device 35, three-dimensional image input device 36, high magnification image input device 37 and the like as shown in FIG. 15 are detached from this image display device and re-combination thereof can lead to diversification of usage and utilization, and let the foregoing input devices be an Infrared, violet and nuclear radiation detection devices, this invention can further develop into usage at a nighttime or hazard areas, too.

This invention can provide the image display device as a system free from sense of discomfort produced by a weight and wearing with direct attachment of this image display device to a seat in a movie theater or aircraft, a chair for relaxation, a bed for caring a bed-ridden senior and the like, not to mention a supporting method of a glasses-type image display device and a head-mounted image display device.

A more specific method of releasing the sense of discomfort due to the weight and wearing other than the foregoing provides a supporting stand that independently supports the image display device and arranges the image display device at a front end of an arm member having a three-dimensionally movable articular structure. The arm member has a weight member in a direction opposite the image display device at a centre of the supporting stand, so that the weight of the image display device can be cancelled out. Furthermore, a light-tight cover of a fabric material that blocks a light leakage from an external is provided on the image display device and forming of a negative pressure inside the cover (a slight pressure against an external pressure) further enables to provide a comfortable structure that follows a face movement, but does not give a user any sense of a weight and causes the user to forget a sense of wearing by softly fitting across the face. Adoption of this structure enables to circulate an air inside a wearing section and prevent moisture inside. If the cover completely blocks the light from the external, however, it becomes difficult to eat, drink etc while wearing this image display device. Thus, it is preferable that information of the external be able to be obtained from a lower direction of the image display device. When the lower portion thereof is kept open, but, it is likely that clearness of an image is lost due to a ray of light leaked from the lower portion thereof.

Then, the amount of the light leakage from the external is suppressed by providing a filter that has almost no effect on clearness of the image display device in this lower portion and the inside negative pressure is kept and a way for obtaining external information is devised, and with the foregoing, a more comfortable system can be provided.

Moreover, as for a device of this invention to input the external information, regardless of a wire or wireless, any device is usable to all usage.

In the embodiments of this invention, it is assumed that the reflection surface with the curved surface is something like a reflection surface coated by a metal film. An internal surface of a transparent glass member or a plastic member may be used as the reflection surface, but it is not preferable to use a member of an optical refracting power as the reflection surface with the curved surface because the member of the optical refracting power causes a color dispersion at an entrance position and an exit position from an air. However, when two reflection surfaces of the same curved surface are used symmetrically with respect to a line or a point, even the color dispersion can be corrected if the entrance and exit positions from the air are arranged at the symmetric positions. As a refractive index of the transparent glass member or plastic member is larger than that of an air, incident light flux at a large angle reaches the reflection surface of the curved surface at a further small angle. Thus, an advantage that a shape of the curved surface can be easily fabricated is noted. When this advantage is used, the structure becomes further simpler if the two reflection surfaces of the same curved surface are fabricated with integrated transparent glass or plastic members.

The embodiment of this invention uses two reflection surfaces of the same curved surface, but may combine more than two elements to relay. These can be considered within freedom of designing.

Light flux of the fisheye-type optical system of the reflection surface with the curved surface proposed in FIGS. 22 and 23 is efficiently supplied to the optical system (as shown in FIG. 1 or 2) of two reflection surfaces and is efficiently transmitted/supplied up to a user's pupil while eliminating effects of distortion and so, which is within a scope of this invention, and further it is possible to arrange another optical system on the exit side of the optical system of two reflection surfaces and it is obvious that enhancement of freedom of designing is also within the scope of this invention.

Furthermore, by way of the diffusion glass supported on a polyester film coated by metal oxide and metallic carbide as described above, it becomes possible to provide a head-mounted image display device full of realism in correspondence to the laterally moving eyeball even by projecting the image on the diffusion glass with the fisheye-type optical system projecting a picture image from the liquid crystal device of outputting in the two-dimensional way.

In the image display device of the embodiment of this invention, wherein the image display device has the control device that controls the image output from the first optoelectric element formed by projecting/forming light emitted from the first optoelectric element of emitting light in the two-dimensional way at right angles to the direction of emitting light flux on the retina of the eyeball via the first fisheye-type optical system and the relay optical system, and the control device includes at least one of the focus adjustment device to focus on the predetermined wide image or the control device to control the output area of the wide image at will and thus due to the viewing angle of the wide image of 60 degrees and over, this invention can provide the image display device full of realism and further capable of projecting a picture image with a image display method suitable to content of an image. With this arrangement, this invention permits even a glass wearer who usually wears glasses to view image information without using glasses. Moreover, a necessary part of wide image information can be viewed as a wide image by digitally enlarging the part only and thereby it acts as a magnifier to a user with poor eyesight.

Also, in this image display device, the image display device further has the image composite device that composites the first image information and the second image information different from the first image information and outputs the composite image information from the first optoelectric element, so it becomes possible to display a high-vision image, video image, DVD image, personal computer display image and the like anywhere while viewing a wide image. Moreover, as a wide image is displayable, a virtual newspaper and magazine floating in an air while paying attention to surroundings can be read by compositing screens of a newspaper size or a magazine size.

Also, as the control device of the foregoing image display device has the function that optically composites the first image information output from the first optoelectric element and the second image information output from the second optoelectric element and projects/forms the composite image on the retina of the eyeball, it becomes possible to alleviate a workload against image processing of an image processing device that outputs image information to the first optoelectric element. Moreover, with production of reverse distortion by the optical system between the second optoelectric element and the control device to reduce distortion produced by the first fisheye-type optical system, image deterioration due to a distortion correction is reduced.

Also, with arrangement of the control device of the foregoing at a fixed place along with the image processing device and transmission of information to the image display device via a wireless (Infrared, radio etc), a wearable capability of the image display device can be enhanced. Furthermore, when displaying at least one of the first image information or the second image information on the optoelectric element, a number of optical members can be reduced by displaying a reverse-distorted display image against distortion produced by the first fisheye-type optical system by way of the optoelectric element so that the image display device can be made lightweight.

Furthermore, at least one of the first image information or the second image information is a video image or information output from DVD or image information output from a computer or information input to a keyboard, which thereby makes it possible to project desired information corresponding to a life style.

The desired information is information input to a portable keyboard attached to a hand and adoption of the portable keyboard as a keyboard to be attached to the image display device of this invention enables to input the information regardless of a usage situation.

Moreover, it is preferable that the portable keyboard permits various information to be entered in such a way that information of an electromagnetic element arranged at a thumb is detected with electromagnetic detection sensor and the information is converted into information of a distance/direction of the thumb and another fingers.

Also, as for other method of inputting information, information of a finger pressure each finger may be converted into recognizable information as an image by detecting information of the finger pressure of each finger against an object with a pressure detection sensor arranged at each finger.

Also, one of the first image information or the second image information may make image information by converting a voice sound or a non-voice sound input from a microphone or a headphone into a character.

As the foregoing input method has been described so far, their explanations will be omitted here.

The image display device as described above is made up of two image display devices that are arranged separately to the right and left eyes respectively and a space between the two image display devices may be configured to be adjustable corresponding to a space between eyeballs so as to make the space between the first fisheye-type optical systems of the two image display devices and the space between eyeballs equal. In this case, when each component of the image display device is incorporated into a single box-chassis and is movable in the box chassis, it becomes possible to project a picture image emitted from the first optoelectric element at the almost same space as the one between right and left eyes.

The image display device is made of a single image display device only and a space between projection images of the first fisheye-type optical systems may be adjustable corresponding to a space between right and left eyes such that light flux from the first optoelectric element is split to respective right and left eyeballs by the optical member and a space between the first fisheye-type optical systems arranged separately to the respective split light flux and a space between the eyeballs are made equal. As light flux from the first optoelectric element is split into a plurality of light flux by the half mirror or the polarizing beam splitter, the single first optoelectric element makes it possible to project a picture image having a wide viewing angle for both right and left eyes.

The image display device includes the light diffusion member for diffusing light that is arranged on the image-forming surface arranged on the optical path of the optoelectric element for outputting the image data and the crystal ball, wherein an optical system of at least a part of the first fisheye-type optical system may form an image of an object on the retina by converging diffused transmitted light in proximity to the crystal ball. With this configuration, the image display device projects the intermediate image on the light diffusion member temporarily and can eliminate an existing effect of an exit pupil of the optical system until the image is projected on the light diffusion member again by causing the image on the light diffusion member to be formed on the retina of a user by the optical system, and this invention can provide the image display device dealing with the lateral moving eye.

As for the light diffusion member of diffusing light, the transparent diffusion member that has abrasive of metal oxide or metallic carbide whose diameters are precisely controlled in a micron grade coated on a transparent sheet is preferable and as for a material of abrasive, it is preferable that the material be at least one of silicon carbide, chromic oxide, tin oxide, titanium oxide, magnesium oxide or aluminum oxide and it is preferable that the transparent sheet be a polyester film.

An angle of diffusion is quite large as characteristics of such the transparent diffusion member, so it becomes possible to project a clear image of a wide field of view by introducing an image from the transparent diffusion member to the crystal ball of a user's eye by way of an eyepiece lens of a fisheye type.

Well, when at least a portion of the image display device is configured to be supported by a part rather than a user and contact a face of the user and be movable following a face movement, it becomes possible to alleviate a wearing discomfort of the user. Especially, as shown in FIGS. 40, 41 and 42, let a XY surface be an installation surface, use of a supporting member that causes the image display device to be movable anywhere toward a six-axis direction of X direction, Y direction, Z direction, $\Theta X$ direction, $\Theta Y$ direction and $\Theta Z$ direction permits the image display device to follow naturally a movement of a user's face.

In this case, in order to make the display device movable anywhere in the six directions, the image display device is supported at center of gravity of the device or in proximity to its center, so inertia is to be produced when moving the image display device can be reduced and thereby a natural sense of wearing can be provided even if the face moves.

More specifically, the image display device includes a weight to balance the image display device and the image display device may be yoked together with the weight by a flexible member. As the flexible member moves by actuating the image display device, it is advisable that friction of s sliding portion be reduced by way of a pulley at the sliding portion of the flexible member.

The control device of controlling an output area of the wide image at will is an optical zoom device of a variable magnification 2× and over and the sickness in VE can be reduced by controlling the output area such that an image composited by the first image information and the second image information does not overlap over a predetermined width depending upon a zoom status.

In addition, as the control device of controlling the output area of the wide image includes a detection member that detects a moving image of a flowing landscape on an observer's eye and a storage member that processes the image such that the image does not move during a predetermined period of time and stores the processed image, this becomes effective in reducing the sickness in VE and thereby and further realism having an impact on an observer does not need to be deteriorated.

Furthermore, the control device of controlling the output area of the wide image includes a selection member that selects freely use or non-use of the detection and processing/storage members and thus this invention can provide an image meeting a observer's will and the ease-of-use image display device.

More specifically, the detection member and the storage member capture image data into an internal buffer and image output from the internal buffer is divided into a marginal image block and a center image block, and an amount in a lateral shift for a predetermined period of time is computed and judging that the shift is attributed to a hand shake or a lateral movement of a screen when the edge image and center image are shifted in the same direction, the image is processed in a way that makes the image look as if the whole screen is still by shifting a whole image bit as the same amount as in a direction opposite a direction of an image movement such that the image does not move laterally for the predetermined period of time. This arrangement enables a reduction in the seasick in VE.

When the forgoing is laid out, following marketability can be expected in a case of using this invention.

<Wearable Display (94R, 94L, 102R' and 102L' in FIG. 30)>

A fail-safe home video camera that enables to take a picture in the same way as a user's eye sees, transmission of an image full of realism to a receiver who is not on the spot, an device capturing a three-dimensional image, a portable personal computer/video game (confidentiality) with a large display screen, a portable digital newspaper with a broad screen and a virtual reality display.

<Fixed and Remote Operated Type (102R and 102L in FIG. 30)>

Anti-crime and disaster prevention wide monitoring vision, a function enlarging a point of an attention, an animal watching that does not bother animals, a motion image taking, transmission of a relaxation motion image from an installation site with a good view, a broad monitoring vision in a space where a human being cannot reach, an image and a providing of a wide image such as a congestion status at a holiday resort and the like.

<Floor-Stand Type (FIG. 31)>

A large screen personal computer and CAD that do not feel weight and fatigue, a large scale display in place of a movie theater and a projection, a providing of a 3-D large scale image full of realism, reception of an image from the video system via the Internet, a providing of an image full of realism to a bed-ridden senior and patient, a relaxation image display unit, a providing of an all-new TV video game image, a providing of a large screen image in a small space, a virtual reality display of highly confidential information for private use, a remotely operable large screen display and relaxation service for a first-class customer on board a aircraft with a reception system of a digital newspaper having a large screen.

Finally, comparison of the embodiments of this invention with conventional products on the market will be made in FIG. 49. From a table shown in the diagram, it can be seen that this invention has a high capabilities of implementing an excellent performance on every item except for a limitation to "use in common".

In the embodiments of this invention, specific combinations of elements constituting this invention have been cited herein, but any combination of the elements is possible as needed and is included in this invention and, more specifically, it is needless to say that claims of this invention can tell what kind combination thereof is included in this invention.

The invention claimed is:

1. An image display device comprising:

an optoelectric element of emitting light in a two-dimensional way that has a display surface orthogonal to a direction of emitted light flux; and a fisheye-type optical system that projects light flux emitted from the optoelectric element inside at least one of eyeballs of a user and has an viewing angle of 60 degrees and over, wherein the image display device is worn in front of the eyeball, wherein the fisheye-type optical system forms an intermediate image, wherein a closest optical element of optical elements arranged toward the eyeball from an position of forming the intermediate image to the eyeball is an aspherical optical element of a single lens element, wherein a far surface shape of the optical element from the eyeball has a aspherical shape of a surface such that light flux entering a pupil of the eyeball enters a far surface of the optical element from the eyeball approximately at right angles and, wherein a Conic coefficient of the Conic surface is less than −1.

2. The image display device set forth in claim 1, wherein a second optical element of optical elements constituting the image display device from the eyeball is made up of a single lens element and a far surface of the optical element from the eyeball has a shape such that the light flux entering the pupil of the eyeball enters a far surface of the optical element from the eyeball approximately at right angles.

3. The image display device set forth in claim 1, wherein the fisheye-type optical system has a first lens group that includes a relay optical system and an eyepiece lens system that projects the intermediate image formed by the first lens group inside the eyeball.

4. The image display device set forth in claim 3, wherein the first lens group includes at least one or more aspheric optical element and over.

5. The image display device set forth in claim 3, wherein the first lens group includes at least one curved mirror that corrects telecentricity.

6. The image display device set forth in claim 4, wherein the first lens group includes at least one curved mirror that corrects telecentricity.

* * * * *